(12) United States Patent
Berntorp et al.

(10) Patent No.: US 11,947,022 B2
(45) Date of Patent: *Apr. 2, 2024

(54) COOPERATIVE STATE TRACKING OF MULTIPLE VEHICLES USING INDIVIDUAL AND JOINT ESTIMATIONS

(71) Applicant: Mitsubishi Electric Research Laboratories, Inc., Cambridge, MA (US)

(72) Inventors: Karl Berntorp, Newton, MA (US); Marcus Greiff, Lund (SE); Stefano Di Cairano, Newton, MA (US); Kyeong Jin Kim, Lexington, MA (US)

(73) Assignee: Mitsubishi Electric Research Laboratories, Inc, Cambridge, MA (US)

( * ) Notice: Subject to any disclaimer, the term of this patent is extended or adjusted under 35 U.S.C. 154(b) by 474 days.

This patent is subject to a terminal disclaimer.

(21) Appl. No.: 17/216,832

(22) Filed: Mar. 30, 2021

(65) Prior Publication Data

US 2022/0326393 A1 Oct. 13, 2022

(51) Int. Cl.
*G01S 19/37* (2010.01)
*G01S 19/24* (2010.01)

(52) U.S. Cl.
CPC ............. *G01S 19/37* (2013.01); *G01S 19/24* (2013.01)

(58) Field of Classification Search
CPC .......... G01S 19/09; G01S 19/14; G01S 19/24; G01S 19/37; G01S 19/393; G01S 5/0036; G01S 5/0289
USPC ........................................................ 702/150
See application file for complete search history.

(56) References Cited

U.S. PATENT DOCUMENTS

2010/0198513 A1* 8/2010 Zeng ....................... G01S 17/89
701/300

\* cited by examiner

*Primary Examiner* — John H Le
(74) *Attorney, Agent, or Firm* — Gene Vinokur

(57) ABSTRACT

A server jointly tracks states of multiple vehicles using measurements of satellite signals received at each vehicle and parameters of the probabilistic distribution of the state of each vehicle. The server fuse states and measurements into an augmented state of the multiple vehicles and an augmented measurement of the augmented state subject to augmented measurement noise defined by a non-diagonal covariance matrix with non-zero off-diagonal elements, each non-zero off-diagonal elements relating errors in the measurements of a pair of corresponding vehicles. The server executes a probabilistic filter updating the augmented state and fuses the state of at least some of the multiple vehicles with a corresponding portion of the updated augmented state.

15 Claims, 38 Drawing Sheets

| Notation | Description | Unit |
|---|---|---|
| $P$ | Code observation | m |
| $\rho$ | Distance between the receiver and the satellite | m |
| $c$ | Speed of light | m/s |
| $\delta T$ | Receiver clock bias | s |
| $\delta t$ | Satellite clock bias | s |
| $I$ | Ionospheric delay | m |
| $T$ | Tropospheric delay | m |
| $\epsilon$ | Code observation noise | m |
| $\lambda$ | Carrier wavelength | m |
| $\Phi$ | Carrier phase observation | cycles |
| $n$ | Integer ambiguity | cycles |
| $\eta$ | Carrier observation noise | m |

FIG. 1C

COOPERATIVE STATE TRACKING OF MULTIPLE VEHICLES USING INDIVIDUAL AND JOINT ESTIMATIONS

TECHNICAL FIELD

This invention relates generally to positioning systems, such as the global positioning system (GPS) or the Quasi-Zenith Satellite System (QZSS), and more particularly to resolve a state of a vehicle using unsynchronized cooperation of information.

BACKGROUND

A Global Navigation Satellite System (GNSS) is a system of satellites that can be used for determining the geographic location of a mobile receiver with respect to the earth. Examples of GNSS include GPS, Galileo, Glonass, QZSS, and BeiDou. Various global navigation satellite (GNS) correction systems are known that are configured for receiving GNSS signal data from the GNSS satellites, for processing these GNSS data, for calculating GNSS corrections from the GNSS data, and for providing these corrections to a mobile receiver, with the purpose of achieving quicker and more accurate calculation of the mobile receiver's geographic position.

Various position estimation methods are known wherein the position calculations are based on repeated measurement of the so-called pseudo-range and carrier phase observables by Earth-based GNSS receivers. The "pseudo-range" or "code" observable represents a difference between the transmit time of a GNSS satellite signal and the local receive time of this satellite signal, and hence includes the geometric distance covered by the satellite's radio signal. The measurement of the alignment between the carrier wave of the received GNSS satellite signal and a copy of such a signal generated inside the receiver provides another source of information for determining the apparent distance between the satellite and the receiver. The corresponding observable is called the "carrier phase", which represents the integrated value of the Doppler frequency due to the relative motion of the transmitting satellite and the receiver.

Any pseudo range observation comprises inevitable error contributions, among which are receiver and transmitter clock errors, as well as additional delays caused by the non-zero refractivity of the atmosphere, instrumental delays, multipath effects, and detector noise. Any carrier phase observation additionally comprises an unknown integer number of signal cycles, that is, an integer number of wavelengths, that have elapsed before a lock-in to this signal alignment has been obtained. This number is referred to as the "carrier phase ambiguity". Usually, the observables are measured i.e. sampled by a receiver at discrete consecutive times. The index for the time at which an observable is measured is referred to as an "epoch". The known position determination methods commonly involve a dynamic numerical value estimation and correction scheme for the distances and error components, based on measurements for the observables sampled at consecutive epochs.

When GNSS signals are continuously tracked and no loss-of-lock occurs, the integer ambiguities resolved at the beginning of a tracking phase can be kept for the entire GNSS positioning span. The GNSS satellite signals, however, may be occasionally shaded (e.g., due to buildings in "urban canyon" environments), or momentarily blocked (e.g. when the receiver passes under a bridge or through a tunnel). Generally, in such cases, the integer ambiguity values are lost and must be re-determined. This process can take from a few seconds to several minutes. In fact, the presence of significant multipath errors or unmodeled systematic biases in one or more measurements of either pseudo-range or carrier phase may make it difficult with present commercial positioning systems to resolve the ambiguities. As the receiver separation (i.e., the distance between a reference receiver and a mobile receiver whose position is being determined) increases, distance-dependent biases (e.g. orbit errors and ionospheric and tropospheric effects) grow, and, as a consequence, reliable ambiguity resolution (or re-initialization) becomes an even greater challenge. Furthermore, loss-of-lock can also occur due to a discontinuity in a receiver's continuous phase lock on a signal, which is referred to as a cycle slip. For instance, cycle slips can be caused by a power loss, a failure of the receiver software, or a malfunctioning satellite oscillator. In addition, cycle slip can be caused by changing ionospheric conditions.

GNSS enhancement refers to techniques used to improve the accuracy of positioning information provided by the Global Positioning System or other global navigation satellite systems in general, a network of satellites used for navigation. For example, some methods use differencing techniques based on differencing between satellites, differencing between receivers, differencing between epochs, and combination thereof. Single and double differences between satellites and the receivers reduce the error sources but do not eliminate them.

Consequently, there is a need to increase the accuracy of GNSS positioning. To address this problem, a number of different methods use the cooperation of multiple GNSS receivers to increase the accuracy of GNSS positioning. However, to properly cooperate, the multiple GNSS receivers need to be synchronized and their operation needs to be constrained. For example, U.S. Pat. No. 9,476,990 describes cooperative GNSS positioning estimation by multiple mechanically connected modules. However, such a restriction on the cooperative enhancement of accuracy of GNSS positioning is not always practical.

SUMMARY

Some embodiments are based on the realization that current methods of tracking of a state of a vehicle based on satellite signals received from a global navigational satellite system (GNSS) assume either an individual or centralized estimation based on internal modules of the vehicle or a distributed estimation that performs the state estimation in a tightly controlled and/or synchronized manner. Examples of such distributed estimation include decentralized systems that determine different aspects of the state tracking and estimate the state of the vehicle by reaching a consensus, imbalanced systems that track the state of the system independently while one type of tracking is dominant over the other, and distributed systems including multiple synchronized GNSS receivers preferably located at a fixed distance from each other.

Some embodiments appreciate the advantages of cooperative state tracking when internal modules of a moving vehicle use some additional information determined externally. However, some embodiments are based on the recognition that such external information is not always available. Hence, there is a need for a cooperative, but unsynchronized state tracking, when the tracking is performed by the internal modules of the vehicle but can seamlessly integrate the external information when such information is available.

Some embodiments are based on the realization that various probabilistic filters that recursively track the state of a vehicle include two parts. The first part estimates the samples of the state of the vehicle and the second part updates the probabilistic distribution of the state based on these estimated samples. At first glance, these two parts are integrated into each other because one part is not executed without the other. However, some embodiments are based on the realization that these two parts are related by causal dependency, not a dependency of time. Specifically, the probabilistic update is dependent on the presence of the state sample estimation, in the sense that when the new state sample is estimated, its arrival should trigger the update. However, when and how the state sample is estimated is independent of the update of the probabilistic distribution.

Some embodiments exploit this understanding to disambiguate the probabilistic state estimation and update parts. This disambiguation allows reusing the probabilistic update regardless of the time and the manner the state sample is estimated. Hence, the state estimate can be determined by internal modules of the vehicle based on GNSS measurements or by modules external to the vehicle when such modules are available. Regardless of the principles of state estimation, the probabilistic update operates in the same manner and its quality depends not on the frequency of arrival of new information, but the quality of its estimation. In such a manner, the internal and external state estimators can operate in an unsynchronized manner.

Based on these understandings, some embodiments disclose a multi-head measurement model allowing a probabilistic filter to use different sources to update the belief on the state of the vehicle. The multi-head measurement model includes multiple paths producing different types of outputs but having the same probabilistic structure. For example, in some implementations, the multi-head measurement model includes two heads. The first head relates measurements of the satellite signals with a belief on a state of the vehicle subject to measurement noise, and the second head relates an estimation of the state of the vehicle with the belief on the state of the vehicle subject to estimation noise. Hence, the measurement model includes different information and different types of noise but having a similar structure acceptable by the probabilistic filter allowing use of outputs of different heads either individually or jointly.

In such a manner, in some embodiments, the probabilistic filter propagates recursively, at each update step, the parameters of the probabilistic distribution of the state of the vehicle according to a motion model of state transitions of the vehicle subject to process noise and updates the parameters of the probabilistic distribution upon receiving outputs of one or a combination of the first head of multi-head measurement model and the second head of multi-head measurement model.

For example, the first head allows updating the belief of the state of the vehicle using GNSS measurements having specific uncertainties, biases, and ambiguities affecting accuracy and/or quality of state estimation. The outputs of the first head are usually available with the frequency of updates of the probabilistic filter. In contrast, the first head allows updating the belief of the state of the vehicle using external information that may be received only occasionally but may have greater accuracy of state estimation. For example, the second head can process state estimations received from an external measurement module. Hence, the second head may receive information less frequently, but regardless of the frequency of execution of the first and/or the second heads of the multi-head measurement model, outputs of the first and the second heads are seamlessly integrated together without breaking probabilistic guarantees of the probabilistic filter.

Some embodiments are based on understanding that the external measurement module can be passive, active, or both. In the passive mode, the external measurement module receives the estimation of the state of the vehicle determined independently from GNSS measurements performed by the internal measurement module. For example, the vehicle can pass near a roadside unit (RSU) configured to estimate the state of the vehicle using various telemetric techniques. In the active mode, the vehicle can transmit to a remote server, which also can be an RSU, current information of the state of the vehicle and receive in response the external measurements made based on the correction of the internal measurements, Here, current information includes a mean of the state estimate of the vehicle, a covariance of the estimate of the state of the vehicle, a set of code and carrier phase measurements used by the internal measurement module to update its internal state.

To that end, it is an object of some embodiments to provide a cooperative, but the unsynchronized estimation of the state of the vehicle suitable for being used by the probabilistic state estimation. It is another object of some embodiments to provide such cooperative, unsynchronized estimation when the external active module executes at an update rate that is possibly different from the internal probabilistic filter execution.

Some embodiments are based on a recognition that the GNSS positioning problem concerns the estimation of a receiver's states from a set of code and carrier-phase measurements received from one or several constellations of satellites. The involved measurement equations are time varying, nonlinear in the position of the receiver, and incorporate various biases and integer ambiguities. In the carrier-phase measurements, there is an integer bias known as the ambiguity, unique to each carrier-phase measurement from each satellite. When considering these biases in time, they follow an integer jump process, remaining constant before sporadically and independently of each other jumping to new integer values, commonly referred to as "cycle slip". Hence, the GNSS positioning problem can be seen as a mixed-integer GNSS positioning problem solving a mixed-integer problem of ever-increasing size (with new integer biases included in each time-step), and careful considerations need to be made in how to best relax this estimation problem to make the resulting algorithm implementable.

Some embodiments are based on the realization that in the setting of probabilistic filters, such that the uncertainty of the integer ambiguity resulting from e.g. a cycle slip, is reflected into a second moment, i.e., a covariance, of the probabilistic distribution of the state of the vehicle. To that end, to benefit from the active mode of the external measurement module, some embodiments transmit the parameters of the probabilistic distribution to allow the remote server to correct this information. The remote server can collect similar information from other vehicles in the proximity, fuse the received information to correct the parameters of the probabilistic distribution of the state of the vehicle, and transmit the updated probabilistic parameters back to the vehicle. Upon receiving the updated probabilistic parameters, the external measurement module estimates the state of the vehicle at a current instant of time consistent with the updated parameters and triggers the execution of the probabilistic filter. For example, the external measurement module can propagate the mean of the probabilistic distribution in time based on a motion model of the vehicle, sample the updated probabilistic distribution defined by the propagated mean and received variance, and use the probabilistic filter with the sampled state estimations to update the probabilistic distribution of the state of the vehicle.

In some embodiments, the state of a vehicle includes a position of a vehicle, a velocity of a vehicle, integer ambiguities associated with carrier phase measurements of a vehicle from specific satellites, and residual bias states modeling the atmospheric, e.g., ionospheric and tropospheric, delays. For example, some methods use differencing techniques based on differencing between satellites, differencing between receivers, differencing between epochs, and combination thereof. Single and double differences between satellites and the receivers reduce the error sources but do not eliminate them, thereby reducing the accuracy of state estimation.

Some embodiments are based on the realization that ignoring state biases such as ionospheric errors can lead to slight inaccuracies of state estimation. This is because biases are usually removed by single or double differencing of GNSS measurements. This solution works well when the desired accuracy for position estimation of a vehicle is in the order of meters but can be a problem when the desired accuracy is in the order of centimeters. To that end, some embodiments include state biases in the state of the vehicle and determine them as part of the state tracking provided by the probabilistic filter.

Some embodiments are based on a recognition that a multi-head measurement model enabling unsynchronized but cooperative communication with external servers can address the problem of the accuracy of state estimation when the external state estimation determined at a remote server is sufficiently accurate. However, there is still a need for that server to determine the state with the desired accuracy.

Some embodiments recognize that for an individual vehicle it can be impractical to determine accurately atmospheric time delays, as for an individual vehicle the probabilistic filter needs to resolve both uncertainties in the integer ambiguity and the atmospheric delays. However, atmospheric delays are similar for vehicles that are sufficiently close, e.g., 2-10 km, to each other. Hence, for an external active module gathering similar information from multiple vehicles, there is significant overlap between states of different vehicles, such that the external measurement module can update the state of an individual vehicle in manners that the probabilistic filter of the individual vehicle cannot. For example, ionospheric state biases can be shared among vehicles in proximity to each other.

Additionally or alternatively, some embodiments are based on the realization that the inaccuracy of state estimation determined by the probabilistic filters can be caused by the ambiguities and residual delays, but also by measurement noise. Some embodiments are based on the realization that when the states of multiple vehicles are determined cooperatively, the states of the vehicle may or may not overlap, the ambiguities or delays may or may not overlap, but the measurement noise of different vehicles have a correlation that can be explored by cooperative state estimation. For example, errors in the measurements of different pairs of vehicles can be related to each other.

To that end, some embodiments perform probabilistic tracking of multiple vehicles based on an augmented probabilistic filter that combines information from different vehicles into the augmented domain. For example, the augmented probabilistic filter fuses the states of the multiple vehicles into an augmented state, fuses the measurements of satellite signals of the multiple vehicles into an augmented measurement of the augmented state subject to augmented measurement noise defined by a non-diagonal covariance matrix. This non-diagonal covariance matrix has non-zero off-diagonal elements capturing the correlation between the measurement noise of different vehicles. This correlation is the additional information that the augmented probabilistic filter can explore for jointly tracking states of multiple vehicles.

In some embodiments, the probabilistic filter is a mixed-integer least-squares Kalman filter, where the nonlinear measurement equation is linearized around its current estimate, resulting in a mixed-integer extended Kalman filter. Other embodiments recognize that the linearization in the EKF may be inaccurate. Hence, in some embodiments, the probabilistic filter is a mixed-integer linear regression Kalman filter. Such a filter more accurately represents the first and second moment of the probabilistic distribution but is significantly more expensive computationally.

In one embodiment, it is recognized that parts of the state of a vehicle, e.g., integer ambiguity, is linear in the model but the position is nonlinear. Hence, parts of the first and second moment can be determined analytically, whereas others are estimated with a linear-regression Kalman filter.

The GNSS positioning problem can be seen as the mixed-integer GNSS positioning problem solving a mixed-integer problem of ever-increasing size (with new integer biases included in each time-step), and careful considerations need to be made in how to best relax this estimation problem to make the resulting algorithm implementable. Especially for the external estimation of the state when combining information from multiple vehicles, the resulting estimation problem will be very high-dimensional and therefore computationally expensive.

In some embodiments, the relaxation is solved by determining two related but separate probabilistic distributions, wherein one distribution only considers real-valued parameters, i.e., ignores that the ambiguities are in fact integers, and the second distribution is determined based on an integer ambiguity determined from the first distribution by solving an optimization problem.

Accordingly, one embodiment discloses a server for jointly tracking states of multiple vehicles, wherein a state of each vehicle includes one or multiple state biases capturing residual errors in atmospheric delays, the server comprising: at least one processor; and the memory having instructions stored thereon that, when executed by the at least one processor, causes the server to: receive multiple transmissions from the multiple vehicles, each transmission from a vehicle includes the measurements of satellite signals received at the vehicle and parameters of a probabilistic distribution of the state of the vehicle; fuse the states of the multiple vehicles defined by the parameters of the corresponding probabilistic distributions into an augmented state of the multiple vehicles; fuse the measurements of satellite signals of the multiple vehicles into an augmented measurement of the augmented state subject to augmented measurement noise defined by a non-diagonal covariance matrix with non-zero off-diagonal elements, each non-zero off-diagonal elements relating errors in the measurements of a pair of corresponding vehicles; execute a probabilistic filter updating the augmented state based on the augmented measurement subject to the augmented measurement noise; and fuse the parameters of the probabilistic distribution of the state of at least some of the multiple vehicles with a corresponding portion of the updated augmented state to output the fused parameters of the probabilistic distribution of the state of at least some of the multiple vehicles.

BRIEF DESCRIPTION OF THE DRAWINGS

FIG. 1C shows the various variables that are used alone or in combination in the modeling of the motion and/or measurement model according to some embodiments.

DETAILED DESCRIPTION

Figure 1A:
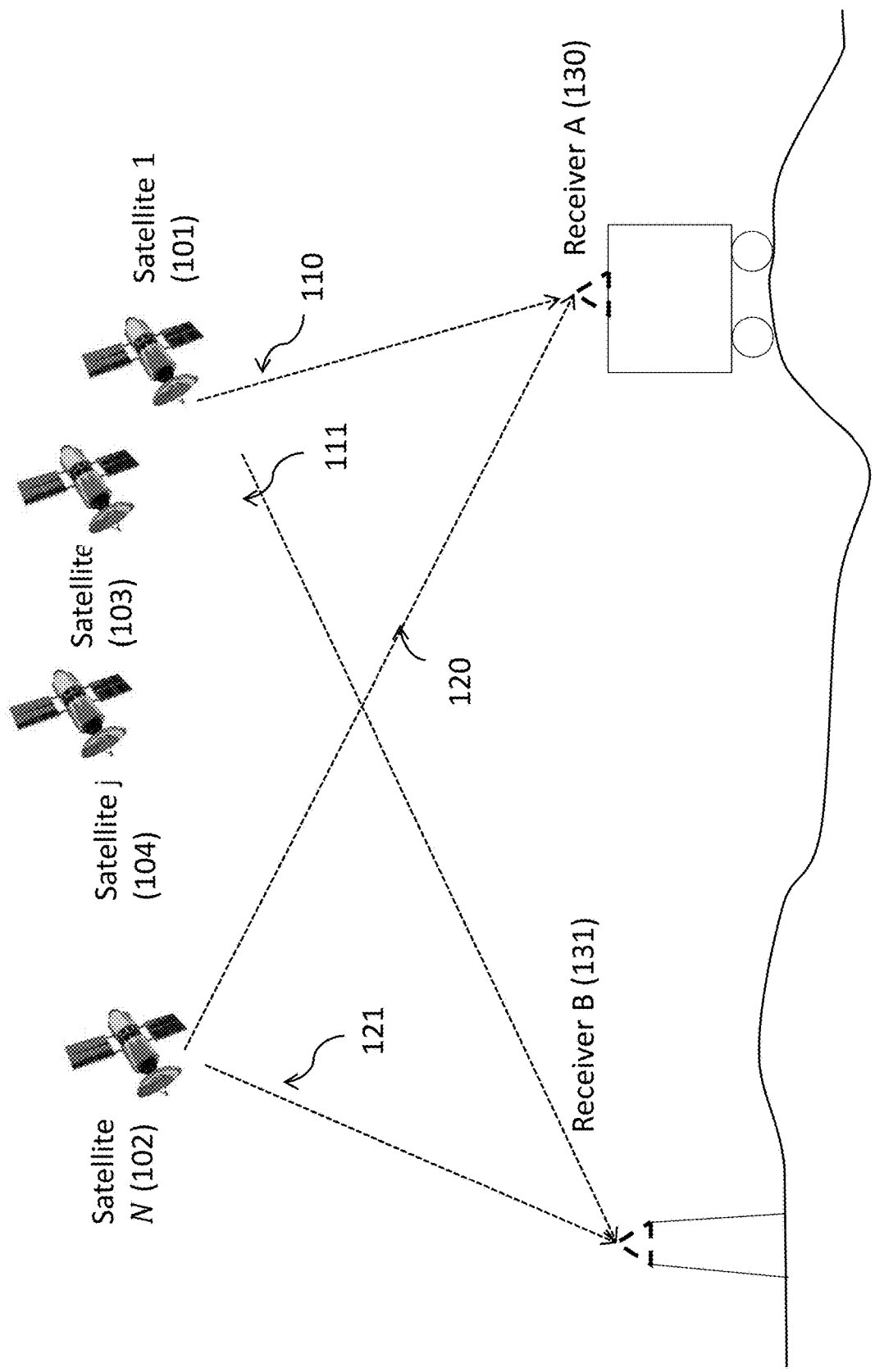
FIG. 1A shows a schematic of a global navigation satellite system (GNSS) according to some embodiments.

FIG. 1A shows a schematic of a global navigation satellite system (GNSS) according to some embodiments. For instance, the Nth satellite 102 transmits 120 and 121 code and carrier phase measurements to a set of receivers 130 and 131. For example, receiver 130 is positioned to receive signals 110, 120, from N satellites 101, 103, 104, and 102. Similarly, receiver 131 is positioned to receive signals 121 and 111 from the N satellites 101, 103, 104, and 102.

In various embodiments, the GNSS receivers 130 and 131 can be of different types. For example, in the exemplar embodiment of FIG. 1A, receiver 131 is a base receiver, whose position is known. For instance, receiver 131 can be a receiver mounted on the ground. In contrast, receiver 130 is a mobile receiver configured to move. For instance, the receiver 130 can be mounted in a cell phone, a car, or a tablet. In some implementations, the second receiver 131 is optional and can be used to remove, or at least decrease, uncertainties and errors due to various sources, such as atmospheric effects and errors in the internal clocks of the receivers and satellites. In some embodiments, there are multiple GNSS receivers receiving code and carrier phase signals.

Figure 1B:
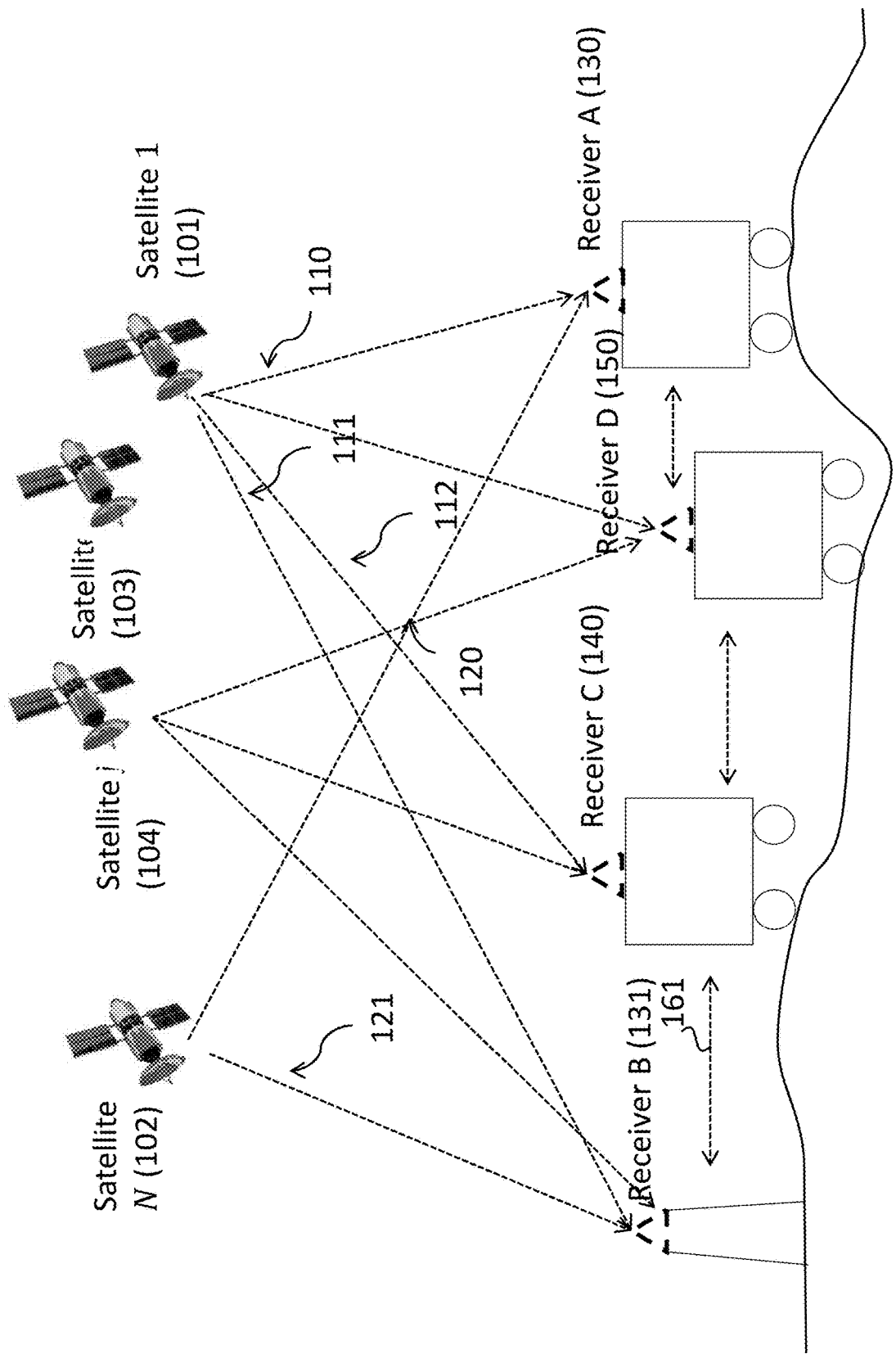
FIG. 1B shows an example when there are two additional vehicles 140 and 150 equipped with GNSS receivers.

FIG. 1B shows an example when there are two additional vehicles 140 and 150 equipped with GNSS receivers. The satellites can transmit code and carrier phase signals to several receivers, such that the receivers share the same source of the code and carrier phase signals. For example, satellite 104 can transmit signals to both receiver 140 and receiver 150, and satellite 101 can transmit signals to both receivers 130, 140, and 150. Additionally or alternatively, the receivers of GNSS signals can exchange information with each other on radio waves 161.

It is an objective of some embodiments to disclose a system and method for improving the satellite-based tracking of a state of the vehicle, wherein the vehicle is equipped with a GNSS receiver. It is another objective to provide such a system and method using unsynchronized cooperation of information received from satellite signals. It is yet another objective of some embodiments to provide such a system and method that is probabilistic, i.e., it accounts for probabilistic disturbances and error sources. It is an objective of other embodiments to track the state of a vehicle using different information from different sources and not only rely on satellite signals. For example, in some embodiments, the state of the vehicle is tracked using GNSS signals received from satellites using a GNSS receiver and a first and second moment of the probabilistic distribution of the state of the vehicle received from a remote server using a radio frequency (RF) receiver.

Additionally, or alternatively, it is an objective of some embodiments to provide filters that are probabilistic. The filters are probabilistic filters such as state estimation filters, providing state estimates based on a motion model and a measurement model.

An example of a state estimator is a Kalman filter, which uses a series of measurements observed over time, containing statistical noise and other inaccuracies, and produces estimates of unknown variables that tend to be more accurate than those based on a single measurement alone, by estimating a joint probability distribution over the variables for each time frame. The Kalman filter keeps track of the estimated state of the system and the uncertainty of the estimate. The estimate is updated using the motion model of state transitions and the measurements. Some embodiments use a Kalman filter-based system with a motion model subject to process noise of a GNSS receiver and a measurement model of satellite signals subject to measurement noise. In some embodiments, the measurement model is probabilistic and multi-head, i.e., includes multiple paths producing different types of outputs. In some implementations, the multi-head measurement model includes two heads. The first head relates measurements of the satellite signals with a belief on a state of the vehicle subject to measurement noise, and wherein the second head relates an estimation of the state of the vehicle with the belief on the state of the vehicle subject to estimation noise. Hence, the measurement model includes different information and different types of noise but having a similar structure acceptable by the probabilistic filter allowing the use of outputs of different heads either individually or jointly.

In such a manner, in some embodiments, the probabilistic filter propagates recursively, at each update step, the parameters of the probabilistic distribution of the state of the vehicle according to a motion model of state transitions of the vehicle subject to process noise and updates the parameters of the probabilistic distribution upon receiving outputs of one or a combination of the first head of multi-head measurement model and the second head of multi-head measurement model.

In some embodiments, the model of the motion of a receiver is a general-purpose kinematic constant-acceleration model with the state vector $x_k=[p_{r,k}\ v_{r,k}\ a_{r,k}]^T$, where the three components are the position, velocity, and acceleration of the receiver. In some other embodiments, the time evolution ambiguity of propagation of the satellite signals is modeled as $n_{k+1}n_k+w_{n,k}$, $w_{n,k}\sim N(0, Q_n)$ where $n_{k+1}$ is the ambiguity and $w_{n,k}$ is the Gaussian process noise with covariance $Q_n$.

In some embodiments, ambiguity is included in the state of the vehicle. Other embodiments also include bias states capturing residual errors in the atmospheric delays, e.g., ionospheric delays. For receivers sufficiently close to each other, the ionospheric delays are the same, or very similar, for different vehicles. Some embodiments utilize this to relationships to resolve these delays and/or ambiguities.

Some embodiments capture the carrier and code signals in the measurement model $y_k=h_k+\lambda \bar{n}_k+e_k$, where $e_k$ is the measurement noise, h is a nonlinear part of the measurement equation dependent on the position of the receiver, n is the integer ambiguity, $\lambda$ is a wavelength of the carrier signal, and y is a single or double difference between a combination of satellites K.

In some embodiments, the probabilistic filter uses the carrier phase single difference (SD) and/or double difference (DD) for estimating a state of the receiver indicating a position of the receiver. When a carrier signal transmitted from one satellite is received by two receivers the difference between the first carrier phase and the second carrier phase is referred to as the single difference (SD) in the carrier phase. Alternatively, the SD can be defined as the difference between signals from two different satellites reaching a receiver. For example, the difference can come from a first and a second satellite when the first satellite is called the base satellite. For example, the difference between signal 110 from satellite 101 and signal 120 from satellite 102 is one SD signal, where satellite 101 is the base satellite. Using pairs of receivers, 131 and 130 in FIG. 1A, the difference between SDs in the carrier phase obtained from the radio signals from the two satellites is called the double-difference (DD) in the carrier phase. When the carrier phase difference is converted into the number of wavelength, for example, $\lambda=19$ cm for L1 GPS (and/or GNSS) signal, it is separated by fractional and integer parts. The fractional part can be measured by the positioning apparatus, whereas the positioning device is not able to measure the integer part directly. Thus, the integer part is referred to as integer bias or integer ambiguity.

In general, a GNSS can use multiple constellations at the same time to determine the receiver state. For example, GPS, Galileo, Glonass, and QZSS can be used concurrently. Satellite systems typically transmit information at up to three different frequency bands, and for each frequency band, each satellite transmits a code measurement and a carrier-phase measurement. These measurements can be combined as either single differenced or double differenced, wherein a single difference includes taking the difference between a reference satellite and other satellites, and wherein double differencing includes differencing also between the receiver of interest and a base receiver with a known static location.

FIG. 1C shows the various variables that are used alone or in combination in the modeling of the motion and/or measurement model according to some embodiments. Some embodiments model the carrier and code signals for each frequency with the measurement model $$P_k^j = \rho_k^j + c(\delta t_{r,k} - \delta t_k^j) + I_k^j + T_k^j + \varepsilon_k^j, \qquad (1)$$

$$\Phi_k^j = \rho_k^j + c(\delta t_{r,k} - \delta t_k^j) - I_k^j + T_k^j + \lambda n^j + \eta_k^j, \qquad (2)$$

where $P^j$ is the code measurement $\rho^j$ is the distance between the receiver and the j th satellite, c is the speed of light, $\delta_r$ is the receiver clock bias, $\delta t^j$ is the satellite clock bias, $I^j$ is the ionospheric delay, $T^j$ is the tropospheric delay, $\varepsilon^j$ is the probabilistic code observation noise, $\Phi^j$ is the carrier-phase observation, $\lambda$ is the carrier wavelength, $n^j$ is the integer ambiguity, and $\eta^j$ is the probabilistic carrier observation noise.

In one embodiment, the original measurement model is transformed by utilizing a base receiver b mounted at a known location broadcasting to the original receiver r, most of the sources of error can be removed. For instance, one embodiment forms the difference between the two receivers 130 and 131 in FIG. 1A as $\Delta P_{br,k}^j = P_{b,k}^j - P_{r,k}^j$ and $\Delta\Phi_{br,k}^j = \Phi_{b,k}^j - \Phi_{r,k}^j$, from which the error due to the satellite clock bias can be eliminated. Another embodiment forms a double difference between two satellites j and l. Doing in such a manner, clock error terms due to the receiver can be removed. Furthermore, for short distances between the two receivers (e.g., 30 km), the ionospheric errors can be ignored, at least when centimeter precision is not needed, leading to $\nabla\Delta P_{br,k}^{jl} \approx \nabla\Delta\rho_{br,k}^{jl} + \nabla\Delta\varepsilon_{br,k}^{jl}$, $\nabla\Delta\Phi_{br,k}^{jl} \approx \nabla\Delta\rho_{br,k}^{jl} + \lambda\nabla\Delta n_{br}^{jl} + \nabla\Delta\eta_{br,k}^{jl}$. Alternatively, one embodiment forms the difference between two satellites 101 and 102, leading to SD measurements.

Additionally or alternatively, some embodiments are based on the realization that ignoring state biases such as ionospheric errors can lead to slight inaccuracies of state estimation. This is because biases are usually removed by single or double differencing of GNSS measurements. This solution works well when the desired accuracy for position estimation of a vehicle is in the order of meters but can be a problem when the desired accuracy is in the order of centimeters. To that end, some embodiments include state biases in the state of the vehicle and determine them as part of the state tracking provided by the probabilistic filter.

Figure 1D:
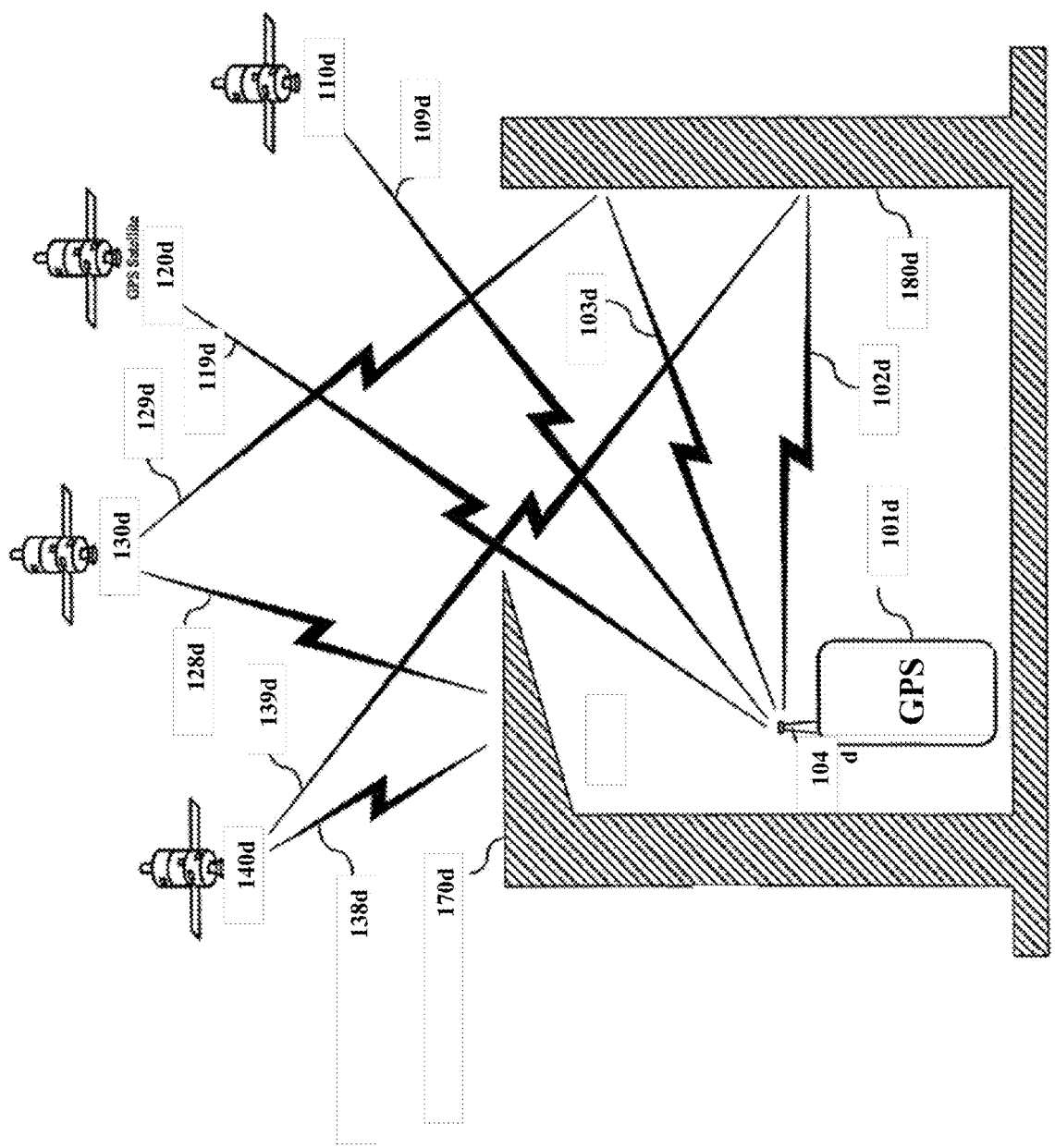
FIG. 1D shows an illustration of a scenario where multipath disturbs the signals for the receiver.

In certain scenarios, e.g., deep urban canyons, there are multiple distortions of satellite signals such that the information contained in the code and carrier phase signals makes it difficult to perform high-precision state estimation. For instance, FIG. 1D shows an illustration of a scenario where a multipath disturbs the signals for the receiver 101d. the receiver 101d receives various signals 109d and 119d from satellites 110d and 120d. There are other satellites 130d and 140d that transmit signals 128d, 129d, 138d, 139d, but due to an obstruction 170d, for instance, a building in urban areas, these signals are not directly transmitted to the receiver.

Previously, the signal 138d sent from the satellite 140d was not available, but suddenly the satellite signal 139d reaches the receiver after a multipath 102d. Such a scenario can severely detriment the performance of the probabilistic filter in tracking the state of the vehicle, because the estimator locks on to the wrong ambiguity estimate, thus causing a large estimation error. However, there might be other receivers nearby that don't have such an issue, e.g., one receiver may have multipath and few visible satellites due to being shadowed by a large building, whereas a vehicle several blocks away has good estimation performance. In some embodiments, this is utilized by updating the parameters of the probabilistic distribution in the probabilistic filter by using measurements from a GNSS measurement module as well as remote estimates of the state of the vehicle, wherein the remote estimates are determined by using data from multiple vehicles.

Figure 1E:
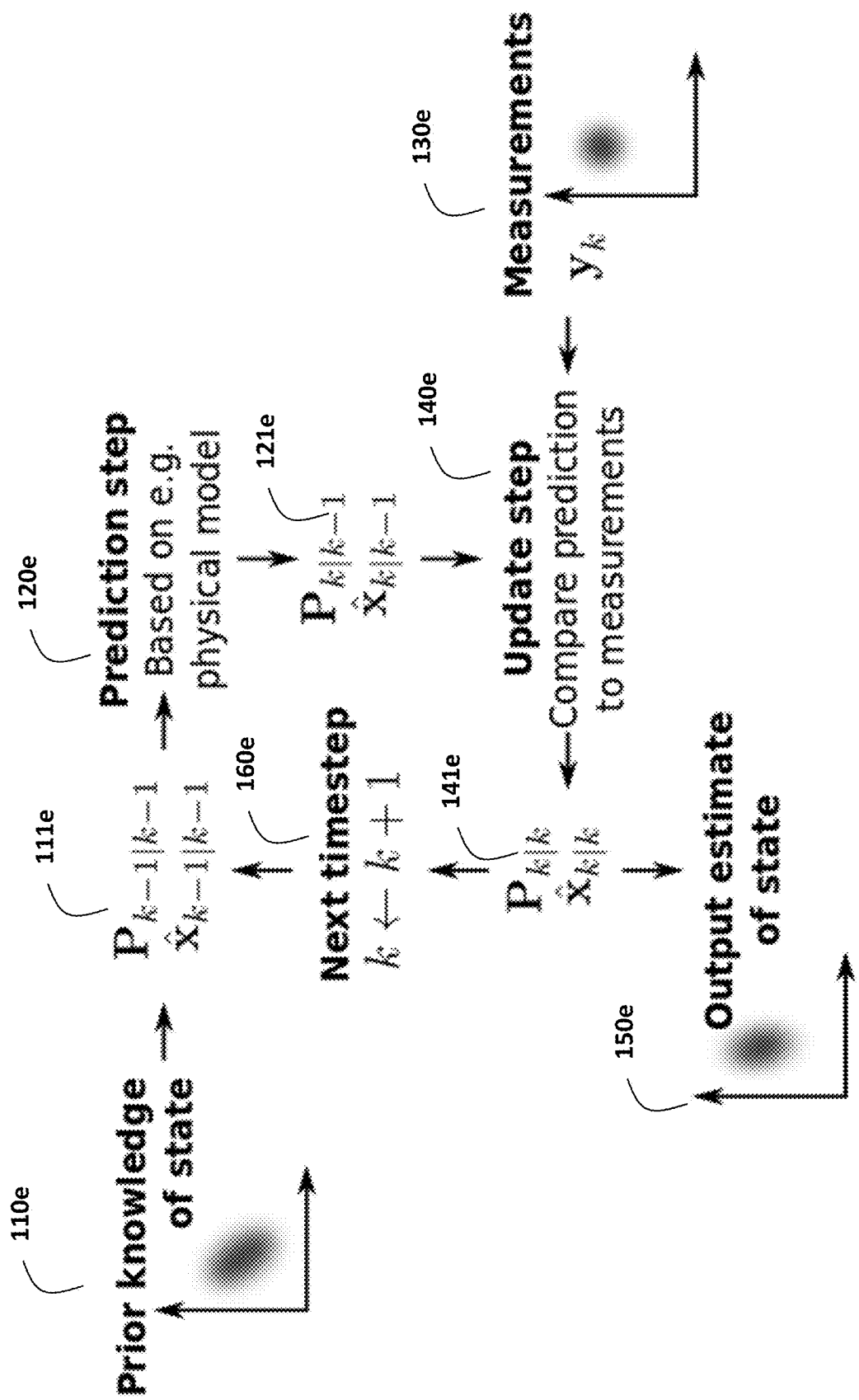
FIG. 1E shows a conceptual diagram of a probabilistic filter used by some embodiments.

An example of a probabilistic filter is the Kalman filter. FIG. 1E shows a schematic of the Kalman filter (KF) used by some embodiments for state estimation. The KF is a tool for state estimation in linear state-space models, and it is the optimal estimator when the noise sources are known and Gaussian, in which case also the state estimate is Gaussian distributed. The KF estimates the mean and variance of the Gaussian distribution, because the mean and the variance are the two required quantities, sufficient statistics, to describe the Gaussian distribution.

The KF starts with an initial knowledge 110e of the state, to determine a mean of the state and its variance 111e. The KF then predicts 120e the state and the variance to the next time step, using a model of the system, such as the motion model of the vehicle, to obtain an updated mean and variance 121e of the state. The KF then uses a measurement 130e in an update step 140e using the measurement model of the system, to determine an updated mean and variance 141e of the state. An output 150e is then obtained, and the procedure is repeated for the next time step 160e.

Some embodiments employ a probabilistic filter including various variants of KFs, e.g., extended KFs (EKFs), linear-regression KFs (LRKFs), such as the unscented KF (UKF). Even though there are multiple variants of the KF, they conceptually function as exemplified by FIG. 1E. Notably, the KF updates the first and second moment, i.e., the mean and covariance, of the probabilistic distribution of interest, using a measurement 130e described by a probabilistic measurement model. In some embodiments, the probabilistic measurement model is a multi-head measurement model structured to satisfy the principles of measurement updates in the KF.

Some embodiments are based on the recognition that the outputs of different heads of the multi-head measurement model of some embodiments need not be synchronous, allowing the signals to be received at different time steps. Other embodiments are based on the understanding that to execute a KF as is, the measurement model needs to be structured such that the KF can accept the measurement model.

Figure 1F:
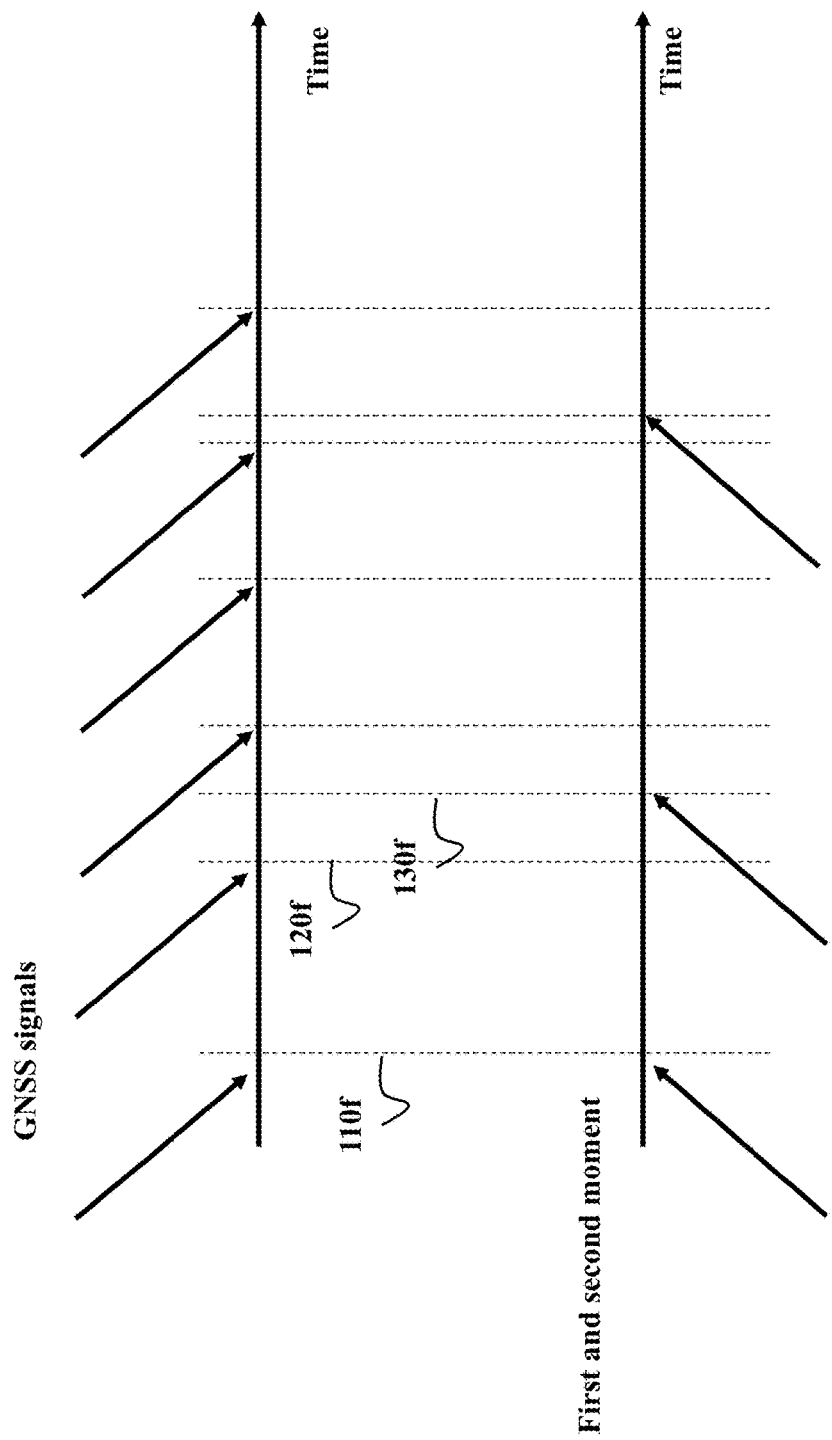
FIG. 1F shows an illustration of asynchronous receiving of different signals according to some embodiments.

FIG. 1F shows an illustration of asynchronous receiving of different signals according to some embodiments. As time progresses, the GNSS signals are received at certain time steps, and the first and second moments are received at some other time steps. For example, the GNSS signal and first and second moment are both received at time 110f. However, the second GNSS signal is received at time 120f, whereas the second receiving the first and second moment are received at time 130f. I.e., sometimes the signals are received at the same time, sometimes they are not. In order to process such signals possibly received at different time steps, the measurement model is structured to be on a form such that different signals can be used in the KF independently from each other.

To that end, in some embodiments, the measurement model is probabilistic and multi-head, i.e., includes several parts, wherein the first head relates measurements of the satellite signals with a belief on a state of the vehicle subject to measurement noise, and wherein the second head relates an estimation of the state of the vehicle with the belief on the state of the vehicle subject to estimation noise. Hence, the measurement model includes different information and different types of noise.

In one embodiment the first head of the measurement model subject to measurement noise is used to associate GNSS measurements with a belief of the state of the vehicle, whereas the second head of the measurement model subject to measurement noise is used to associate an estimate of the state of the vehicle with the belief of the state of the vehicle received by other means.

Some embodiments are based on the principles of processing the measurements using the measurement model to correct and update 140e the first and second moment using the measurement 130e and the measurement model. To use a KF, the measurement model and measurement noise must be written in a probabilistic form such that they can be processed in a balanced way, such that the measurements do not scale the first and second moments incorrectly.

Other embodiments are based on a recognition that the probabilistic structure needs to be reconciled among the first and second heads of the measurement model. Specifically, regardless of whether the update step 140e of the probabilistic distribution of the state of the vehicle is done using the GNSS signals or the received estimation of the state of the vehicle and the estimation noise, e.g., represented as first and second moment, the outputs have the same structure.

Figure 1G:
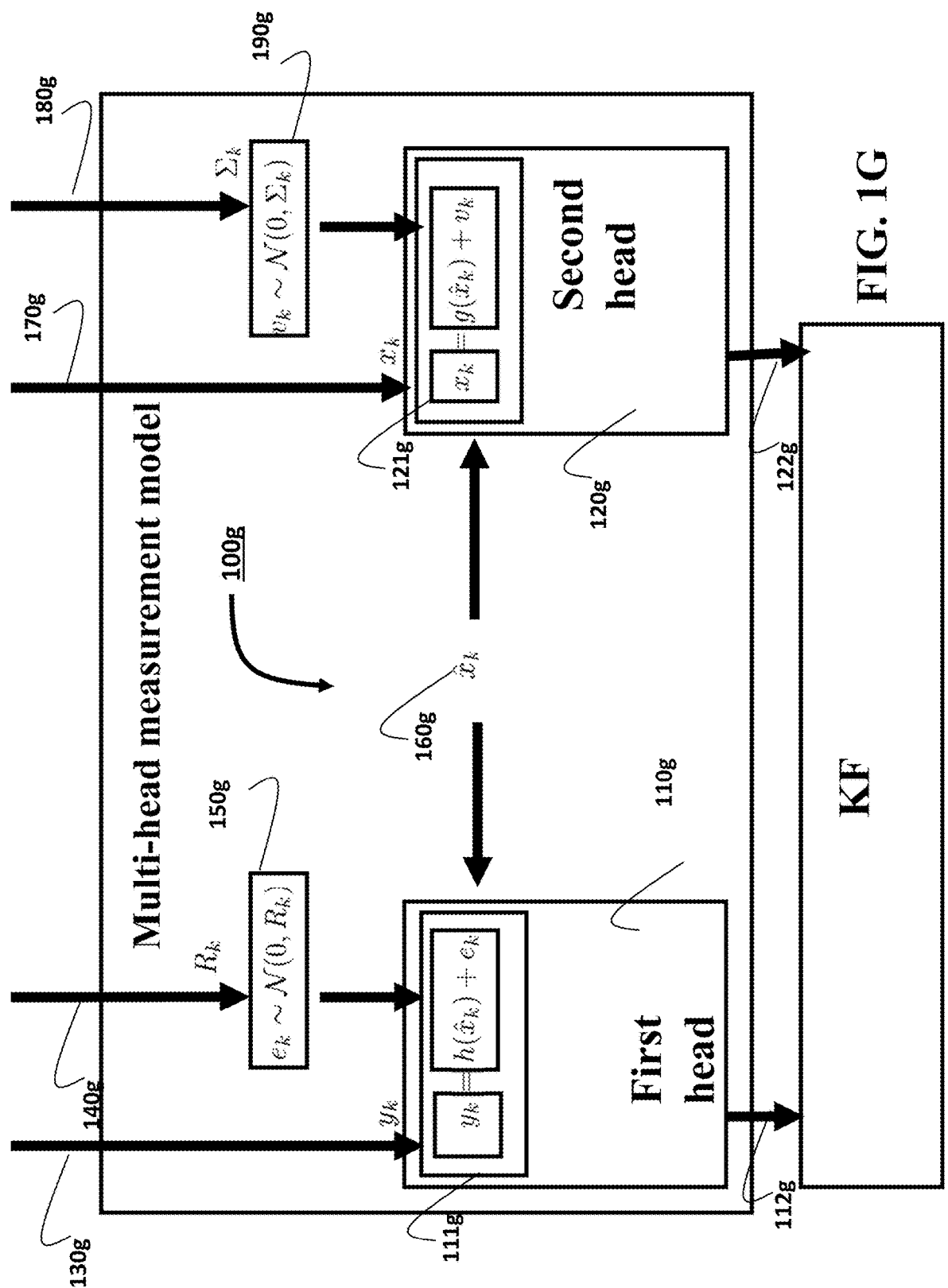
FIG. 1G shows an illustration of the structure of the multi-head measurement model according to some embodiments.

FIG. 1G shows an illustration of the structure of the multi-head measurement model 100g according to some embodiments. The multi-head measurement model accepts inputs, relates GNSS measurements to the belief of the state of the vehicle using the first head 110g of the measurement model and alternative estimates of the state of the vehicle to the belief of the state of the vehicle using the second head 120g. For example, the multi-head measurement model accepts GNSS measurements 130g and measurement noise 140g. Then, the multi-head measurement model transforms the measurement noise 140g to a second moment representing 150g the measurement noise. For example, the measurement noise is represented 150g using a Gaussian distribution having zero mean and covariance $R_k$. Using the representation 150g of measurement noise, the first head 110g relates 111g the measurement 130g with the belief 160g of the state of the vehicle. The output 112g from the first head of the measurement model is on a form that can be accepted by the KF. For example, in one embodiment the output 112g is the relation 111g described as an error between the measurement and the belief of the state inserted into the measurement model and the measurement noise. In another embodiment, the output 112g is the relation 111g decomposed into the measurement, the belief of the state inserted into the measurement model, and the measurement noise covariance.

In one embodiment, the inputs to the second head of the measurement model are the estimate 170g of the state of the vehicle and estimation noise 180g. The multi-head measurement model transforms 190g the estimation noise to the same format as the transforming 150g. For example, if the measurement noise is described by a Gaussian distribution, the estimation noise needs to be described by a Gaussian distribution. Using the estimation of the state and the representation 190g of estimation noise, the second head 120g relates 121g the estimate to the belief 160g of the state of the vehicle. In some embodiments the relating is an affine relation $x_k = \hat{x}_k + v_k$, wherein $v_k$ is the estimation noise represented on a particular form and $\hat{x}_k$ is the belief of the state of the vehicle, e.g., represented by the first moment determined by the probabilistic filter or a sample of the distribution determined by the probabilistic filter.

Some embodiments are based on the understanding that the representation of the outputs 112g and 122g on the same probabilistic form enables the updating in the KF done in the same principles irrespective of whether the updating information is 112g or 122g, i.e., whether the information arises from the first head or the second head.

Figure 1H:
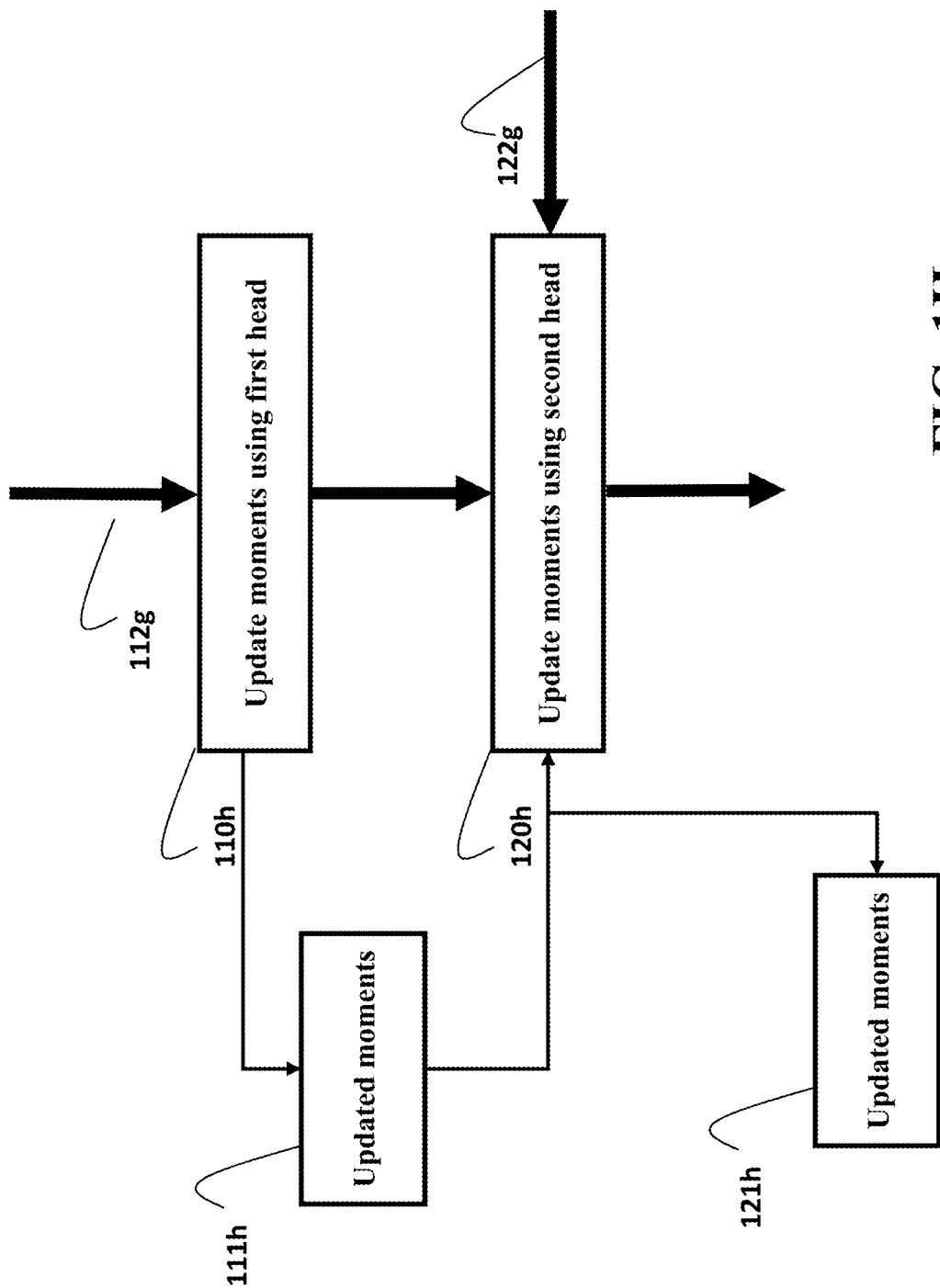
FIG. 1H shows a flowchart of an example of how to update the first and second moment of state estimation at a time instance according to one embodiment.

Other embodiments are based on the recognition that the update using the first and head and the update using the second head can be done sequentially or jointly. FIG. 1H shows a flowchart of an example of how to update the first and second moment at a time instance according to one embodiment. Using the output 112g from the multi-head measurement model, the method updates 110h the first and second moment using the first head of the measurement model. The updated moments 111h are then updated 120h again using the output 122g from the second head, resulting in the updated moments 121h.

Figure 1I:
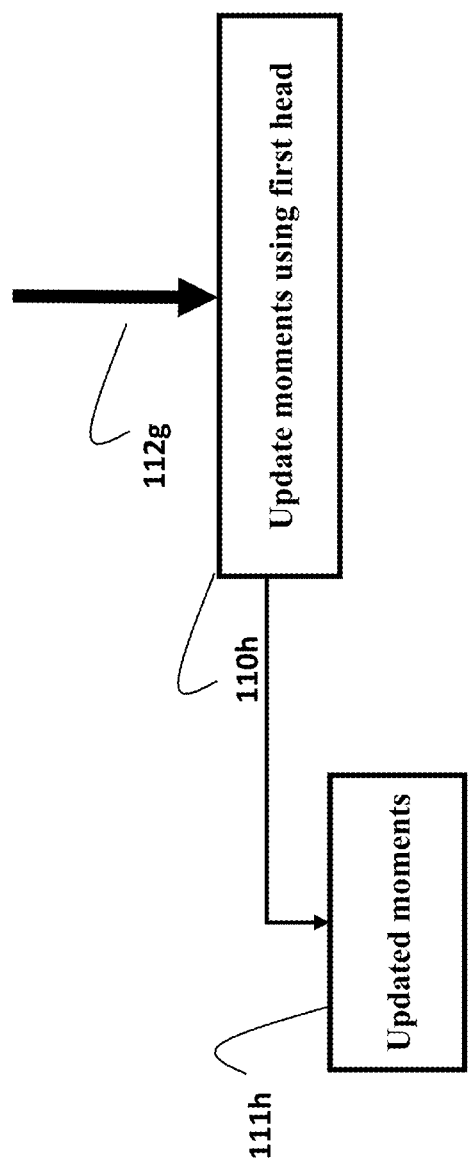
FIG. 1I shows another flowchart of a method for updating the first and second moment of state estimation according to another embodiment.

Other embodiments are based on the understanding that the GNSS measurements and received estimation of the state of the vehicle and estimation noise may not be received at the same time instance, as exemplified in FIG. 1F. FIG. 1I shows another flowchart of a method for updating the first and second moment, e.g., using a KF. Using the output 112g from the first head of the measurement model, the method updates 110h the moment 111h.

Figure 1J:
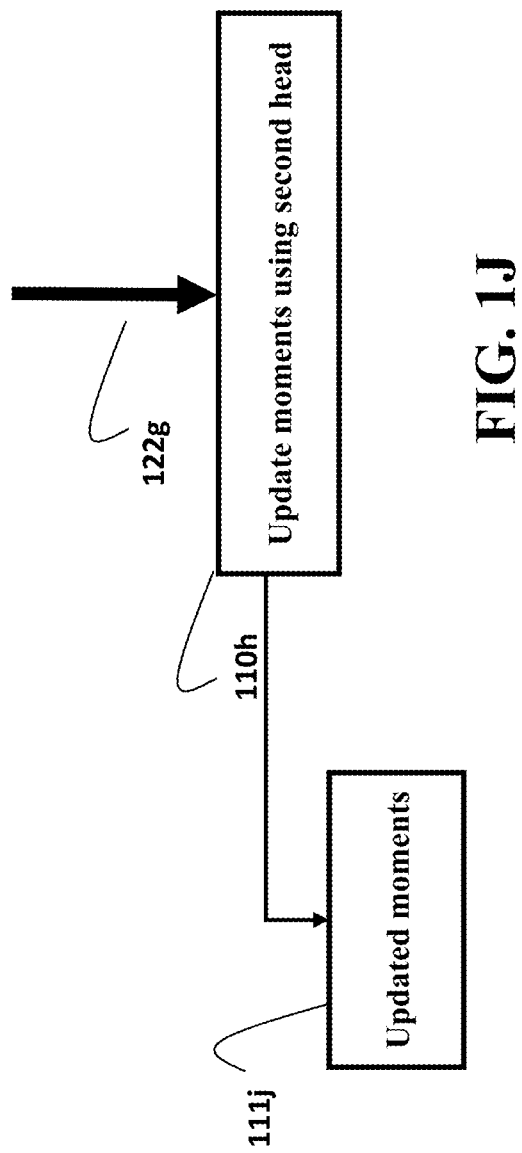
FIG. 1J shows a reversed situation, where only the first and second moment of state estimation have been received at a particular time instance according to another embodiment.

FIG. 1J shows a reversed situation, where only the first and second moments have been received at a particular time instance. Hence, one embodiment updates 110h the moments 111j using the output 122g from the second head of the measurement model.

Figure 1K:
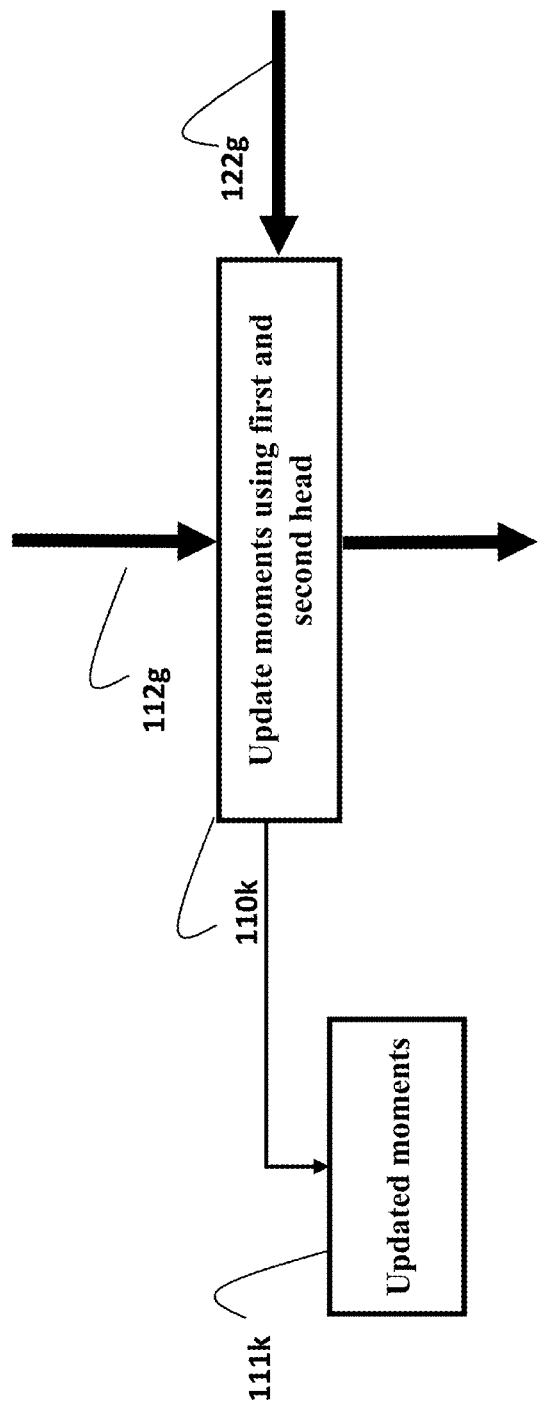
FIG. 1K shows a flowchart where the recognition that the update using the first and second head can be done jointly, i.e., simultaneously.

Other embodiments are based on the recognition that the update using the first and second head can be done jointly, i.e., simultaneously. FIG. 1K shows a flowchart of an example of such a procedure. Using the output 112g from the first head and the output 122g from the second head, the method updates 110k the moments using the first and second head, resulting in updated moments 111k. In one embodiment, the joint updating is done by stacking the two heads of measurement models, resulting in an augmented output of the measurement model. I.e., the GNSS measurement and the estimation of the state of the vehicle and associated relations are merged, resulting in a joint and large update.

Figure 2A:
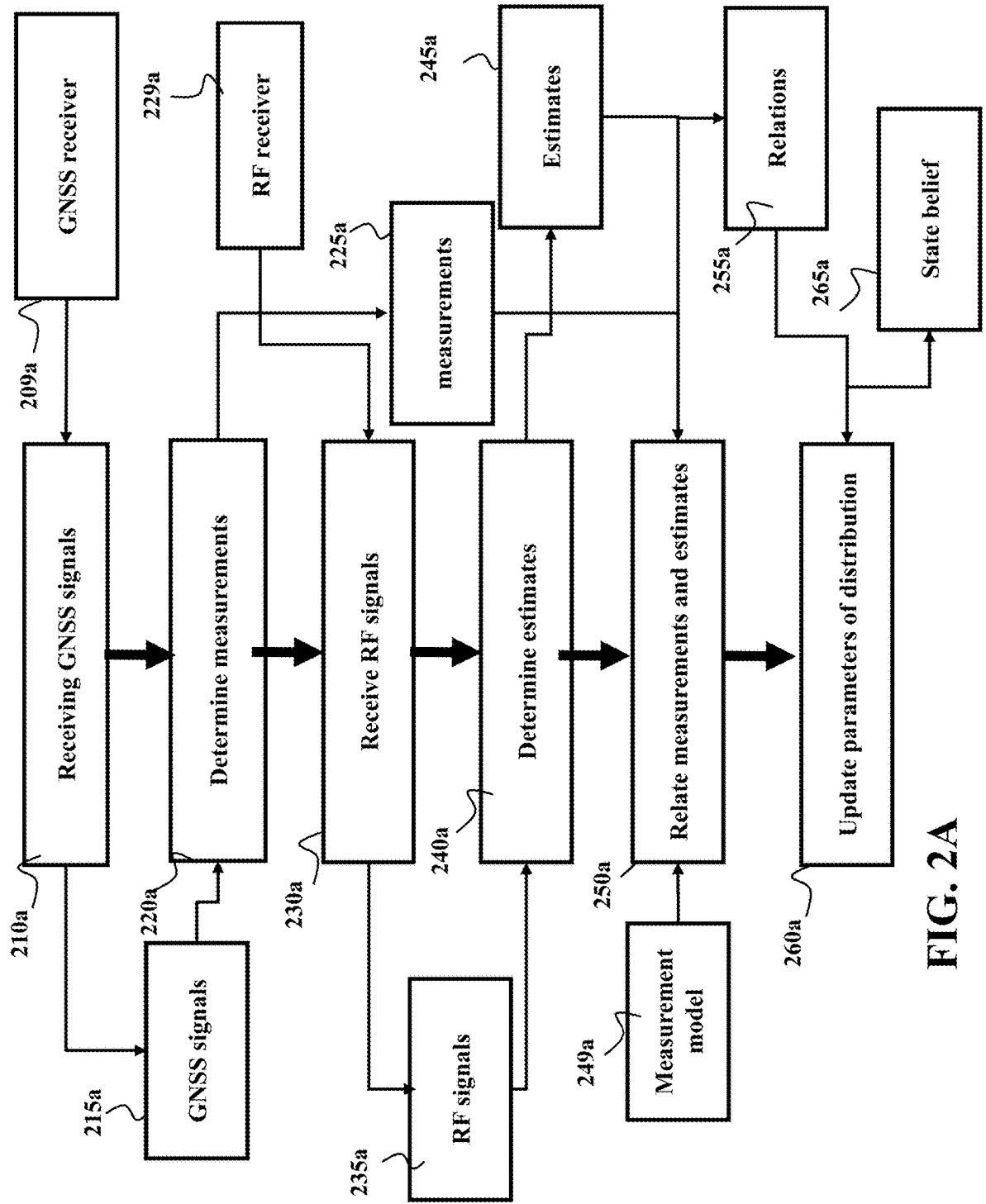
FIG. 2A shows a flowchart of a method for tracking a state of a vehicle using unsynchronized cooperation of information according to some embodiments.

FIG. 2A shows a flowchart of a method for tracking a state of a vehicle using unsynchronized cooperation of information according to some embodiments. In the embodiments, the information is received from satellite signals transmitted by a global navigation satellite system (GNSS) and also transmitted over a radio frequency (RF) channel First, the method receives 210a from a GNSS receiver 209a signals transmitted from a set of satellites 101, 102, 103, 104 according to some embodiments. The signals include a code signal and a carrier phase signal, wherein each carrier signal includes a carrier phase ambiguity as an unknown integer number of wavelengths of the carrier signal traveled between the satellite 101, 102, 103, or 104 and the vehicle 130. Using the GNSS signals 215a, the method determines 220a measurements of the satellite signals and the corresponding measurement noise 225a. The method also receives 230a from an RF receiver 229a of the vehicle via RF signals 235a the estimation of the state of the vehicle and the estimation noise determined by the external server. In various embodiments, the estimation and the estimation noise 235a are determined probabilistically as the first moment of the state of the vehicle and a second moment 235a of the state of the vehicle. Additionally or alternatively, the estimation and the estimation noise 235a can be transformed into the first moment of the state of the vehicle and a second moment of the state of the vehicle using various probabilistic techniques.

Using the first and second moment, the method determines 240a an estimate of the state of the vehicle and an associated estimation noise of the estimation of the state of the vehicle. Using the estimates 245a, measurements 225a, and a multi-head measurement model 249a, the method relates 250a the GNSS measurements 225a with a belief of the state of the vehicle using the first head of the measurement model subject to measurement noise and relates 250a the estimate of the state with the belief on the state of the vehicle subject to estimation noise using the second head of the measurement model. Using the related measurements and estimates 255a, the method updates 260a recursively parameters of the probabilistic distribution of the state of the vehicle to produce the belief 265a on the state of the vehicle.

Figure 2B:
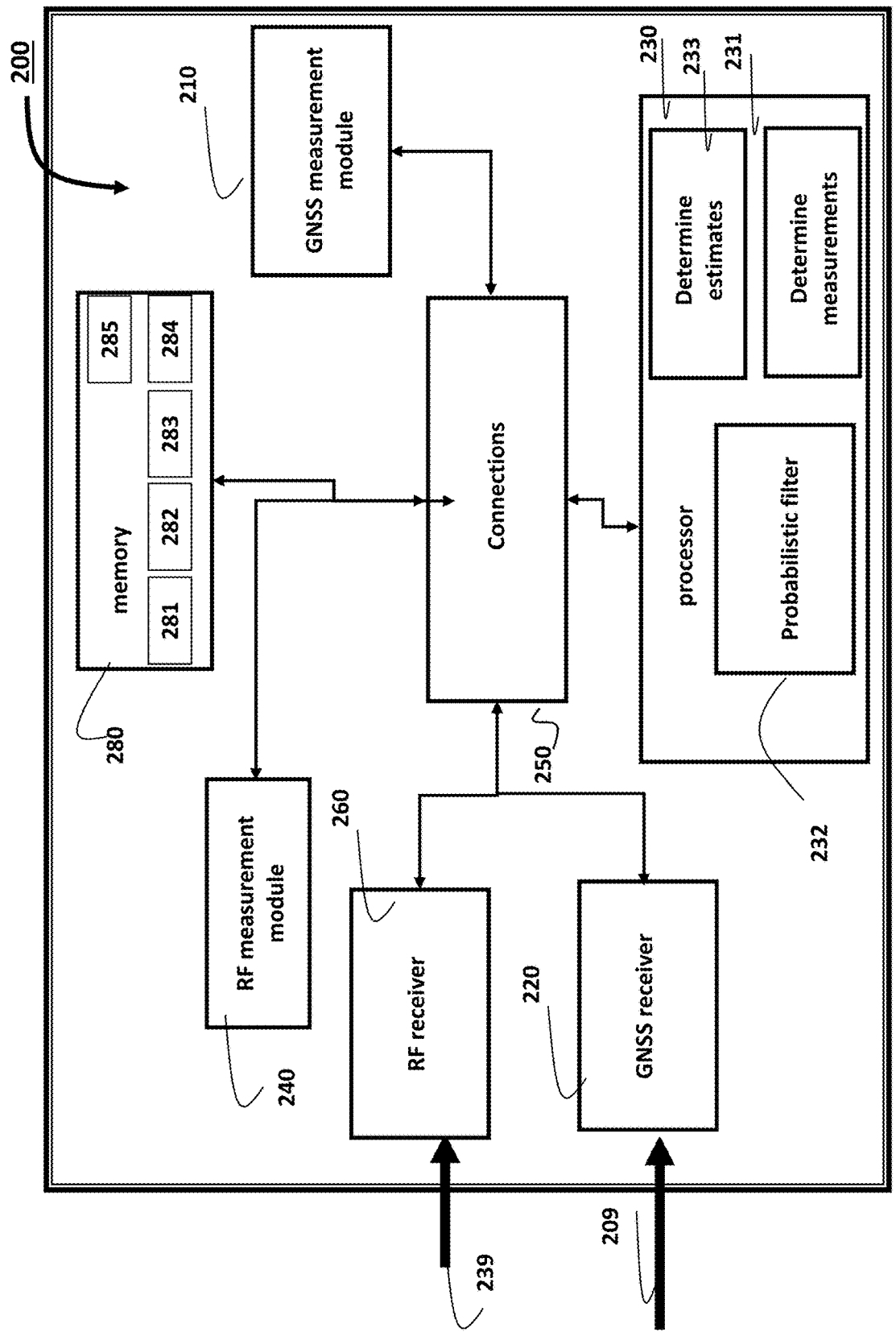
FIG. 2B shows a probabilistic system for tracking a state of a vehicle using unsynchronized cooperation of information according to some embodiments.

FIG. 2B shows a probabilistic system 200 for tracking a state of a vehicle using unsynchronized cooperation of information received from satellite signals 209 transmitted by a navigation satellite system (GNSS) and information transmitted over radio frequency (RF) channel 239 according to some embodiments. The probabilistic system includes a GNSS receiver 220 for receiving the satellite signals 209. In one embodiment, the signals include code signals, carrier phase signals, time stamps, navigation messages, and observation messages needed to determine various delays and disturbances affecting the satellite signals. For instance, the navigation message can include parameters needed to determine atmospheric delays. For example, if the Klobuchar atmospheric delay model is used, the navigation message includes parameters for determining an ionospheric time delay according to the ionosphere's effect on the signal propagation determined by the atmospheric delay model. In other embodiments, such messages can include parameters for determining the ionospheric delay according to the SBAS delay model.

The system includes a memory 280 that stores 281 a probabilistic multi-head measurement model relating incoming measurements with the state of the vehicle. In some embodiments, the multi-head measurement model consists of two heads. The first head relates measurements of the satellite signals with a belief on the state of the vehicle subject to measurement noise. The second head relates an estimation of the state of the vehicle with the belief on the state of the vehicle subject to estimation noise. The memory also stores instructions 283 on how to determine such relation, and the memory stores 284 instructions stores to execute a probabilistic filter according to some embodiments of the invention. The memory also stores 285 a probabilistic motion model relating a previous belief on the state of the vehicle with a prediction of the state of the vehicle according to the motion model. For example, the motion model can be a vehicle dynamics model, a constant acceleration model, a constant position model, a coordinated turn model, a Singer model, a kinematic vehicle model, a dynamic vehicle model, or a combination of different models.

In some embodiments, relating the measurements of the satellite signals with a belief on the state and relating the estimation of the state with the belief of the state is done by inserting said quantities into the first and second head, respectively, of the measurement model.

The GNSS receiver is operatively connected 250 to a GNSS measurement module, which, after determining the above-mentioned delays and disturbances, determines the measurements of the satellite signals and the associated measurement noise. For instance, in one embodiment the measurement noise is determined based on a nominal measurement noise stored in memory 282 scaled with a function of the elevation angle of the satellite.

The probabilistic system 200 includes an RF measurement module 240 that is operatively connected 250 to an RF receiver 260 that receives information 239 transmitted over an RF channel. In some embodiments, the information includes a first moment of the state of the vehicle. In other embodiments, the information includes the first moment and the second moment of a vehicle. In other embodiments, the information includes higher-order moments to form a general probability distribution of the state of the vehicle. In other embodiments, the information includes data indicative of an estimation of the state of the vehicle and the estimation noise, e.g., as samples, first and second moment, alternatively including higher-order moments. In yet other embodiments, the time of receiving the information is different from the time the information was determined. For example, in some embodiments, an active remote server includes instructions to determine first and second moments, and the execution of such instructions, possibly coupled with a communication time between the remote server and the RF receiver. To this end, in some embodiments, information 239 includes a timestamp of the time the first and second moments were determined.

In various embodiments, the GNSS measurement module and the RF measurement module produce their estimations that relate to the belief on the state of the vehicle at a current instance of time. For example, the GNSS signals are received and upon receiving the signals, a processor 230 determines 231 measurements at a current time step. However, in some implementations, the RF measurement module receives the first and second moments of the state of the vehicle determined for a previous time step, e.g., when said instructions of remote server take time to execute. This leads to the determined measurement and received first and second moments do not correspond to the same time instant.

To address this issue, using a motion model, some embodiments relate the first and second moments of the state of a previous time step with a belief of the state in a current time step in time to determine the estimation of the state indicative of the belief on the state of the vehicle at a current instance of time. For example, one embodiment propagates the first and second moments of the state of the vehicle in time till a current instance of time using a model of time propagation, for example, the motion model stored in memory, of the vehicle. Examples of the model of time propagation include a Singer model, a constant acceleration model, and a single-track vehicle model. Using both moments in time propagation is advantageous over propagating just a first moment because the propagation of uncertainty, hence how much the first moment should be trusted when updating the belief of the state, is taken into account. In other embodiments, the time propagation is done by a combination of a motion model of the vehicle and the measurements of the vehicle.

Some embodiments are based on a recognition that regardless of the time instance of receiving the first and the second moments of the state of the vehicle, there is a need to ensure that the estimation noise is constructed in such a way that when updating the parameters of probabilistic distribution with the estimate of the state subject to the measurement noise, the probability distribution of the belief of the state converges to the probability distribution of the received second moment of the state. Some embodiments are based on the realization that the convergence property can be ensured by balancing covariances of the received second moment and the covariances of the probabilistic distribution of the current belief of the state. In other words, the estimation of the state and associated measurement noise is determined such that the balancing preserves convergence.

In some embodiments, processor 230 executes a probabilistic filter 232 that is used to update the parameters of probabilistic distribution and determining estimates 233 of the state of the vehicle.

Some embodiments are based on understanding that it may be tempting to directly set the parameters of probabilistic distribution to match those of the received first and second moment. However, enforcing the convergence property is advantageous because it ensures that from the vehicle side, the same probabilistic filter can be used to update the parameters of the probabilistic distribution. Besides, since the vehicle may process additional measurements, for example, from additional onboard sensors of the vehicle, using the received first and second moments directly can cause discontinuities in the updated state estimates of the vehicle. When using the estimates for controlling a vehicle, such discontinuities can be detrimental because continuity of control is lost.

Figure 2C:
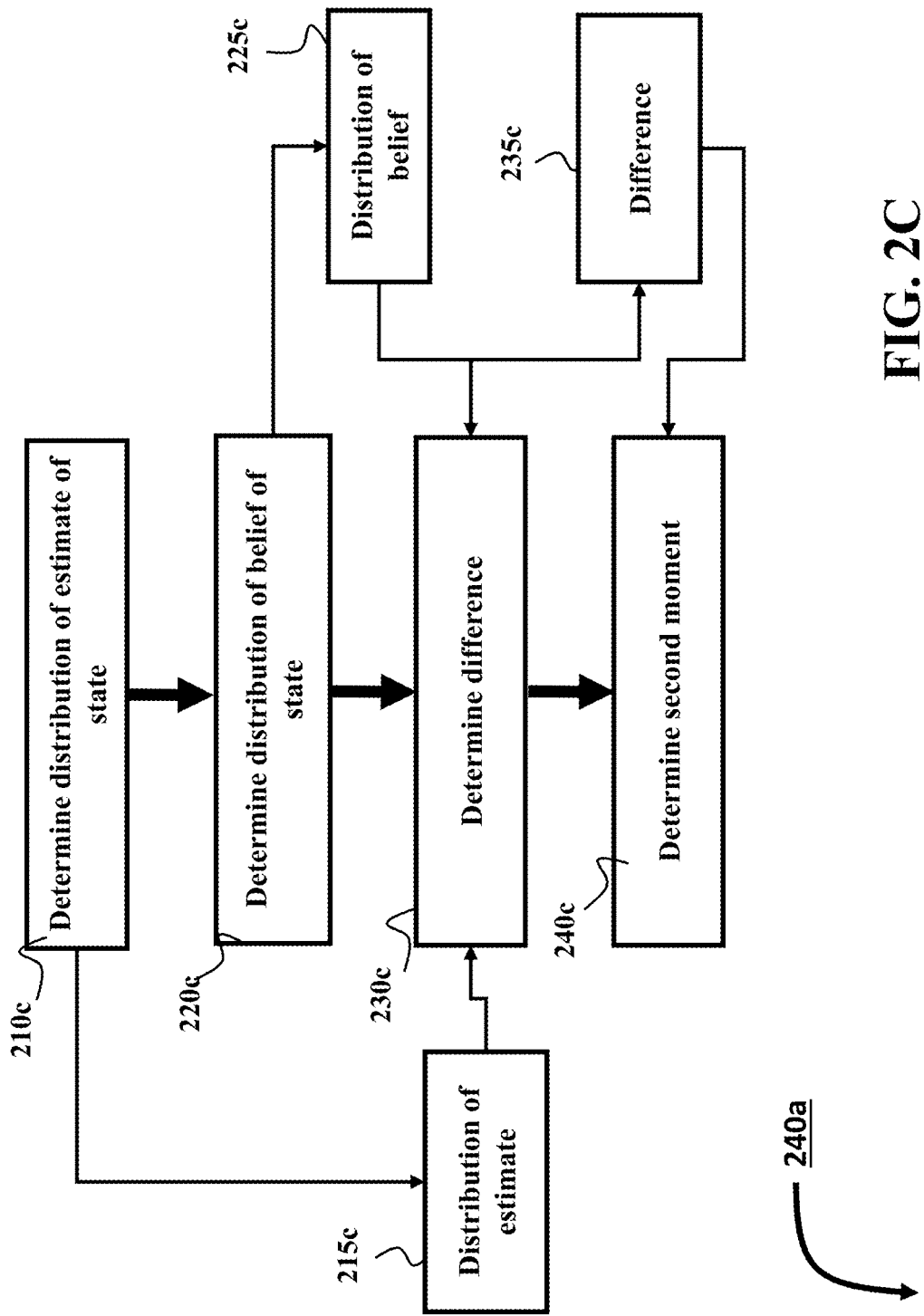
FIG. 2C shows a flowchart of an example of a method for determining 240a the estimates according to some embodiments.

FIG. 2C shows a flowchart of an example of a method for determining 240a the estimates according to some embodiments. First, based on the received information indicative of the estimation of the state of the vehicle and the estimation noise, the method determines 210c a distribution of the estimate of the state of the vehicle. For example, the method determines the distribution by inserting the first and second moment into a Gaussian probability density function. Next, the method determines 220c a distribution of the belief of the state of the vehicle. For instance, the method inserts the parameters of the probability distribution of the state of the vehicle, wherein the probability distribution is assumed to follow a predefined shape. For instance, for a Gaussian distribution, the parameters of the probability distribution are the first and second moment. For instance, assuming a student-t distribution the parameters are the first moment, scale, and degree of freedom. Using the distribution 215c of the estimation of the vehicle and the distribution 225c of the belief of the state, the method determines a difference between the distributions 215c and 225c. Using the determined difference 235c, finally, the method determines 240c a covariance of the estimation noise.

The determining 230c difference can be done in several ways. For example, for a Gaussian distribution, the difference can be defined as the amount of scaling the second moment and shifting the first moment to achieve the same distribution. In some embodiments, the difference is determined by the well-known Kullback-Leibler divergence.

Some embodiments are based on the recognition that typically the first two moments describe a distribution well, even though the underlying distribution is not Gaussian. In some embodiments, this recognition is utilized in determining 240c the covariance of the estimation noise as a weighted combination of the second moment received by the RF measurement module and the second moment of the probabilistic distribution of the state of the vehicle. In other embodiments, the estimate of the state of the vehicle is determined as a weighted combination of the belief of the state of the vehicle and the received first moment of the estimation of the state of the vehicle, wherein the weighting includes the covariance of the estimation noise.

Figure 2D:
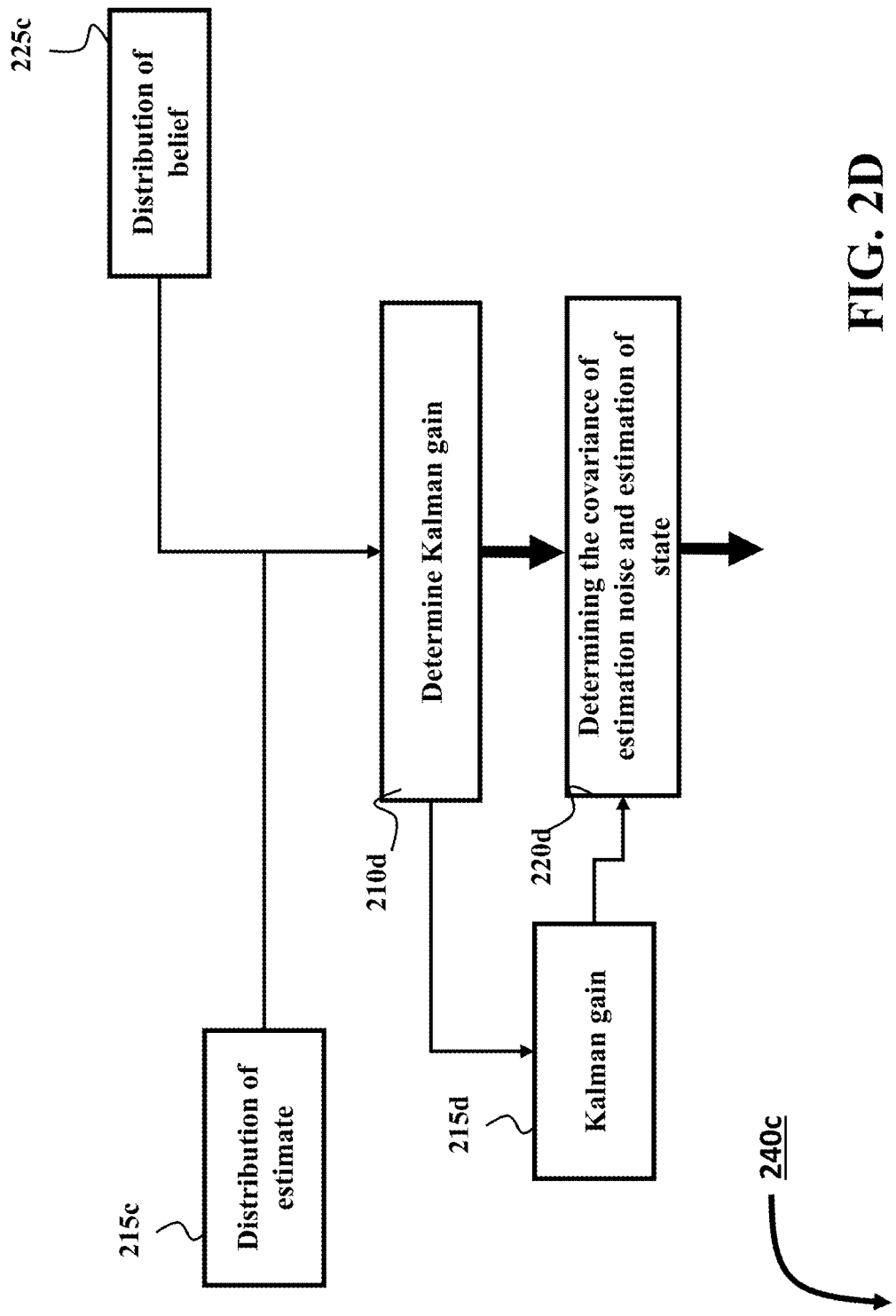
FIG. 2D shows an example of a method for determining belief on the state of the vehicle according to some embodiments.

FIG. 2D shows an example of a method for determining 240c the first and second moment to ensure that for Gaussian-assumed distributions, the belief on the state of the vehicle converges to the estimation of the state of the vehicle according to some embodiments. Using the distribution of the estimate 215c and the distribution of the belief 225c, the difference of the distributions is defined through the Kalman gain, which is the gain matrix needed to move the Gaussian-assumed distribution from one distribution to another distribution. The method determines 210d, starting from the distribution of the belief 225c, the Kalman gain as a function of the covariance of the estimation noise that moves the distribution of the belief to the distribution determined by the received first and second moment. E.g., the Kalman gain K moves the covariance according to $\Sigma_k=(I-K)(\Sigma_{k-1}+Q_k)$. Based on the Kalman gain 215d, the covariance of the estimation noise is determined 220d by solving the matrix including the Kalman gain. E.g. one embodiment solves for the covariance $R_k$ of the estimation noise by the following set of equations:

$$\Sigma_k = (I - K)(\Sigma_{k-1} + Q_k)$$

$$K = (\Sigma_{k-1} + Q_k)(\Sigma_{k-1} + Q_k + R_k)^{-1},$$

which results in $R_k=-(-\Sigma_k^{-1}+(\Sigma_{k-1}+Q_k)^{-1})^{-1}$, i.e., the covariance of the estimation noise The estimation of the state of the vehicle is determined by adjusting the belief on the state of the vehicle in response to the Kalman gain and a difference of the received first moment and the belief of the state of the vehicle. E.g, the estimation is determined as $z_k=\mu_{k-1}+(\Sigma_{k-1}+Q_k+R_k)(\Sigma_{k-1}+Q_k)^{-1}(\mu_k-\mu_{k-1})$ Some embodiments update the parameters of probabilistic distribution using the first head and the second head of the measurement model. For instance, one embodiment updates the parameters of probabilistic distribution using a KF having the first head of the measurement model to adjust the parameters. Another embodiment acknowledges that the motion model or the measurement model is nonlinear for some states of the vehicle. To this end, some embodiments employ nonlinear KFs, such as linear-regression KF, to update the parameter of the probabilistic distribution. Linear-regression KFs are filters that determine the first and second moment by having the moment integrals including $m^\circ= \int_{x^i} g(i)\mathcal{N}(i|m^i,\Sigma^{ii})di$ and $\Sigma^{\infty}= \int_{x^i} (g(i)-m^\circ)(g(i)-m^\circ)^\top \mathcal{N}(i|m^i,\Sigma^{ii})$ di evaluated at a set of integration points $\mathcal{P} = \{(w^{(i)},\varsigma^{(i)})\}_{i=1}^{K(I)}$.

Some embodiments recognize that one purpose of the second head of measurement model is to allow the update of parameters of probabilistic distribution using the same principles as done when using the first head of the measurement model. Some embodiments recognize that to update the parameters of probabilistic distribution using the estimation of the state of the vehicle determined using the received first and second moment, the second head of the measurement module must ensure certain properties to ensure that the convergence of the belief of the state of the vehicle converges to the estimation of the state of the vehicle. For instance, in one embodiment the second head of the measurement model includes the estimated state of the vehicle and the belief on the state of the vehicle determined during a previous iteration as a difference weighted with the covariance of the estimation noise. For instance, in one embodiment the second head of the measurement model is $z_k=x_k+r_k$, wherein $z_k$ is the estimated of the state of the vehicle, $x_k$ is the belief of the state of the vehicle, and $r_k$ is the estimation noise, wherein k is the time step in the recursion.

Some embodiments are based on the recognition that in order to update the parameters of probabilistic distribution using a probabilistic filter, the probabilistic filter should be able to update the parameters by accounting for the fact that a part of the state of the vehicle is real-valued and one part is integer-valued. This is because certain parts, for example, the position of the vehicle is included in the state and real-valued, whereas the ambiguity is included in the state and is integer-valued.

To this end, some embodiments employ a probabilistic filter that updates the parameters of probabilistic distribution by solving a recursive mixed-integer weighted least squares problem according to $$\underset{x_k \in \mathbb{R}^m, n_k \in \mathbb{Z}^n}{\operatorname{argmin}} \|y_k - H_k x_k - G_k n_k\|^2_{R_k^{-1}}.$$

Some embodiments are based on the understanding that a particle filter is a filter that can solve mixed-integer estimation problems without having to resort to optimization methods. Other embodiments understand that in order to not having to resort to optimization methods, particle filters need a large number of particles, which can be computationally prohibitive. To this end, some embodiments solve the recursive mixed-integer weighted least squares problem by employing a mixed-integer extended KF. Other embodiments solve mixed-integer linear-regression KFs.

Figure 3A:
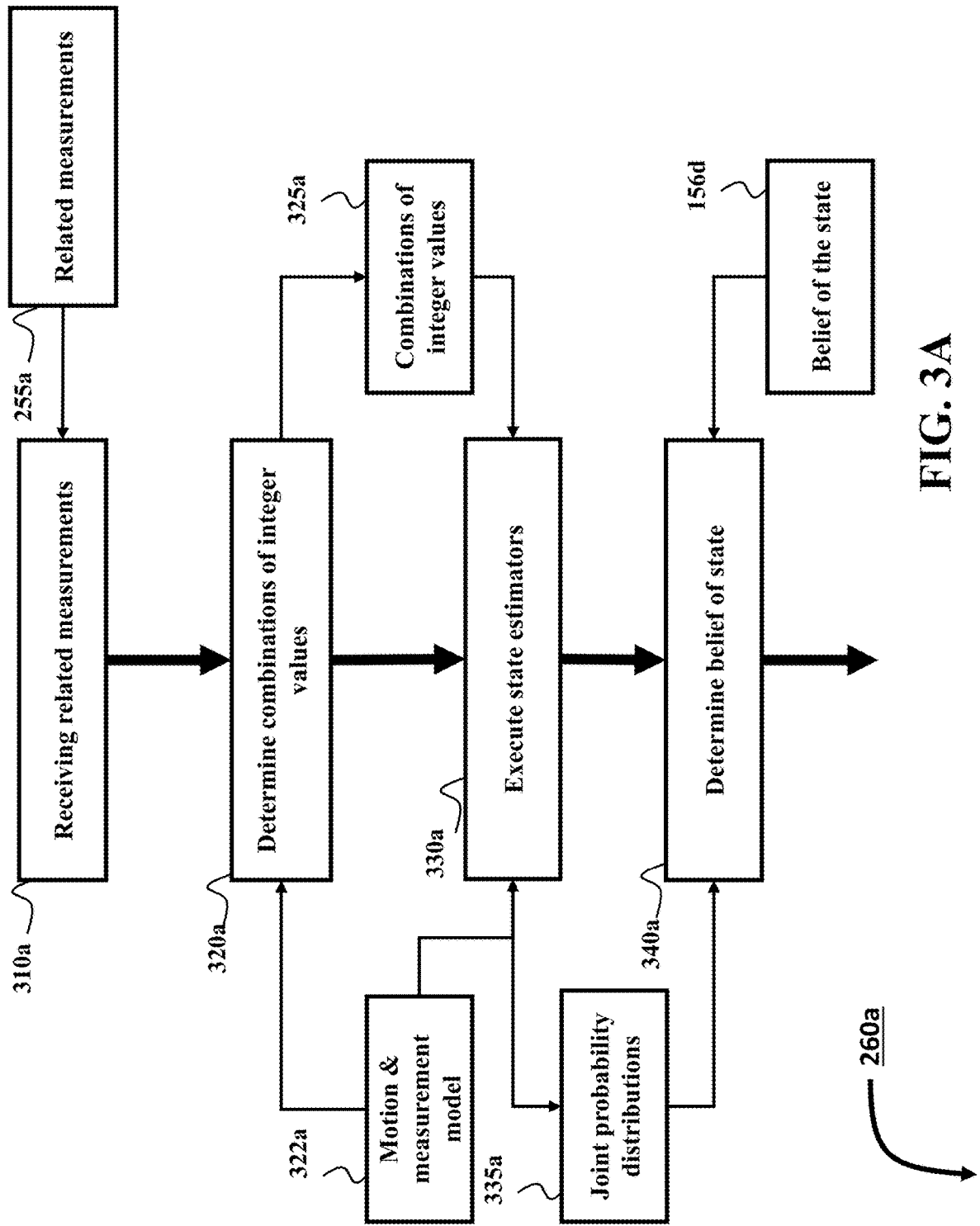
FIG. 3A shows a flowchart of a method of an exemplar implementation for state estimation of a vehicle according to some embodiments.

FIG. 3A shows a flowchart of a method of an exemplar implementation for state estimation of a vehicle wherein the method receives 310a measurements and estimates of the states including the multi-head measurement model. Each carrier signal includes a carrier phase ambiguity as an unknown integer number of wavelengths of the carrier signal traveled between the satellite 101, 102, 103, or 104 and the receiver 130. Next, the method retrieves 322a from a memory a motion model relating a previous state of the vehicle to a current state of the vehicle and the multi-head measurement model relating measurements of the carrier and the code signals to the current belief of the state of the vehicle using the carrier phase ambiguities of the carrier signals and the estimation of the state of the vehicle to the belief of the state of the vehicle. Both models, i.e., the motion model and the measurement model, are probabilistic. For example, the motion model is a probabilistic model subject to process noise, and the measurement model is a probabilistic model subject to measurement noise.

The method then determines 320a a set of possible combinations of integer values 325a of the carrier phase ambiguities consistent with the measurements of the carrier and the code signals according to one or combination of the motion model and the measurement model 322a within bounds defined by one or combination of the process noise and the measurement noise. This step is based on understanding that instead of attempting to determine the carrier phase ambiguities to perform a state estimation, it is beneficial to determine and test different possible combinations of the carrier phase ambiguities for the state estimation. In such a manner, the best carrier phase ambiguities can be selected using the probabilistic model better reflecting the nuances of the state estimation.

To that end, the method executes 320a a set of state estimators determining states of the vehicle by jointly using the motion model and the measurement model 322b. Each state estimator includes its corresponding combination of the integer values of the carrier phase ambiguities to determine a joint probability distribution 335a of the state of the vehicle with respect to the motion model and the measurement model 322a. In such a manner, the combinations of the integer values of the carrier phase ambiguities can be evaluated probabilistically, because the measurement models of at least some different state estimators include different combinations of integer values of the carrier phase ambiguities selected from the set of possible combinations 325a. Next, the method determines 340a the state of the vehicle using a state estimator with the highest joint probability of the state of the vehicle according to the measurements of the carrier and the code signals and the estimation of the state of the vehicle using the multi-head measurement model.

To that end, some embodiments are based on the realization that estimation of the range of possible integer values of carrier-phase ambiguities as well as the selection of the integer values of carrier-phase ambiguities from that range can be done probabilistically using consistency of the motion and the measurement models with respect to a probability density function (PDF) of the noise of the first head of the measurement model and the noise of the second head of the measurement model.

Figure 3B:
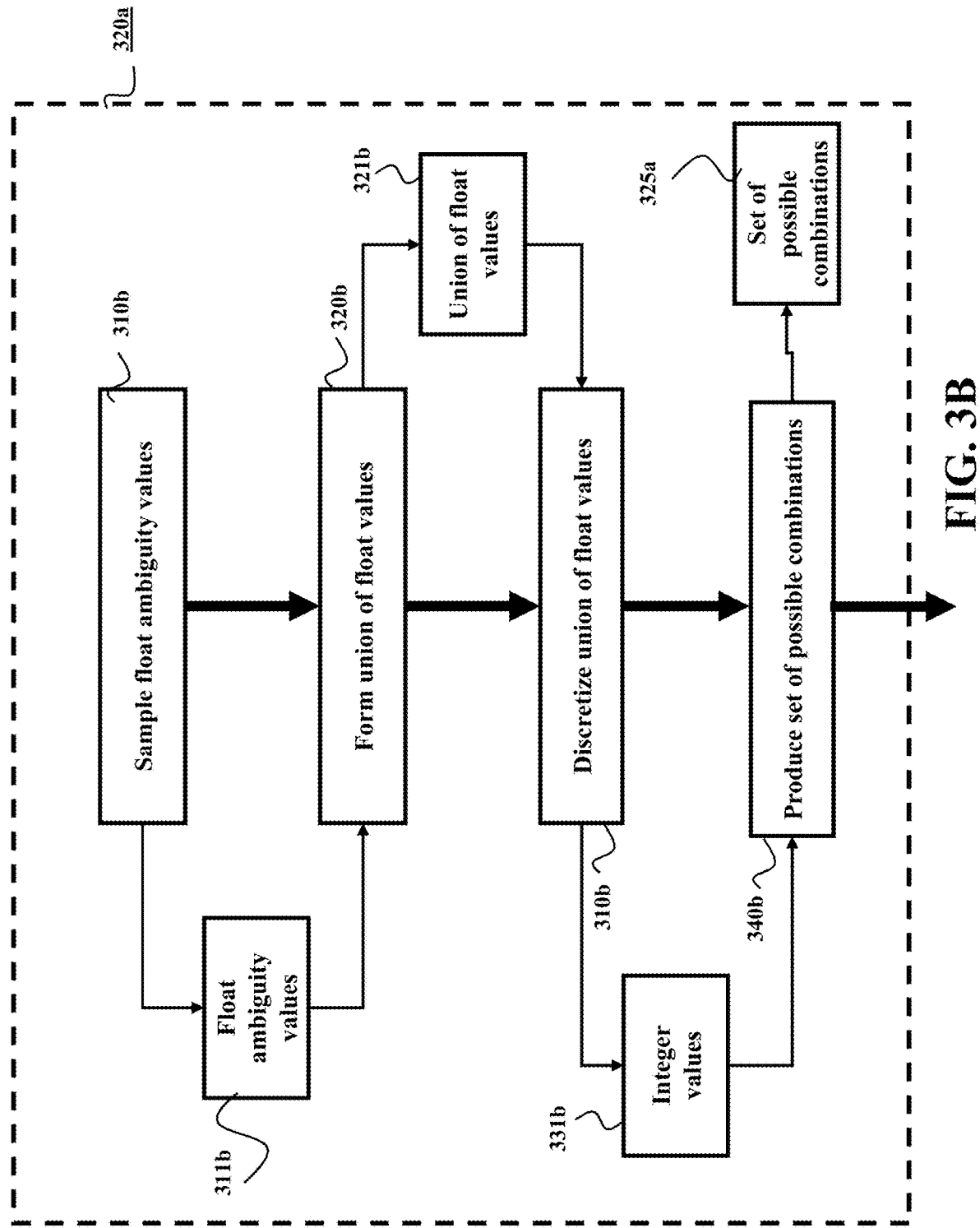
FIG. 3B shows a flowchart of a method for determining carrier phase ambiguities according to some embodiments.

FIG. 3B shows a flowchart of a method for determining 320a the possible combinations of integer values of the carrier phase ambiguities according to some embodiments. The method can be implemented using a processor. For at least one state of the vehicle consistent with the process noise of the motion model, the method samples 310b float values 311b of the carrier phase ambiguity, for at least one satellite, on a PDF of the measurement noise centered on a noiseless fit of the carrier phase ambiguities, the state, the measurements of the carrier and code signals into the measurement model and the estimation of the state.

In some embodiments, the PDF of the measurement noise is predetermined based on, e.g., characteristics of the GNSS receiver. As used herein, the noiseless fit is the fit of the carrier phase ambiguities, the position, and the measurements of the carrier and code signals, when the obtained measurements of the carrier and code signals are assumed to be correct. That is, the measurements of the carrier and code signals are assumed to be correct and the remaining errors are due to the carrier phase ambiguity. In such a manner, the noiseless fit places the PDF in a position that the sampling on the PDF deemphasizes the probabilistic noise of the motion and the measurement models and emphasizes the effect of the carrier phase ambiguities on the position estimation. In other words, the errors in the fit to the measurement model after inserting carrier phase ambiguities, the position, and the measurements of the carrier and code signals into the measurement model, are due to the error in the carrier phase ambiguities.

Then, the method forms 320b a union of the sampled float values, to produce a union 321b that contains all of the sampled float values; discretizes 310b the union of float values in an integer basis to produce possible integer values 331b of the carrier phase ambiguity for the set of GNSS satellites. Finally, the method uses the possible integer values 331b of carrier-phase ambiguities for all satellites, to produce 340b a set of possible combinations 325a of integer values.

Figure 3C:
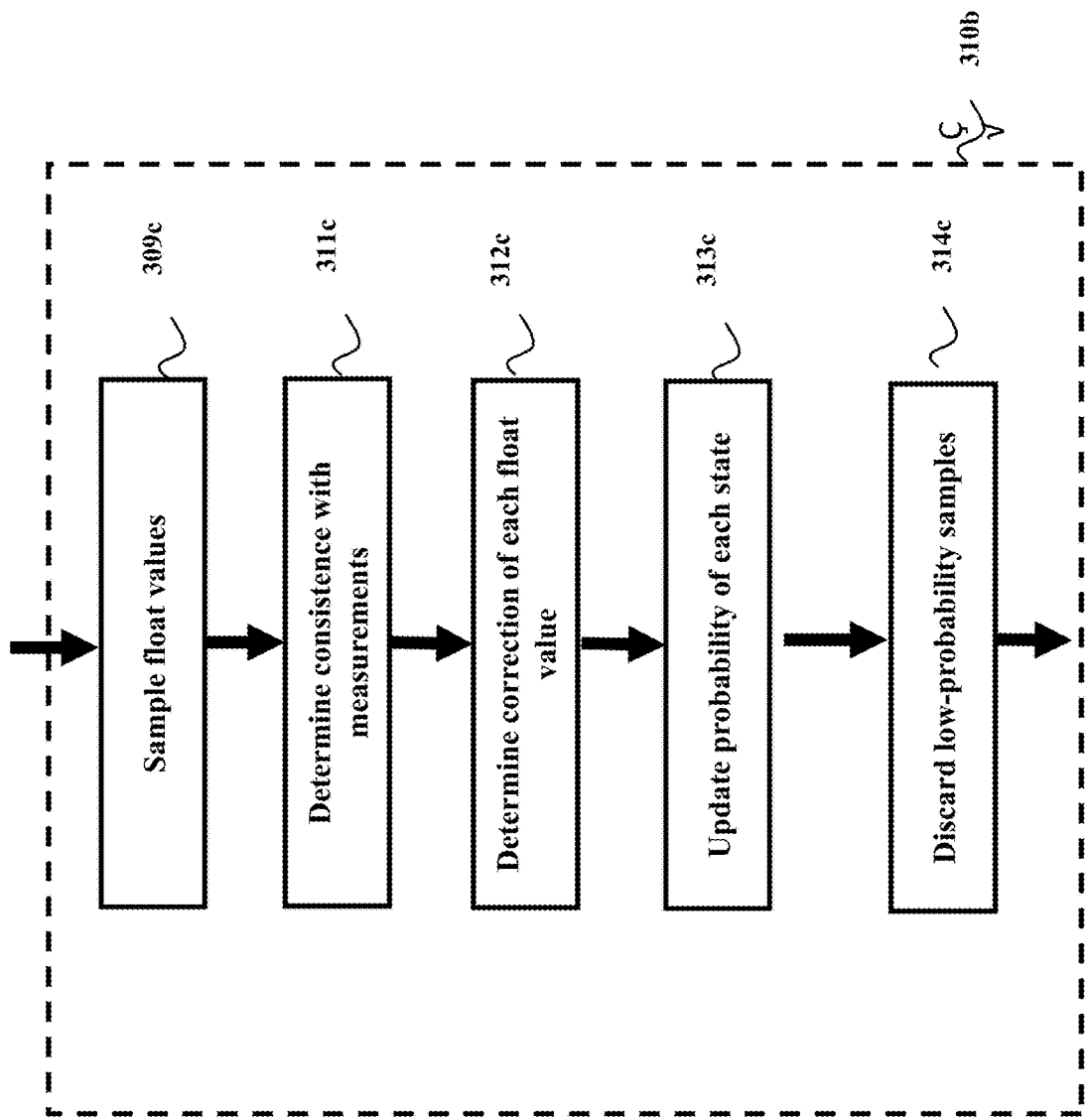
FIG. 3C shows a flowchart of an exemplar implementation of the method that samples the float values consistent with the motion model and its process noise according to one embodiment.

FIG. 3C shows a flowchart of an exemplar implementation of method 310b that samples the float values according to one embodiment. However, the sampling 310b the float values is implemented in several ways by different embodiments. The method of FIG. 3C samples 309c float values consistent with the motion model and its process noise. The method determines 311c consistency with the measurements of the code and carrier phase signals, by inserting sampled carrier phase ambiguities, the estimated state, and the measurements of the carrier and the code signals into the measurement model. Based on the consistency with the measurement, the method corrects 312c each sampled float value as a function of the process noise and the measurement noise; updates 313c the probability of each ambiguity based on the consistency with the measurements after correction; and prunes 314c the corrected sampled float values of carrier phase ambiguities to preserve the float values of carrier-phase ambiguities with probabilities of fitting into the measurement model above a threshold.

Figure 3D:
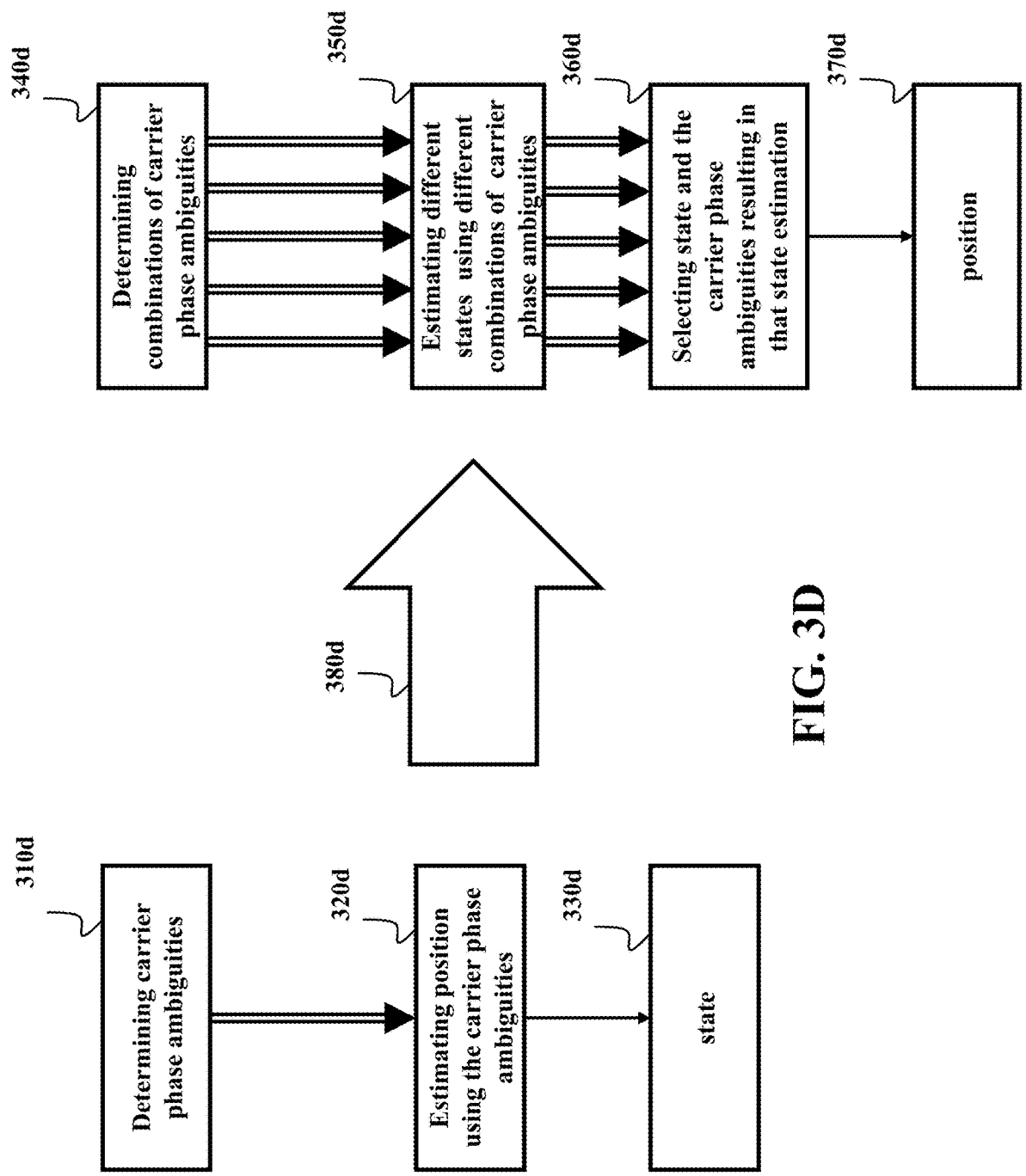
FIG. 3D shows a schematic illustrating some principles employed by some embodiments.

FIG. 3D shows a schematic illustrating some principles employed by some embodiments. Specifically, some embodiments are based on the realization that the finite number of possible integer values of carrier phase ambiguity allows determining 340d different combinations of those possible integer values for tracking the state of the vehicle. Such a realization allows replacing 380d the evaluation 310d of the carrier phase ambiguity for estimating 320d the state 330d of the vehicle with the evaluation 360d of different state of the vehicle determined 350d using different the combinations 340d of the carrier phase ambiguities. This replacement is advantageous because the probabilistic nature of the motion of the receiver is better equipped to test the position than to test the derivative of the position, such as the carrier phase ambiguity. In such a manner, the best state 370d selected using the probabilistic nature of the motion of the vehicle automatically indicates the corresponding combination of the carrier phase ambiguity used to determine such a state 370d.

Some embodiments are based on the recognition that a particle filter can be computationally prohibitive, and that for computational reasons, a Kalman-type filter embedding an optimization solver can be advantageous.

Figure 4:
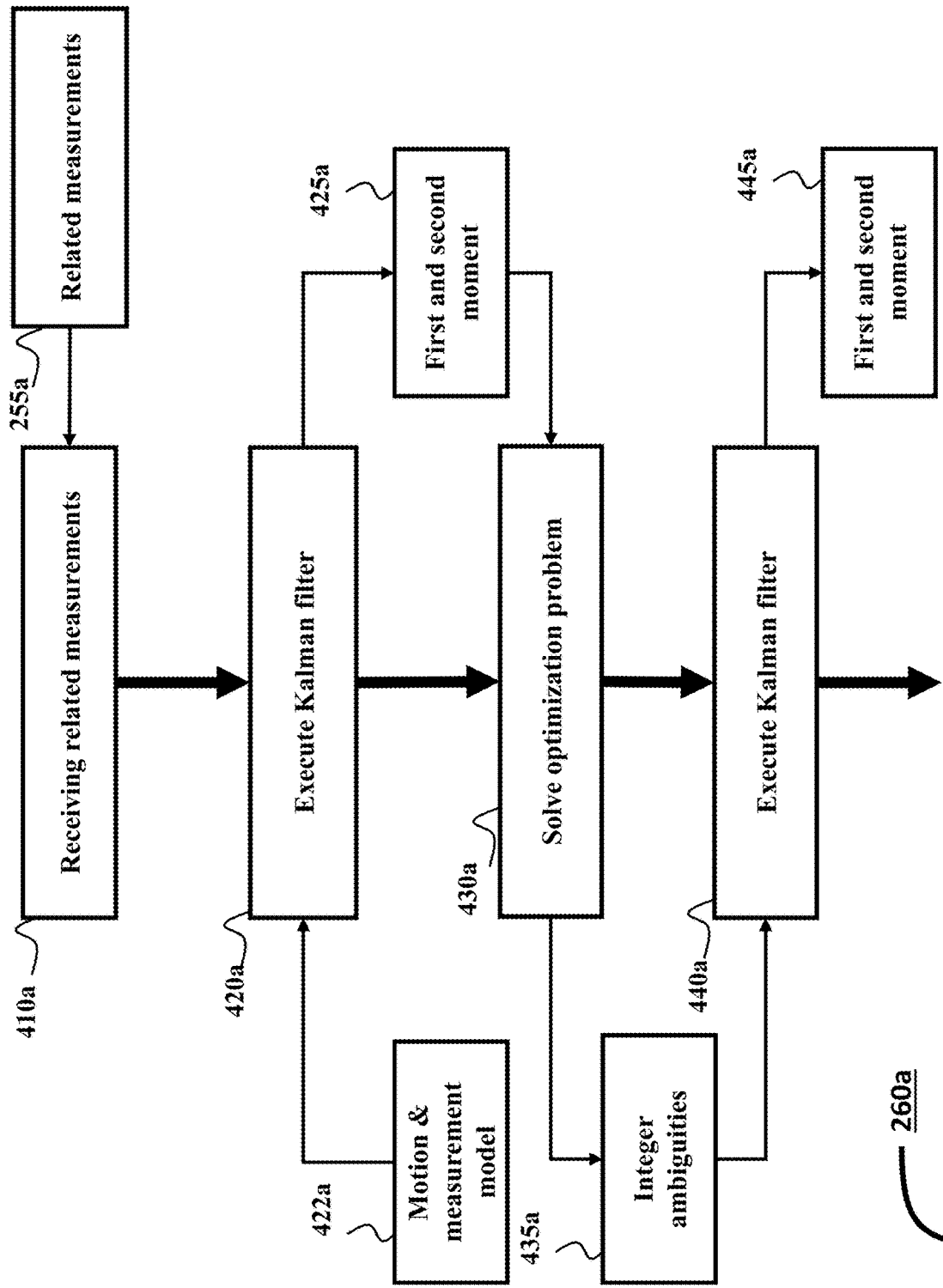
FIG. 4 shows a flowchart of a method for executing a probabilistic filter to update parameters of probabilistic distribution of a state of a vehicle according to one embodiment.

FIG. 4 shows a flowchart of a method 260a for executing a probabilistic filter to update parameters of the probabilistic distribution of a state of a vehicle when the parameters are the first and second moment of the distribution according to one embodiment. The method receives 410a measurements and estimates of the states including the multi-head measurement model. Each carrier signal includes a carrier phase ambiguity as an unknown integer number of wavelengths of the carrier signal traveled between the satellite 101, 102, 103, or 104 and the vehicle 130. Next, the method retrieves 422a from a memory a motion model relating a previous state of the vehicle to a current state of the vehicle and the multi-head measurement model relating measurements of the carrier and the code signals to the current belief of the state of the vehicle using the carrier phase ambiguities of the carrier signals and the estimation of the state of the vehicle to the belief of the state of the vehicle. Both models, i.e., the motion model and the measurement model, are probabilistic. For example, the motion model is a probabilistic model subject to process noise, and the measurement model is a probabilistic model subject to measurement noise. Using the multi-head measurement model, measurements 255a, motion model, and the parameters of probability distribution determined during a previous iteration, the method executes 420a a KF that updates the first and second moment of the probability distribution, wherein the updated first moment of the ambiguity contained in the state is real-valued. Next, the method solves 430a a weighted least squares optimization problem that fixes the ambiguities to have integer values, wherein the optimization problem cost function is a squared Euclidean norm of the deviation of the first moment of the state to the real-valued estimates 425a determined by the Kalman filter 420a. Using the resulting integer ambiguities 435a, the method then executes 440a a Kalman filter initialized with the real-valued part of the first moment and the integer-valued part of the first moment, resulting in updated 445a parameters of the probabilistic distribution.

In some embodiments, the KF is an extended KF, wherein the nonlinear parts of the motion and measurement model are linearized around the current belief of the state. In other embodiment, the KF is a linear-regression KF, for example, an unscented KF, a cubature KF, or a smart-sampling KF. Linear-regression KFs avoid the linearization around the current state estimate as in the extended KF and are generally more accurate but more computationally complex. Instead of linearization, linear-regression KFs solve the involved moment integrals by a set of weighted integration points and can be used to also determine other parameters of probabilistic distributions, e.g., higher-order moments. Such higher-order moments can be useful in situations when the first and second moments do not sufficiently well represent the underlying distribution.

The received first and the second moment from the RF receiver can be information received from multiple sources. For example, in some embodiments, a passive road-side unit (RSU) equipped with a camera determines parts of the state of the vehicle, e.g., position and velocity using computer vision algorithms with high accuracy. In other embodiments, the RSU is equipped with a range sensor, e.g., radar or lidar, which directly measures the position and velocity of the vehicle relative to the RSU. When parts of the state can be resolved directly with high accuracy using direct sensing, an RSU can then determine the remainder of the state of the vehicle, and transmit that to the vehicle.

Figure 5A:
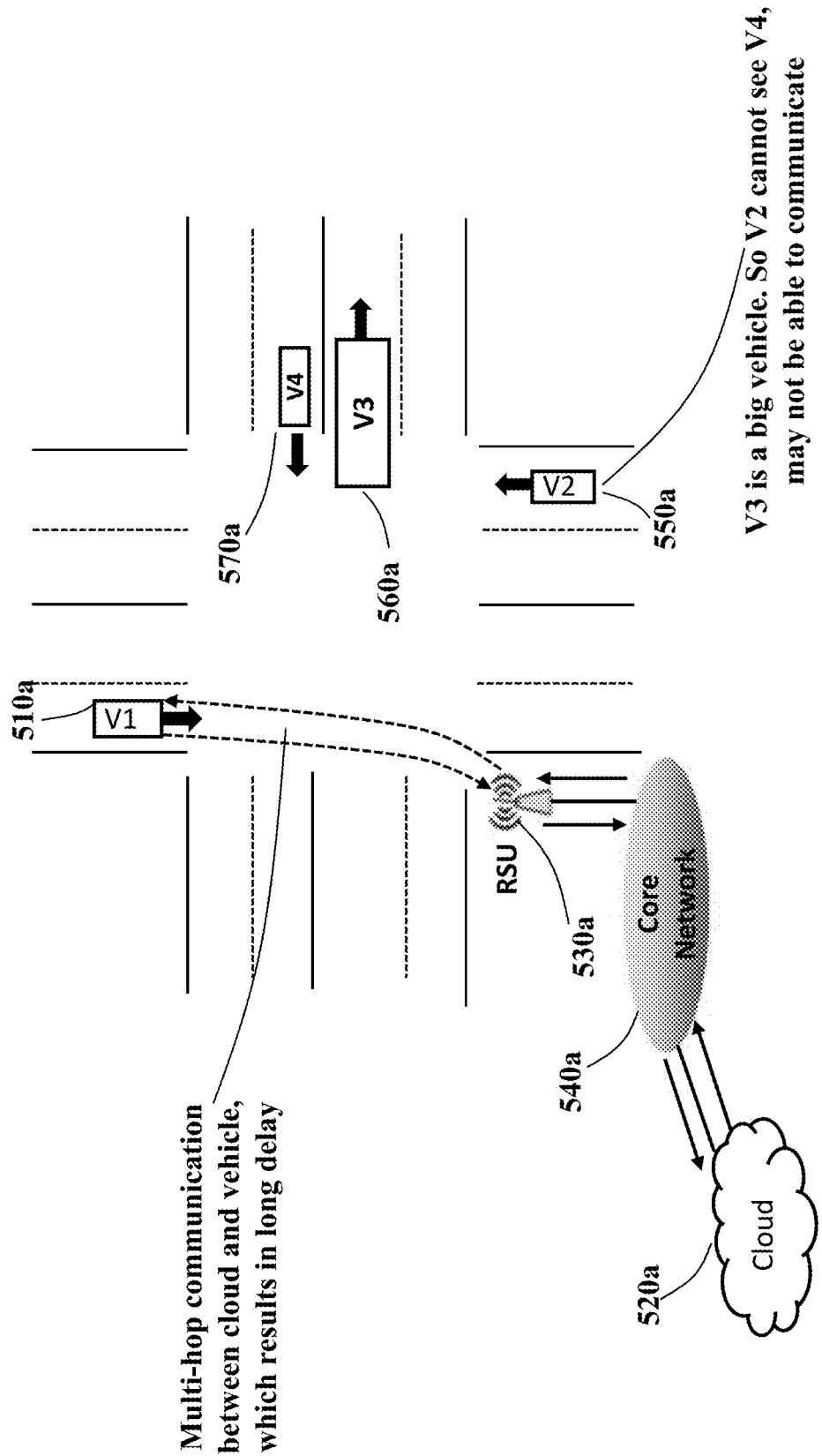
FIG. 5A shows a traffic scenario illustrating a scenario according to some embodiments.

FIG. 5A shows a traffic scenario illustrating a scenario according to some embodiments. Some embodiments are based on a recognition that an active remote server is located in the cloud as an edge computing device, and to establish communication among vehicles and the cloud, information transfer between cloud and vehicle needs to go through the core infrastructure network and RSU as shown in FIG. 5A, where the communication between vehicle V1 510a and cloud 520a needs to go through RSU 530a and core network 540a.

Other embodiments recognize that having computations in the cloud causes large communication delays. In such situations, having an edge computing device directly in the RSU is advantageous.

Some embodiments are based on a recognition that using remote servers in communication with vehicles necessitates using different clocks for different devices, and synchronization among such clocks is necessary.

The clock of the vehicle can be synchronized to the clock of the GNSS in communication with the GNSS receiver of the vehicle. However, some embodiments are based on a recognition that individual synchronization of the clock of the vehicle to a clock of the GNSS does not guarantee the synchronization of the vehicles in the vehicular communication networks due to different clock offsets errors that different vehicles might have. In addition, the GNSS synchronization can be negatively affected by the multipath of the satellite signals in the urban environment. In addition, some vehicles in the vehicular communication network may not have a GNSS receiver.

Different standards provide protocols for mutual synchronization of the clocks. For example, IEEE has been developing precision time protocol (PTP) based synchronization standards. However, those protocols require information exchange between synchronizing devices, which in the context of a versatile vehicular communication network can be impractical.

Some embodiments are based on the realization that vehicular communication network has special requirements on participating vehicles. Unlike a node in other networks, a vehicle in a vehicular communication network periodically announces its presence. For example, in IEEE Dedicated Short Range Communications (DSRC) for Wireless Access in Vehicular Environments (WAVE), a vehicle is required to transmit a heartbeat message every 100 ms to announce its presence to neighboring vehicles. The attributes of the heartbeat messages include one or a combination of temporary ID, time, latitude, longitude, elevation, positional accuracy, speed and transmission, heading, acceleration, steering wheel angle, brake system status, and vehicle size.

Some embodiments are based on the realization that this heartbeat message includes necessary synchronization data and therefore, can be used for synchronization. This approach reduces network traffic and mitigates the interference. With synchronization data transmitted automatically, a vehicle can achieve silent synchronization without message exchange executed in conventional synchronization methods.

For example, some embodiments are based on the realization that a clock of the vehicle can be synchronized to clocks of other vehicles based on a trilateration of information received in multiple heartbeat messages under the assumption that the clock offset of the vehicle and location of the vehicle is unknown. This is because the trilateration of the vehicle can be performed with two kinds of methods. One method uses distances that the light travels between the transmission and receipt time of the heartbeat message that is a function of the unknown clock offset. Another method uses distances between locations of the multiple vehicles and the time of transmitting the heartbeat messages and the unknown location of the vehicle at a particular time. By comparing these two kinds of distances it is possible to concurrently determine the unknown clock offset and unknown location of the vehicle at a particular time.

Figure 5B:
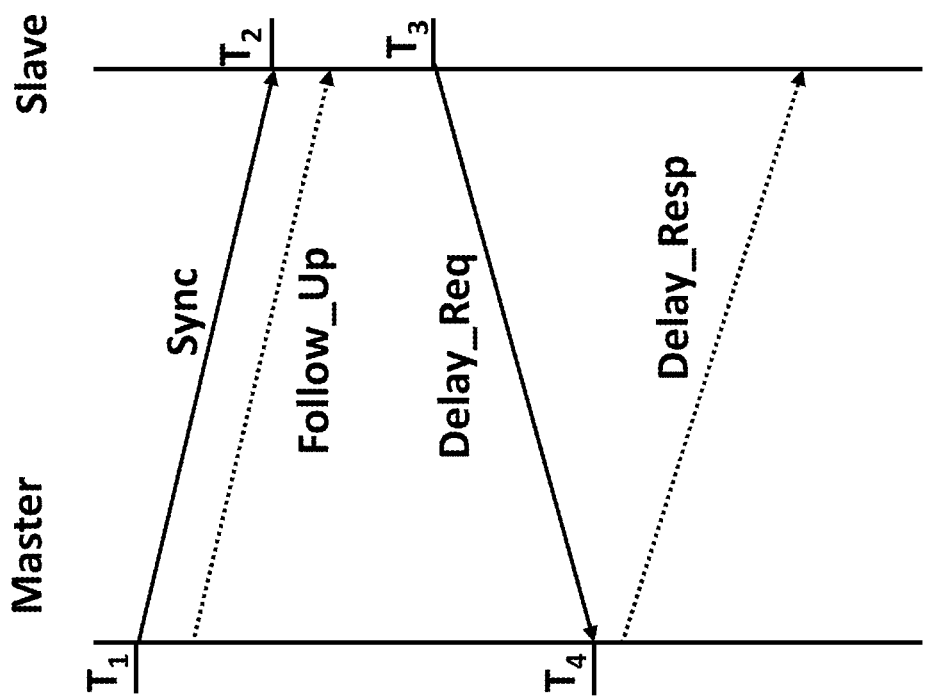
FIG. 5B shows the synchronization message exchange in IEEE Precision Time Protocol (PTP) based synchronization.

FIG. 5B shows the synchronization message exchange in IEEE Precision Time Protocol (PTP) based synchronization. Such a synchronization requires at least two message exchanges between master and slave. Master first sends a Sync message to slave at time $T_1$. Slave receives Sync message at time $T_2$. Even Sync message contains the timestamp $T_1$, for more precise synchronization, a master may send a Follow_Up message that contains the precise timestamp $T_1$ to the slave. After processing Sync message and Follow_Up message received from the master, the slave sends a Delay_Req message to the master at time $T_3$. Once master receives the Delay_Req message at time $T_4$, it sends back a Delay_Resp message that contains timestamp $T_4$ to the slave. Using four timestamps $T_1$, $T_2$, $T_3$ and $T_4$, the slave computes message propagation time and clock offset, and therefore, synchronizes its clock to master's clock. For example, for a symmetric link, the propagation time $t_p$ and clock offset $t_o$ can be computed as $$t_p = \frac{(T_4 - T_1) - (T_3 - T_2)}{2} \quad (1)$$

and $$t_o = \frac{(T_2 - T_1) + (T_3 - T_4)}{2} \quad (2)$$

In some embodiments, the parameters of the probabilistic distribution of the state of the vehicle together with the GNSS measurements are transmitted to the remote server.

Figure 5C:
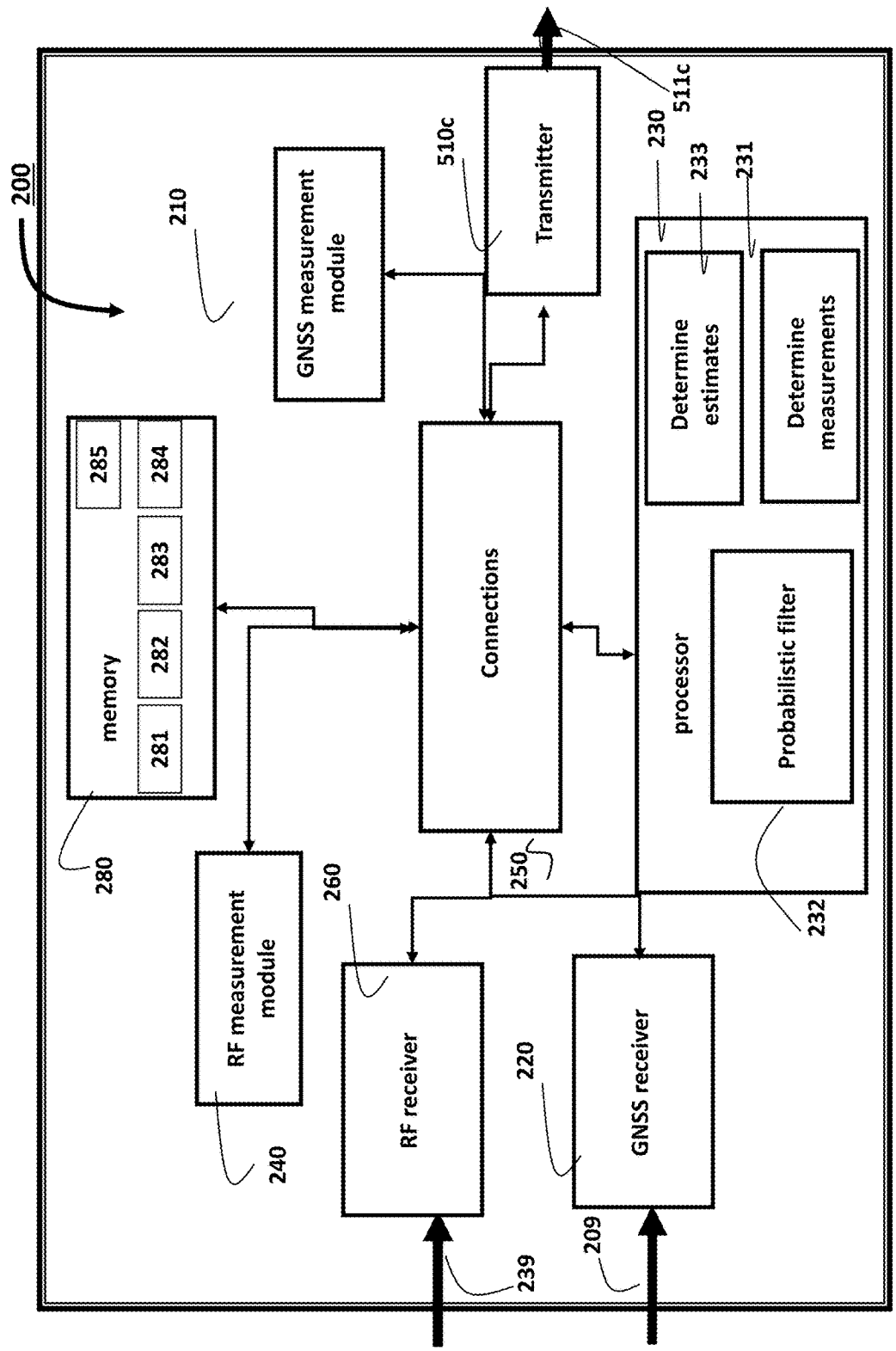
FIG. 5C shows a probabilistic system for tracking a state of a vehicle using unsynchronized cooperation of information according to some embodiments.

FIG. 5C shows a probabilistic system 200 for tracking a state of a vehicle using unsynchronized cooperation of information received from satellite signals 209 transmitted by a navigation satellite system (GNSS) and information transmitted over radio frequency (RF) channel 239 according to some embodiments. The system includes a transmitter 510c that transmits its parameters of probabilistic distribution and satellite measurement signals 511c to the remote server.

In other embodiments, multiple vehicles are transmitting their parameters of probabilistic distributions and the GNSS measurement signals to the remote server. The parameters include the first moment and the second moment of the probabilistic distribution of the state of the vehicle. Such information sending can be beneficial when the remote server, e.g. located in the RSU or in the cloud, does not have additional sensing capabilities. In such cases, the remote server can use the information received from multiple vehicles to merge such information and therefore improve the estimation of the state of each vehicle and transmit the first and second moment to the vehicles. In other words, the probabilistic system of the vehicle transmits its parameters of the probabilistic distribution together with satellite measurements and receives the first and second moment of the state of the vehicle in response to the transmission. In some embodiments, the remote server forms an augmented state based on the state of the multiple vehicles.

Figure 5D:
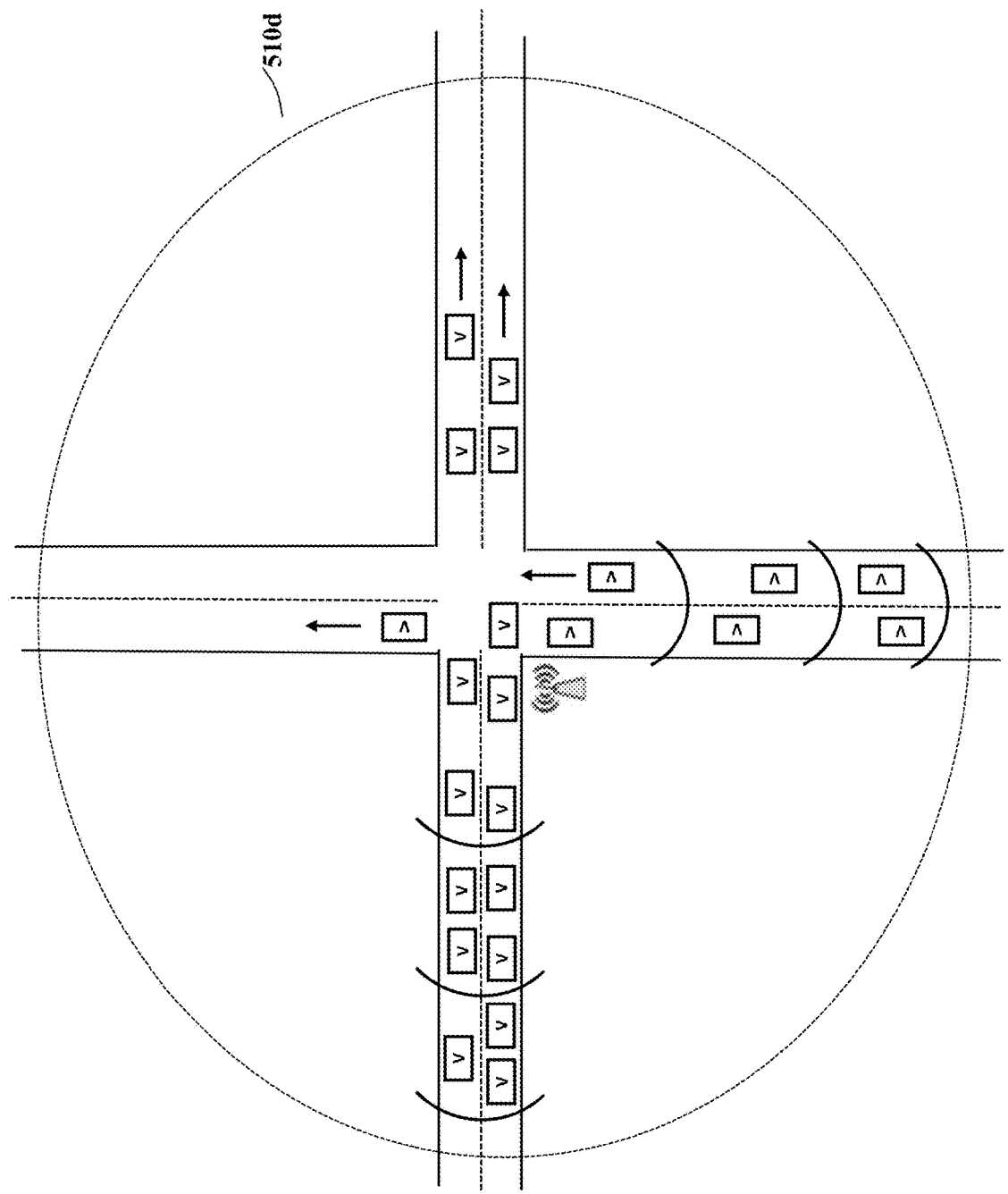
FIG. 5D shows a traffic scenario according another embodiment.

In some embodiments, the augmented state is a union of states of multiple vehicles. For example, the augmented state includes the position and velocity of the vehicles, the carrier phase ambiguities, and residual bias states, e.g., ionospheric residual delays. For vehicles sufficiently close to each other, for example, less than 3-10 km apart, the ionospheric delay can be considered the same for different vehicles. For example, referring to FIG. 5D, vehicles inside the region 510d have very similar ionospheric delays. Hence, in some embodiment, the dimension of the augmented state is smaller than the sum of the state of all vehicles, because such ionospheric delays are the same for multiple vehicles.

In the majority of GNSS applications, the residual biases are suppressed through single or double differences operations and the focus of these applications is to recover the integer ambiguities that form a part of GNSS measurements. However, some embodiments are based on the realization that the residual biases are still affecting the GNSS measurements due to the nature of the physics of propagation of GNSS signals. However, these biases cannot be determined from a single GNSS receiver alone but using augmentation of measurements of multiple measurements from multiple satellites measuring multiple receivers. This is because the integer ambiguity is unique for each satellite-vehicle combination, but the residual biases are not. For example, the ionospheric delay is included as a residual bias in the state, and this is the same for vehicles being measured in close vicinity of each other. To that end, to recover these residual biases, the measurement noise should be estimated to determine the correlation between measurements of multiple vehicles of satellite signals, which is a task very different from the task of integer ambiguity estimation.

Some embodiments are based on the realization that such a task of estimating the residual bias is difficult to address at the level of an individual vehicle because there are many unknowns. This is because while each vehicle receives multiple GNSS signals from multiple satellites, and the residual biases are similar for the different GNSS signals, the ambiguities are not. Hence, even for a single receiver, using more measurements does not help significantly in terms of estimating the residual bias.

On the other hand, when using multiple measurements of multiple vehicles, there is a cross-correlation between GNSS measurements of different vehicles, because such measurements arise from the same satellite.

Figure 6A:
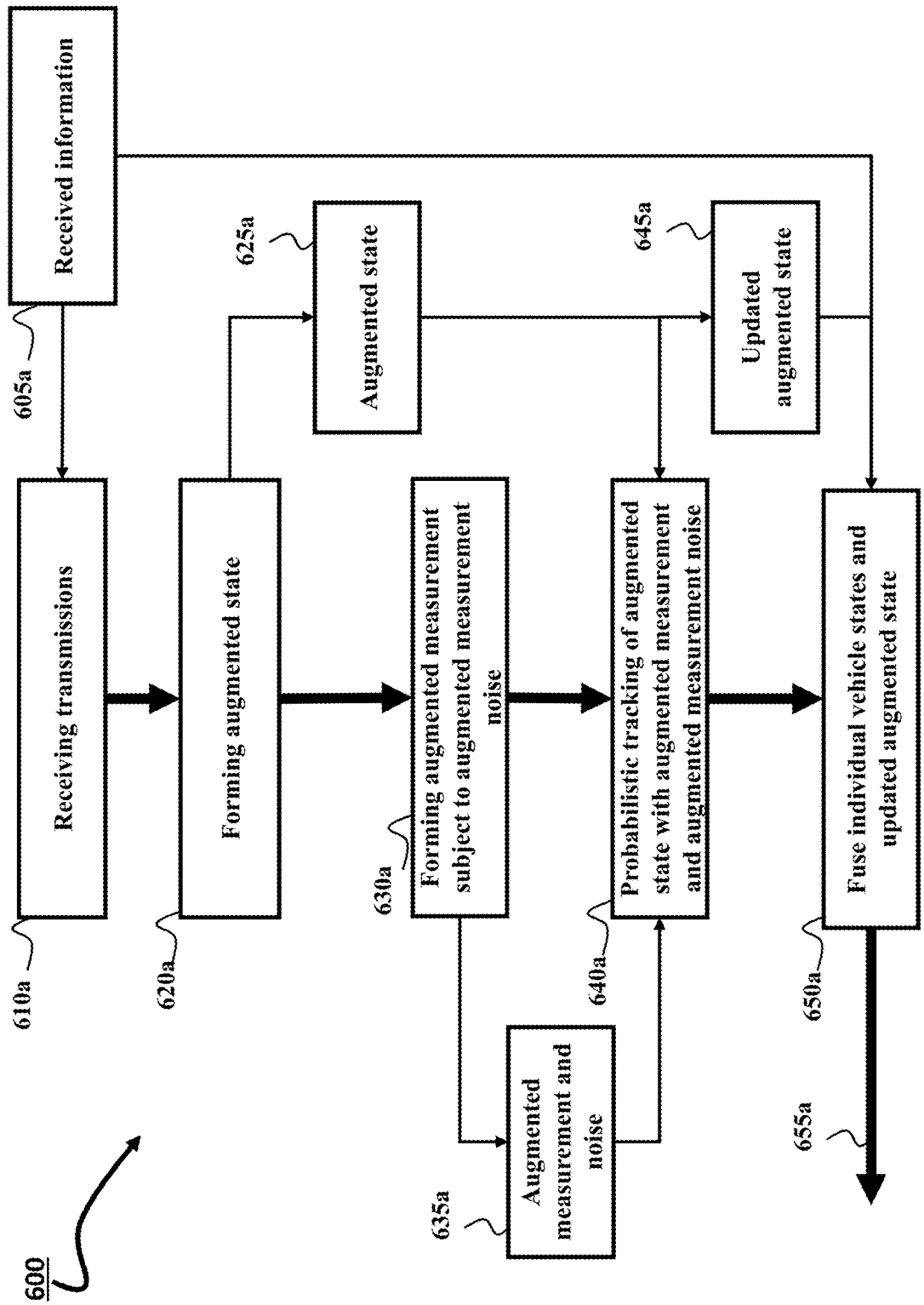
FIG. 6A shows a flowchart of a recursive method for determining a first and second moment of the state of a vehicle using multiple transmissions from multiple vehicles according to some embodiments.

FIG. 6A shows a flowchart of a recursive method 600 for cooperative state tracking of multiple vehicles according to some embodiments. The method is executed by a processor of the remote server, e.g., an edge device in an RSU or in the cloud. The remote server receives 610a multiple transmissions 605a from multiple vehicles. Each transmission 605a from a vehicle includes the measurements of satellite signals received at the vehicle and parameters of the probabilistic distribution of the state of the vehicle.

The remote server fuses the states of the multiple vehicles defined by the parameters of the corresponding probabilistic distributions to form 620a an augmented state 625a of the multiple vehicles. In one embodiment, the method 600 just concatenate all state together in a vector, matrix or a tensor. However, in some other embodiments, some residual biases of a neighboring vehicle are identical and the method 600 removes the duplication forming 620a the augmented state 625a as a union of the states of multiple vehicles, such that dimensions of the augmented state is smaller than a sum of dimensions of the state of each of the multiple vehicles.

In addition, method 600 fuses 630a the measurements of satellite signals of the multiple vehicles into an augmented measurement of the augmented state subject to augmented measurement noise 635a. Some embodiments are based on a realization of dependency of measurement noise of different vehicles. Hence, the augmented measurement noise 623a is defined by a non-diagonal covariance matrix with non-zero off-diagonal elements, each non-zero off-diagonal element relating errors in the measurements of a pair of corresponding vehicles.

Method 600 executes 640a a probabilistic filter updating the augmented state 645a based on the augmented measurement subject to the augmented measurement noise. Due to one or a combination of the redundancy of state variables and cross-correlation of measurement noise, the accuracy of the updated augmented state 645a for each of the individual vehicles can be greater than the accuracy of the state of the vehicle determined individually.

To avoid discontinuity of control, method 600 fuses 650a the parameters of the probabilistic distribution of the state of at least some of the multiple vehicles with a corresponding portion of the updated augmented state 645a to output the fused parameters 655a of the probabilistic distribution of the state of at least some of the multiple vehicles. The fused parameters 655a can be transmitted to the vehicles, used for the control of the vehicle, and for other purposes taking advantage of state estimation.

The execution 640a of the probabilistic filter can be performed in a number of ways using different measurement models such as a multi-head or single-head measurement model and using various motion models, such as a constant velocity motion model, a constant acceleration motion model, a Singer model, a kinematic vehicle model, and a dynamic vehicle model. Examples of the probabilistic filter include a particle filter or a mixed-integer Kalman filter.

Some embodiments are based on understanding that the state of multiple vehicles can be tracked jointly using principles of probabilistic estimation similar to the principles of probabilistic tracking of an individual vehicle. At a first glance, such joint tracking does not make sense, because it increases the dimensionality of the tracking problem without immediately apparent benefits. This is because the integer ambiguities of different vehicles, which is the focus of most GNSS applications, would be independent of each other in such a collective tracking, and thus, the collective tracking would not help to resolve the ambiguities.

However, some embodiments are based on the realization that during a collective state estimation of multiple vehicles, the measurement noise imposed on the collective state, i.e., referred to in this disclosure as an augmented state, of multiple vehicles does indeed have useful crosscorrelation between the noise of the measurements of the states of different vehicles that can be explored to reduce the uncertainty on the estimation of the augmented state. E.g., when a satellite measures two vehicles, there is a direct crosscorrelation between the two measurements, because they arise from the same source and therefore have similar noise properties.

Some embodiments are based on understanding that the augmented state estimation can correct or at least improve the state estimation performed by an individual vehicle. However, there is a need to softly merge the results of augmented and individual state tracking in order to avoid the discontinuity of control of the vehicle. This is because an individual vehicle can update at faster rates and have additional onboard sensors, e.g., inertial measurement unit and wheel encoders, which can provide different information. Hence, just using the results from the augmented state directly can result in loss of continuity of estimation, which can be detrimental to vehicle safety. To that end, some embodiments fuse the parameters of the probabilistic distribution of the state of an individual vehicle with a corresponding portion of the updated augmented state, as contrasted with the updating the state of the individual vehicle itself. In such a manner, the resulting estimate is a tradeoff between the additional information, such as correlated measurement noise and similarity of residual biases used by the server, with the smoothness provided by always using individual vehicle estimates.

Additionally or alternatively, some embodiments appreciate the need for reducing the computational burden of such a high dimensional probabilistic filter tracking the augmented state. For instance, a state of a vehicle can have a state dimension of up to dimension 100, depending on how many residual biases are estimated and how many satellites currently measure the vehicle. On the other hand, there can be hundreds of vehicles in the vicinity of each other, and in the worst case, the dimension of the augmented state can be tens of thousands. Hence, the computations involved in the remote server are more computationally demanding, and especially the solution of a mixed-integer estimation problem where numerous integer ambiguities need to be fixed becomes prohibitive. Some embodiments recognize that in order to solve a mixed-integer least squares problem for the augmented state, mixed-integer Kalman filters should be used.

Some embodiments are based on the understanding that when designing recursive mixed-integer estimators, it implies the need for solving a mixed-integer problem of ever-increasing size since a current estimate of the state depends on the entire history of integer values. Hence, to solve such a large-scale estimation problem, various relaxations need to be made, because otherwise there is an exponential growth of complexity with time.

One embodiment is based on the understanding that a way to relax the mixed-integer estimation problem, instead of having an integer ambiguity be determined by optimization from a real-valued ambiguity and subsequently update parameters of distribution based on said integer ambiguity, it is beneficial to determine parameters of two probabilistic distributions recursively and jointly, wherein one distribution only works with real-valued state, and one distribution models the integer ambiguities. This is because if using two distributions, real-valued estimates are not mixed with mixed-integer estimates and the true distribution of real-valued state is therefore not contaminated.

Figure 6B:
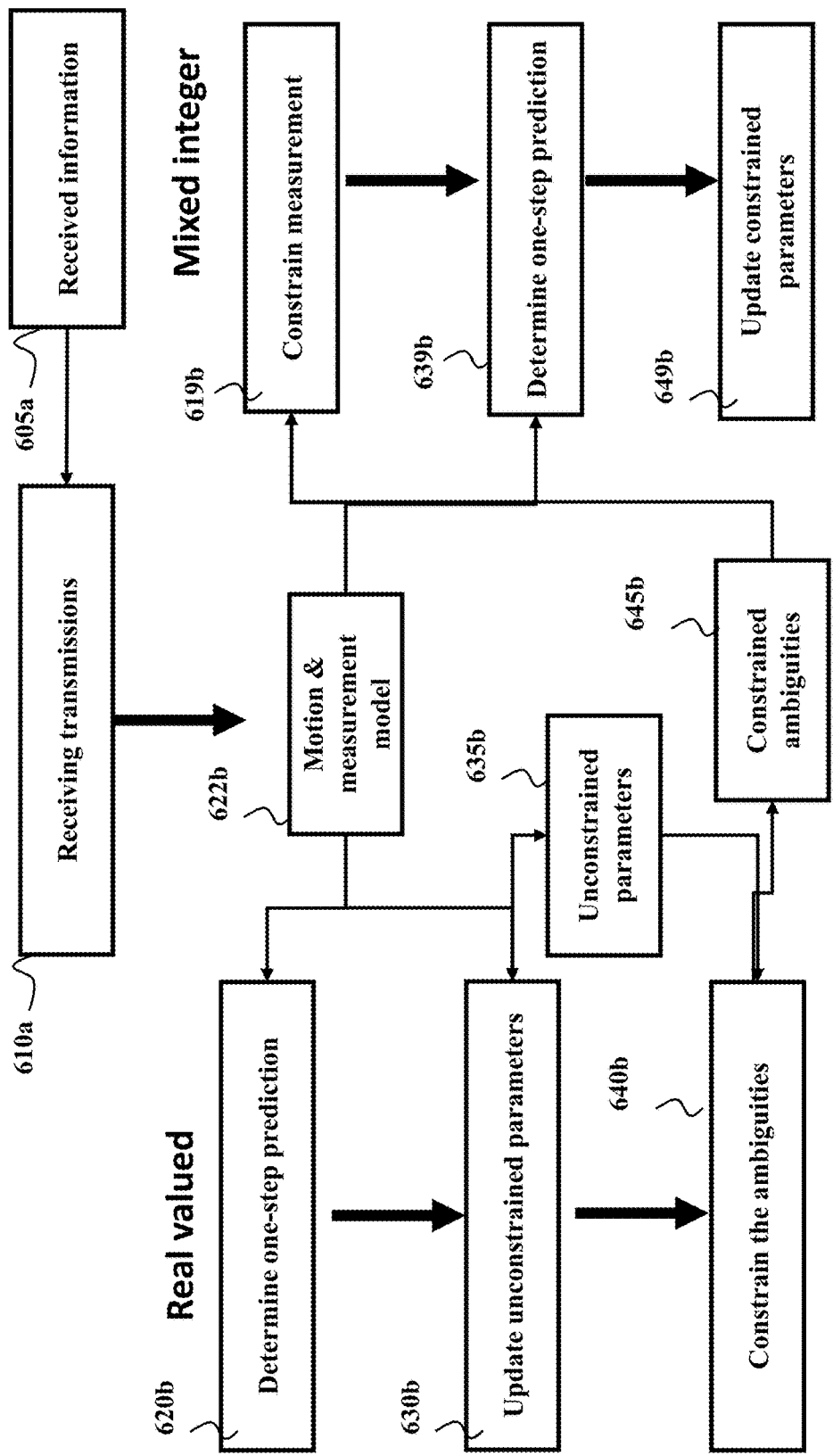
FIG. 6B shows a flowchart of a recursive method for updating the parameters of augmented state at the remote server according to some embodiments.

FIG. 6B shows a flowchart of a recursive method for updating 620a the parameters of the probabilistic distribution of augmented state at the remote server according to some embodiments. Using the measurements 605a of multiple transmissions, the method updates two sets of parameters of distributions jointly, one unconstrained using real values and one constrained to having the ambiguities as integer values. First, using a motion model and a measurement model 622b, the method determines 620b the one-step prediction of parameters of the probability distribution of the unconstrained augmented state. Next, the method updates 630b the parameters of the probability distribution of the unconstrained augmented state using the satellite measurements Using the real-valued parameters of ambiguities, the method fixes 640b the ambiguities, and using the constrained ambiguities and the measurement model 622b, the method constrains 619b the augmented state by determining a relationship between the satellite measurements and the augmented state having the ambiguities as integers, resulting in a constrained relation. Next, the method determines 639b a one-step prediction of the parameters of the probabilistic distribution of constrained augmented state, and finally updates 649b the parameters of the probabilistic distribution of constrained augmented state.

The respective one-step predictions can be done using the motion model and the measurement model jointly using Kalman filter time updates. The updating of the parameters can similarly be done using the Kalman filter. For example, using an extended Kalman filter, some embodiments perform the time updating, i.e., one-step prediction as $$m_{k|k-1}^{x^f} = f_{k-1}\left(m_{k-1|k-1}^{x^f}\right),$$

$$m_{k|k-1}^{n^f} = G_k m_{k-1|k-1}^{n^f},$$

$$m_{k|k-1}^{y} = h_k\left(m_{k|k-1}^{x^f}\right) + G_k m_{k|k-1}^{n^f},$$

$$\Sigma_{k|k-1}^{x^f x^f} = F_{k-1}^f \Sigma_{k-1|k-1}^{x^f x^f} \left(F_{k-1}^f\right)^\top + W_{k-1},$$

$$\Sigma_{k|k-1}^{n^f n^f} = \Sigma_{k-1|k-1}^{n^f n^f} + V_{k-1},$$

$$\Sigma_{k|k-1}^{yy} = H_k^f \Sigma_{k|k-1}^{x^f x^f} \left(H_k^f\right)^\top + G_k \Sigma_{k|k-1}^{n^f n^f} G_k^\top + R_k,$$

$$\Sigma_{k|k-1}^{x^f y} = \Sigma_{k|k-1}^{x^f x^f} H_k^\top,$$

$$\Sigma_{k|k-1}^{n^f y} = \Sigma_{k|k-1}^{n^f n^f} G_k^\top,$$

-continued $$F_{k-1}^f = \frac{\partial f_{k-1}(x)}{\partial x}\bigg|_{x=m_{k-1|k-1}^{x^f}},$$

$$H_k^f = \frac{\partial h_k(x)}{\partial x}\bigg|_{x=m_{k|k-1}^{x^f}}.$$

Some embodiments constrain 640b the ambiguity to be integer values by solving the weighted least squares problem $$n_k^I = \arg\min_{n_k \in \mathbb{Z}^n} \left\| n_k - m_{k|k}^{n^f} \right\|_{\left(\Sigma_{k|k}^{n^f n^f}\right)^{-1}},$$

wherein the weight is the updated second moment of the unconstrained augmented state, and wherein $m_{k|k}^{n^f}$ is the first moment of the real-valued, i.e., unconstrained, ambiguity.

Some embodiments are based on the recognition that ambiguities have a jump behavior due to the presence of occasional cycle slips. The ambiguities are likely to remain constant over long periods of time before single ambiguities suddenly jump to new integer values during a cycle slip event. Some embodiments detect the cycle slip by modeling the ambiguity time evolution, i.e., the ambiguity motion model 622b as a discrete random walk. In some embodiments, for an ambiguity n, the time evolution of the ambiguity is modeled as the discrete $$n_k = n_{k-1} + \underline{v}_{k-1},$$

$$\underline{v}_{k-1} \sim \mathcal{N}(v_{k-1}|0, V_{k-1}),$$

$$V_{k-1} = \mathrm{diag}(c_k \sigma_{jump}^2 + (1-c_k)\sigma_{stay}^2),$$

random walk

Wherein $\sigma_{jump}^2$ is a variance reflecting the width of the domain of the integer jump process, $\sigma_{stay}^2$ is a regularization term, and $c_{i,k}$ that determines whether a cycle slip has occurred.

In some embodiments, the difference between the satellite measurements and the predicted satellite measurements is formed to determine whether a cycle slip has occurred. For example, one embodiment forms the difference as $\delta y_k = \mathbb{E}[y_k - y_k^f]$ and recognizes that between two consecutive timestamps, the most likely event that causes a sudden change in said difference is due to cycle slip. Hence, the difference equals $\delta y_k = G_k \delta n_k \Leftrightarrow \delta n_k = (G_k^T G_k)^{-1} G_k \delta y_k$, which means that if any dimension of the difference in ambiguity, $\delta n_k$, is sufficiently far away from the origin, determined by a threshold d, it is because of a cycle slip. In one embodiment the incidence $c_{i,k}$ is determined as $$c_{i,k} = \begin{cases} 1 & \text{if } |\delta n_{i,k}| > d \\ 0 & \text{otherwise} \end{cases}.$$

Figure 6C:
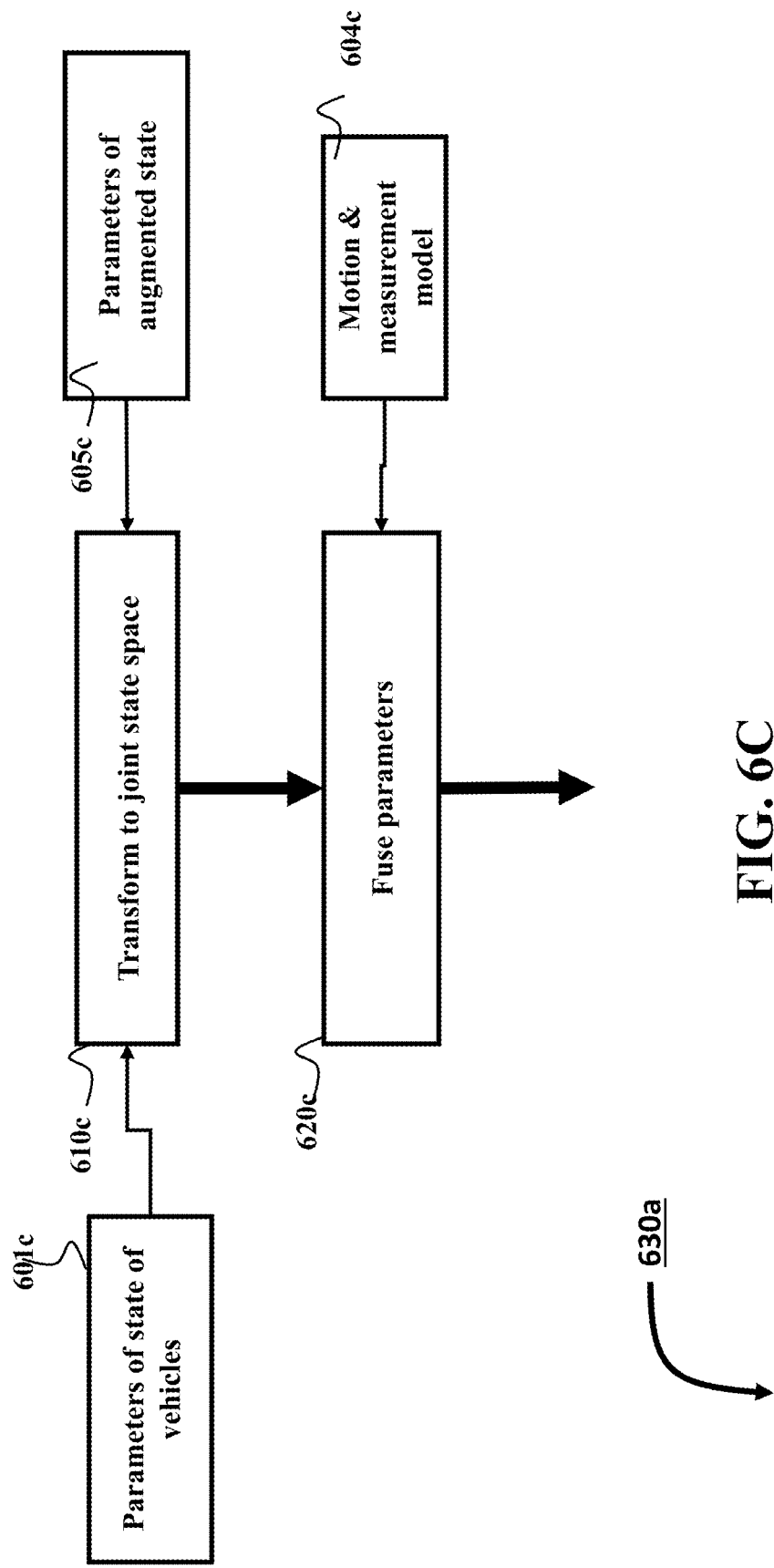
FIG. 6C shows a flowchart of a method for fusing multiple states of the vehicle with the augmented state according to some embodiments.

FIG. 6C shows a flowchart of a method 630a for fusing multiple states of the vehicle with the augmented state according to some embodiments. Since the state of the vehicles and the augmented state generally are not of the same dimension, the states need to be transformed to a joint state space that equally represents the different states. In one implementation, the method 630a transforms 610c the parameters of the states of the vehicle to the same state space as the parameters of the augmented state.

In one embodiment, for an augmented state distribution with the first and second moments, $p(x^g|\hat{x}^g, \Sigma^g)$, and state of a vehicle as $x^l$, the transformation is defined by $x^l = T_{g \to l} x^g = LL^\top x^g$, which means there are two sets of the first and second moments defined in the augmented state space, $\mu_A = T_{g \to l}^\top \hat{x}^l$, $\Sigma_A = T_{g \to l}^\top \Sigma^l T_{g \to l}$, $\mu_B = \hat{x}^g$, $\Sigma_B = \Sigma^g$. In one embodiment, the state space is equal and such transformation need not be done. Using the transformed parameters, the method fuses 620c to form an updated set of parameters of the probabilistic distribution.

The fusing can be done in many ways. In one embodiment, the fusing 620c of parameters is done as a weighted combination between the augmented state and the state of each vehicle. For example, one embodiment fuses the first and second moment as a convex combination of moments, $\hat{x}^f w_A \mu_A + w_B \mu_B$, $P^f = w_A \Sigma_A + w_A (\mu_A - \hat{x}^f)^\top + w_B \Sigma_B + w_B (\mu_B - \hat{x}^f)(\mu_B - \hat{x}^f)^\top$, wherein the weights are determined by minimizing the determinant of the fused covariance, $$w_A = \underset{w_A}{\operatorname{argmin}} \det(P^f), \quad w_B = 1 - w_A.$$

In other embodiments, the weights are determined by minimizing the trace of the fused covariance $$w_A = \underset{w_A}{\operatorname{argmin}} Tr(P^f), \quad w_B = 1 - w_A.$$

In yet another embodiment, the weights are determined by setting the weights according to the ratio $$w_A = \frac{Tr(\Sigma_A)^{-1}}{Tr(\Sigma_A)^{-1} + Tr(\Sigma_B)^{-1}}, \quad w_B = 1 - w_A.$$

In yet a different embodiment, the fusing is done according to the weighted combination $$P^f = \left( w_A \Sigma_A^{-1} + w_B \Sigma_B^{-1} \right)^{-1},$$
$$K_A = w_A P^f \Sigma_A^{-1},$$
$$K_B = w_B P^f \Sigma_B^{-1},$$
$$\hat{x}^f = K_A \mu_A + K_B \mu_B.$$

Figure 6D:
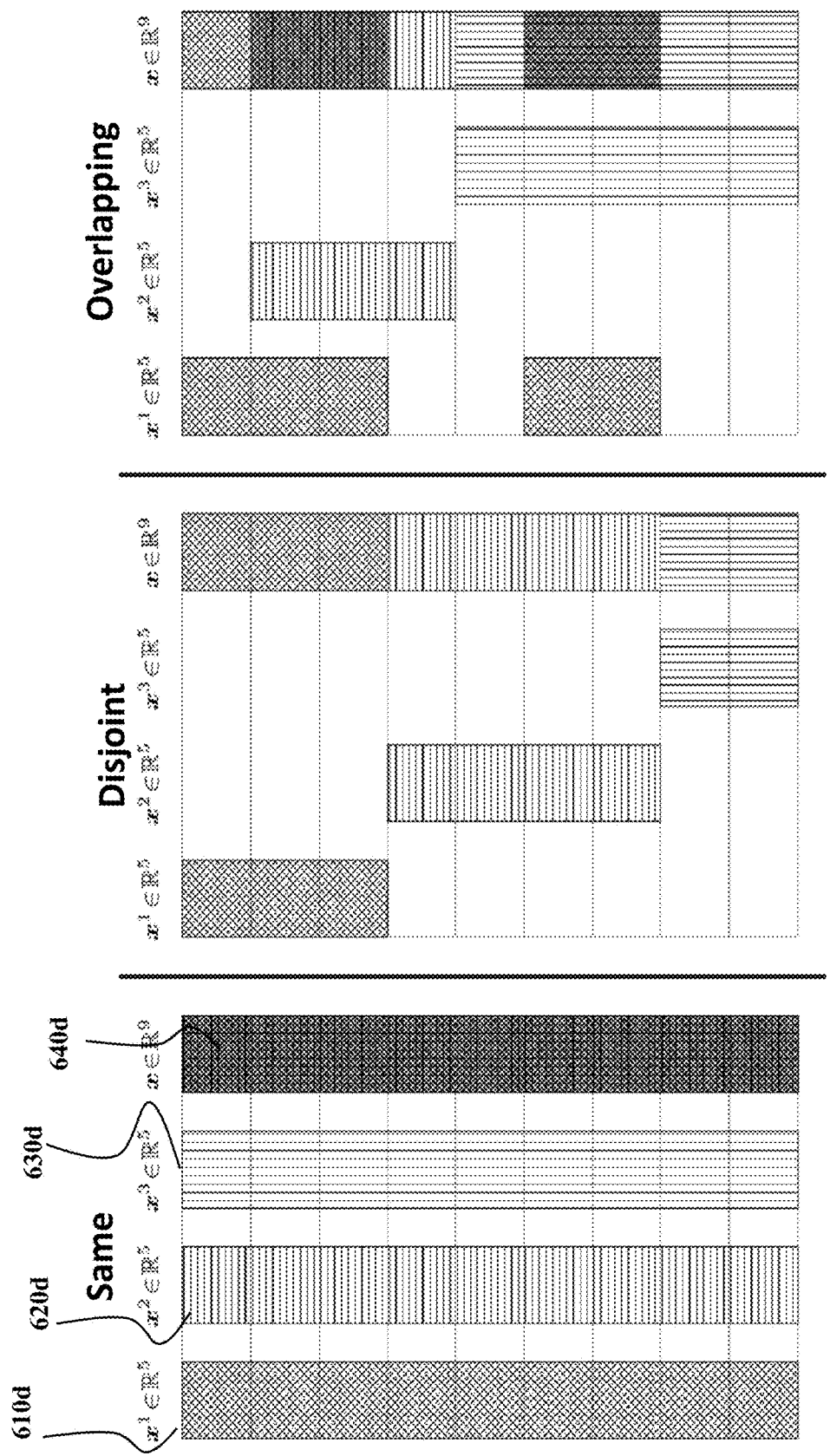
FIG. 6D shows an example of the overlapping of state space according to some embodiments.

FIG. 6D shows an example of the overlapping of state space according to some embodiments. In the left part of FIG. 6D, the state spaces are similar between the three different vehicles 610d, 620d, 630d, and the augmented state 640d, that is, there is no transformation needed between the two. In the middle part of FIG. 6D, the state spaces are completely disjoint, whereas in the right figure there is overlap between the states.

The above-described fusion rules are conservative since they do not consider the cross-covariance between the augmented state and the state of the vehicle.

Figure 6E:
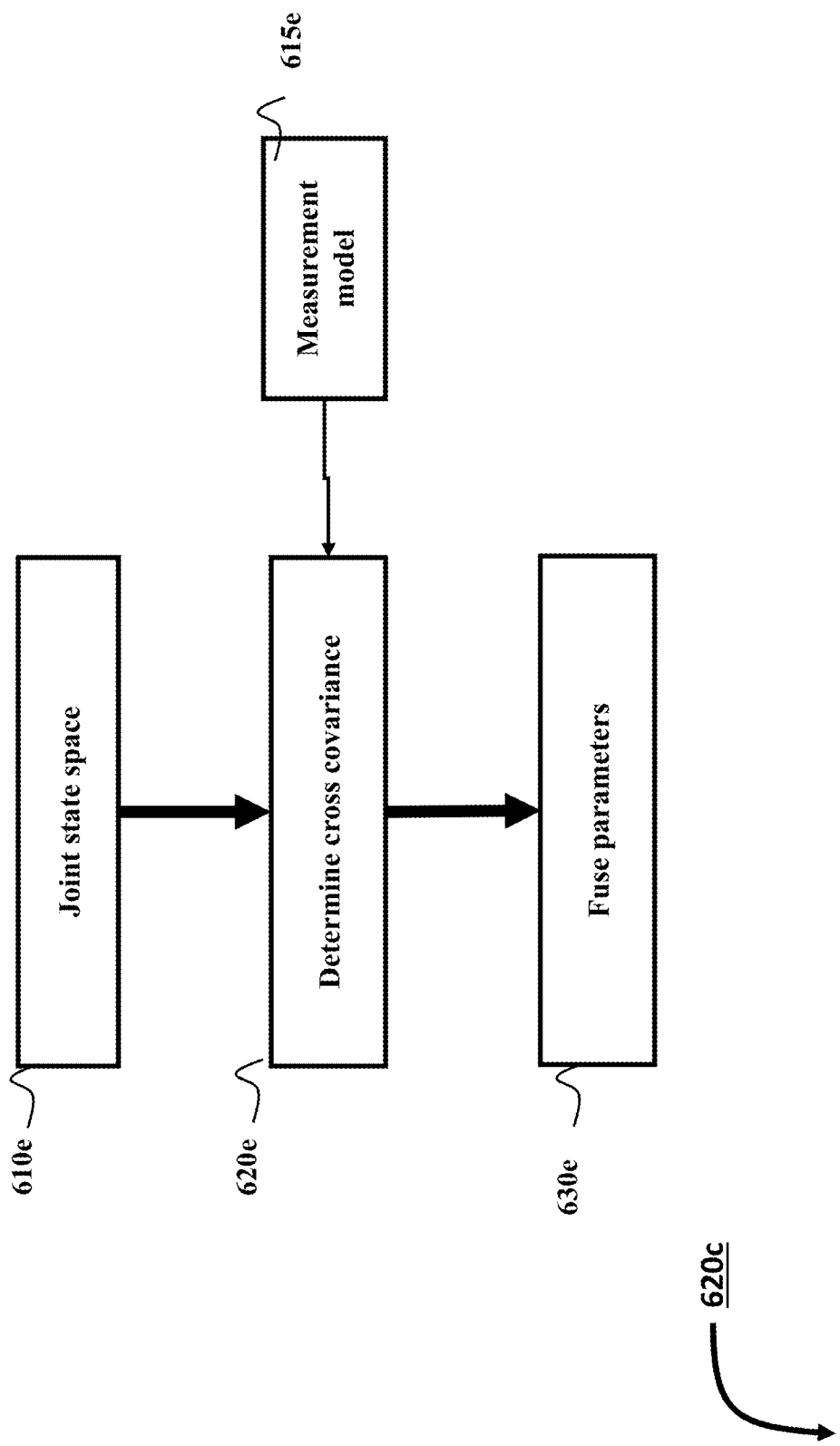
FIG. 6E shows a flowchart of a method for fusing the augmented state with the state of vehicles according to some embodiments.

FIG. 6E shows a flowchart of a method 620c for fusing the augmented state with the state of vehicles according to some embodiments. If necessary, such as in the third case in FIG. 6D, the method uses the transformed 610e parameters to joint state space and a measurement model 615e of satellite measurements to recursively update the cross-covariance between the state of vehicles, and state of the vehicle and augmented state. Finally, the method fuses 630e the first and second moment according to the determined cross-covariance.

The recursive determining 620e the cross-covariance can be done in multiple ways. For example, one embodiment recognizes that if a Kalman filter is used, for example, an extended Kalman filter, a linear-regression Kalman filter, a mixed-integer extended Kalman filter, or a mixed-integer linear-regression Kalman filter, the cross-covariance can be determined recursively at each time step k of estimation. This is because the probabilistic distribution in such a filter is represented by the first two moments in the form of a Gaussian distribution.

Figure 6F:
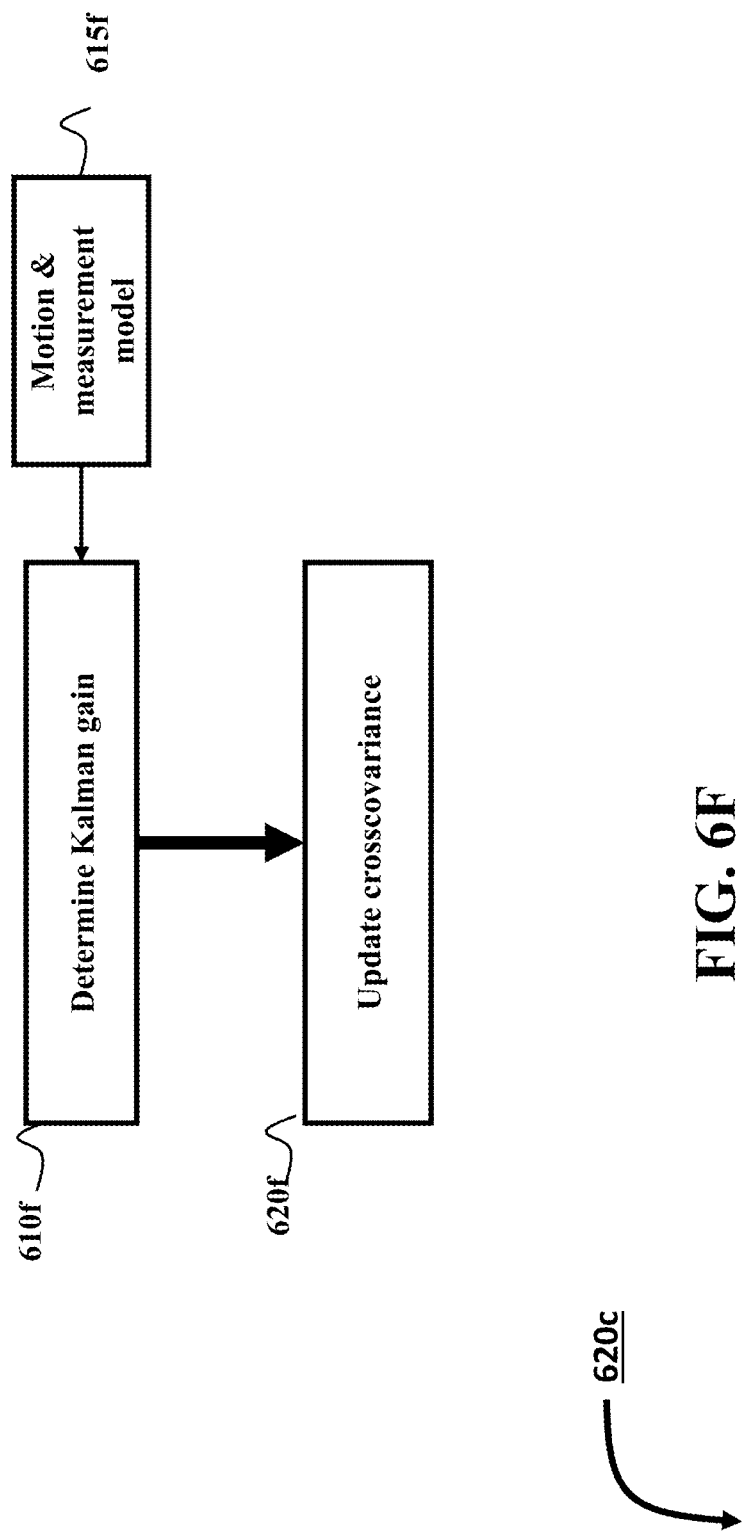
FIG. 6F shows a flowchart of a method for determining the crosscovariance according to one embodiment.

FIG. 6F shows a flowchart of a method 620c for determining the cross-covariance according to one embodiment. Using a motion model and a measurement model 615f of the augmented state and the state of the vehicles, the method determines 610f the Kalman gain of the involved Kalman filters. For example, one embodiment determines the Kalman gain for the vehicles and the Kalman gain for the Kalman filter estimating the augmented state, wherein the Kalman gain is determined according to well-established techniques.

One embodiment is based on the recognition that if a Kalman filter is used, the probabilistic distribution is on the Gaussian form $\mathcal{N}(\hat{x}_{k|k}{}^i, P_{k|k}{}^{ii})$, wherein $\hat{x}_{k|k}{}^i$ is the first moment and $P_{k|k}{}^{ii}$ the second moment. If using a Kalman filter, updating the first two moments using the measurements $y_k^i$ is done with a Kalman gain $K_k^i$. For a set of N vehicles, one embodiment stacks the transformed state of vehicles into the state vector $\hat{x}_{k|k}{}^l = [(\hat{x}_{k|k}^i)^\top, \ldots, (\hat{x}_{k|k}^N)^\top]^\top$. One embodiment determines the cross-covariance between the state of vehicles as $$P_{k|k}^{ll} = \mathbb{E}\left[ (x_k - \hat{x}_{k|k}^l)(x_k - \hat{x}_{k|k}^l)^\top \right]$$

$$= \mathbb{E}\left[ \begin{bmatrix} x_k^1 - \hat{x}_{k|k}^1 \\ \vdots \\ x_k^N - \hat{x}_{k|k}^N \end{bmatrix} \begin{bmatrix} x_k^1 - \hat{x}_{k|k}^1 \\ \vdots \\ x_k^N - \hat{x}_{k|k}^N \end{bmatrix}^\top \right]$$

$$= \begin{bmatrix} P_{k|k}^{11} & \cdots & P_{k|k}^{1N} \\ \vdots & \ddots & \vdots \\ P_{k|k}^{N1} & \cdots & P_{k|k}^{NN} \end{bmatrix},$$

Wherein $P_{k|k}^{ij} = (I - K_k^i C^{ii})(A^{ii} P_{k-1|k-1}^{ij} (A^{jj})^\top - Q^{ij})$ $(I - K_k^j C^{jj})^\top + K_k^i R^{ij} (K_k^j)^\top$ is the cross-covariance that is recursively determined as a function of the Kalman gain, and wherein $A^{ii}$ and C exemplifies a motion model and measurement model matrix, respectively.

Some embodiments employ stacked motion models, where the motion model can be a stacked vehicle dynamics model, a stacked constant acceleration model, a stacked constant position model, a stacked coordinated turn model, a stacked Singer model, or a combination of different stacked models, wherein the stacking means the stacking of multiple models after each other. For example, for a model of the motion of a vehicle $$x_{k+1}^i = A^i x_k^i + q_k^{x,i}, \forall i = 1, \ldots, |\mathcal{A}|,$$
$$n_{k+1}^i = n_k^i + q_k^{n,i}, \forall i = 1, \ldots, |\mathcal{A}|,$$
$$\theta_{k+1}^I = \theta_k^I + q_k^I,$$
$$\theta_{k+1}^P = \theta_k^P + q_k^P,$$
$$\theta_{k+1}^C = \theta_k^C + q_k^C.$$

where $|\mathcal{A}|$ is the number of vehicles, $$x_{k+1}^i$$
$$n_{k+1}^i$$

are the motion states and ambiguity, and $$\theta_{k+1}^I$$
$$\theta_{k+1}^P$$
$$\theta_{k+1}^C$$

are residual bias states, $$X_k^g = [(x_k^1)^\top, (x_k^1)^\top, \cdots (x_k^{|\mathcal{A}|})^\top, (x_k^{|\mathcal{A}|})^\top, (\theta_k^I)^\top, (\theta_k^P)^\top, (\theta_k^C)^\top]^\top,$$
$$q_k^g = [(q_k^{x,1})^\top, (q_k^{n,1})^\top, \cdots (q_k^{x,|\mathcal{A}|})^\top, (q_k^{n,|\mathcal{A}|})^\top, (q_k^I)^\top, (q_k^P)^\top, (q_k^C)^\top]^\top,$$

is the stacked, augmented, state, and augmented process noise of the motion model. Similarly, the GNSS measurement model can be defined in terms of the augmented state. For example, for a set of measurements $$y_k^{P,i} = [S^i \rho_{A_i,k}^{S_i} \quad\quad +S^i M^i \theta_k^I +S^i M^i \theta_k^P \quad\quad +r_k^{P,i}]$$
$$y_k^{\Phi,i} = [S^i \rho_{A_i,k}^{S_i} +\lambda n_k^i -S^i M^i \theta_k^I \quad\quad +S^i M^i \theta_k^C +r_k^{\Phi,i}]$$
$$y_k^{I,i} = [\quad\quad +M^i \theta_k^I \quad\quad +r_k^{I,i}]$$
$$y_k^{PRC,i} = [\quad\quad +M^i \theta_k^P +r_k^{PRC,i}]$$
$$y_k^{CPC,i} = [\quad\quad +M^i \theta_k^C +r_k^{CPC,i}],$$
$$y_k^i = [(y_k^{P,i})^\top (y_k^{\Phi,i})^\top (y_k^{I,i})^\top (y_k^{PRC,i})^\top (y_k^{CPC,i})^\top]^\top,$$

the full measurement model includes the measurements $\mathbf{y}_k = [(\mathbf{y}_k^1)^\top \ldots (\mathbf{y}_k^N)^\top]^\top$.

Another embodiment determines the cross-covariance between a state of a vehicle and the augmented state of the remote server as a function of the joint Kalman gains for the state of the vehicles $K_k^l = \text{blkdiag}(K_k^1, \ldots, K_k^N)$ and the Kalman gain of the Kalman filter of the remote server, as the combination $P_{k|k}^{lc} = \mathbb{E}[(x_k - \hat{x}_{k|k}^l)(x_k - \hat{x}_{k|k}^c)^\top] = (I - K_k^l C^l)(A^l P_{k-1|k-1}^{lc} A^\top + Q)(I - K_k^c C)^\top + K_k^l R(K_k)^\top$.

Alternatively or additionally, the Kalman gains are part of the received information 215a from the vehicles.

Other embodiments are based on the recognition that when using a particle filter, it can be problematic to compute the cross-covariances recursively because in such an approach the distributions are not represented only by the parameters as the first and second moment, but as a mixture of first and second moments as a Gaussian mixture. However, other embodiments recognize that for a particle filter the Kalman gain for the most likely particle can instead be used.

Using the determined 620e cross-covariance, the method 620c fuses 630e the parameters of the probabilistic distribution of the state of the vehicles with the parameters of the probabilistic distribution of the augmented state in the remote server. In one embodiment, the fusing of the first and second moments are done as a weighted combination of the involved first and second moment, respectively. For example, the fused first moment is determined based on the weighted difference between the first moments, wherein the weight is a weighted combination of the cross-covariance $\Sigma_{AB}$ and the individual covariance, $x^f = \mu_A + (\Sigma_A - \Sigma_{AB})(\Sigma_A + \Sigma_A - \Sigma_{AB} - \Sigma_{AB}^\top)^{-1}(\mu_B - \mu_A)$. Another embodiment determines the fused covariance based on the weighted difference between the second moments, wherein the weight is a weighted combination of the cross-covariance $\Sigma_{AB}$ and the individual covariance, $P^f = \Sigma_A - (\Sigma_A - \Sigma_{AB})(\Sigma_A + \Sigma_A - \Sigma_{AB} - \Sigma_{AB}^\top)^{-1}(\Sigma_A - \Sigma_{AB}^\top)$. Alternatively or additionally, the fused first and second moment is determined as $$K^f = ((H^f)^\top (\Sigma^p)^{-1} H^f)^{-1} (H^f)^\top (\Sigma^l)^{-1},$$
$$\mu^f = K^f \hat{x}^p,$$
$$\Sigma^f = K^f \Sigma^p (K^f)^\top = ((H^f)^\top (\Sigma^p)^{-1} H^f)^{-1}.$$

One embodiment recognizes that there are several inversions of potentially very high-dimensional matrices involved in fusing of the parameters. One embodiment uses Schur complements to reduce the size of the matrix that needs to be inverted to produce the fused covariance $\Sigma^f$.

Other embodiments are based on the understanding that when using measurements from multiple vehicles, there is sometimes extra information that can be deduced from the measurements.

Figure 6G:
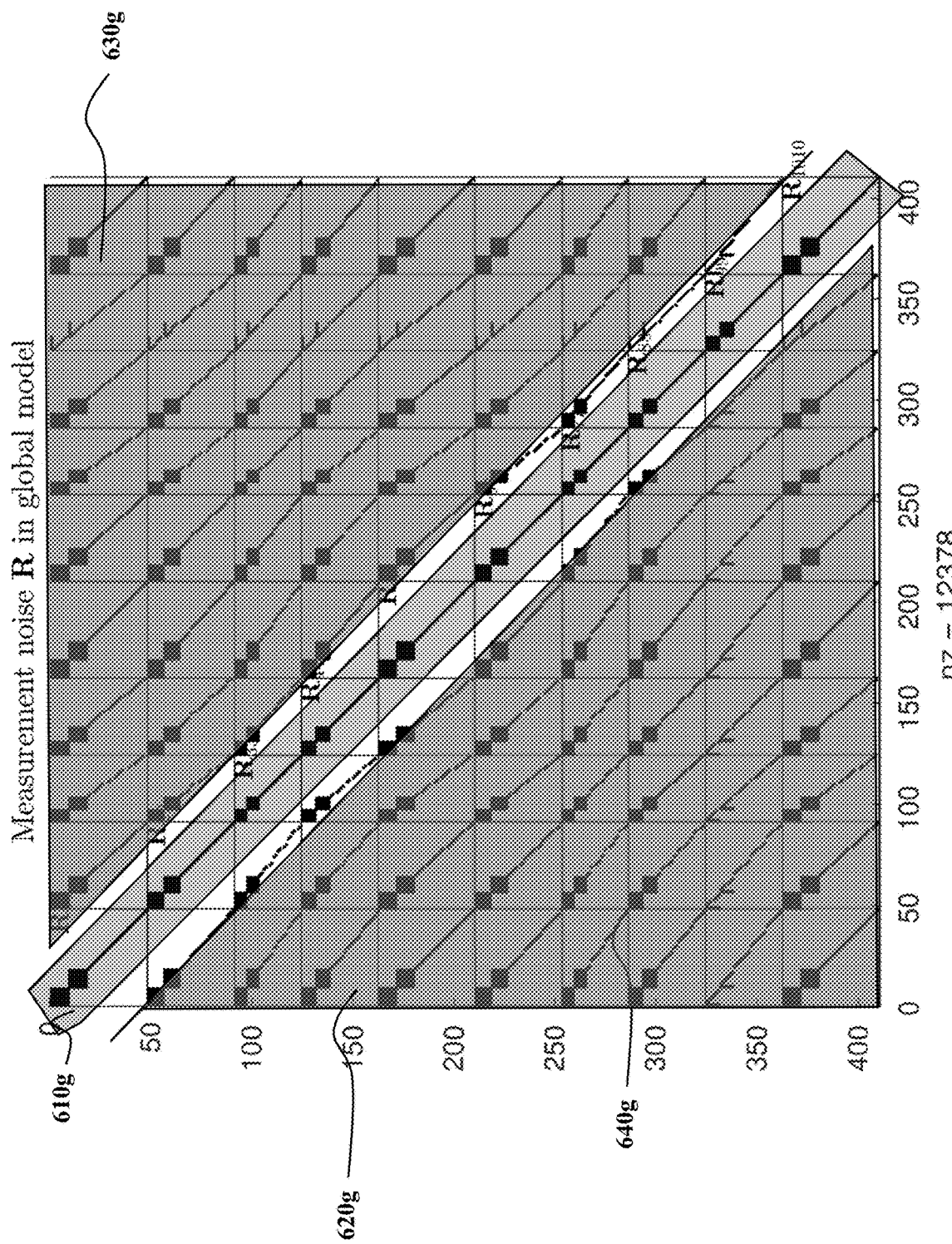
FIG. 6G shows an example of crosscovariance in the measurement noise of the full measurement model including measurements from multiple transmissions according to some embodiments.

FIG. 6G shows an example of cross-covariance in the measurement noise of the full measurement model including measurements from multiple transmissions from multiple vehicles according to some embodiments. FIG. 6G shows a matrix representing elements of the covariance of the measurement noise. When stacking measurements resulting in an augmented measurement model for the augmented state, but no satellites are shared between vehicles, the diagonal 610g will be the only part that has nonzero components. However, when vehicles share the same satellite that is used in creating the differenced satellite measurements, i.e., single difference or double difference, the off-diagonals 620g and 630g can, if modeled properly, have nonzero components 640g. Such nonzero components are utilized by the probabilistic filter to increase knowledge of the augmented state estimates.

Some embodiments understand that when the measurement noise matrix R has been formed, no matter whether there are off-diagonal nonzero elements or not, they can be used in the KF automatically. However, when having nonzero off-diagonals, i.e., nonzero cross-covariance, the KF can utilize this to better determine the Kalman gain that determines the update of the first and second moment based on the measurement error.

In one embodiment, the measurement noise matrix is formed by single and/or double differences of code and carrier phase measurements using principles such that there is cross-covariance between measurements. For example, in some implementations, the non-zero off-diagonal elements 640 are corresponding to a pair of vehicles and determined by a combination of covariances of the corresponding pairs of vehicles.

Figure 6H:
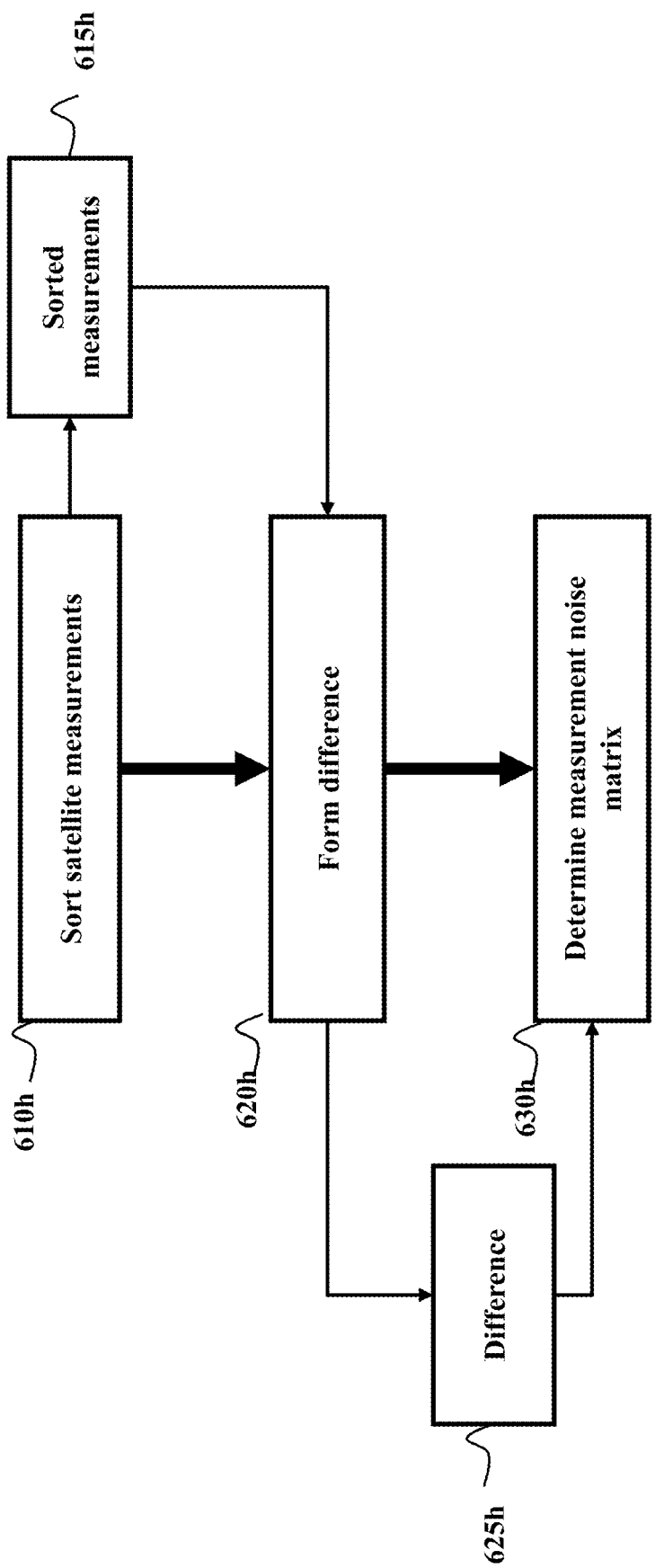
FIG. 6H shows a flowchart of a method for determining the measurement noise matrix such that it results in the structure in FIG. 6G.

FIG. 6H shows a flowchart of a method for determining the measurement noise matrix such that it results in the structure in FIG. 6G. The method sorts 610g of the satellite measurements, to form a structure of sorted satellite measurements 615h. For example, the measurements are sorted according to the elevation angle of the satellites, wherein the satellite with the highest elevation angle is the first highest, the second highest is second until the satellite with the lowest elevation angle is sorted last.

Next, the method forms 620h a difference between satellite measurements. This can be done in multiple ways, but the importance is to do it in such a manner that the correlation is visible. One embodiment defines a binary incidence matrix $M^i$ for vehicle i, wherein the binary incidence matrix is matrix picking elements from vectors. For example, let $v \in \mathbb{R}^{N_s}$ be a residual bias vector consisting of all unique biases and $v^i \in \mathbb{R}^{N_s^i}$ be the bias corresponding to the set of satellites $S_i$ for vehicle i, wherein $S=\{1, \ldots, N_S\}$ is the set of all of the possibly visible satellites and $S_i=\{s \in S | \text{satellite s is observed by agent } \mathcal{A}_i\} \subseteq S$, $|S_i|=N_s^i$ is the set of satellites visible for a vehicle i. Another embodiment defines a difference operator $S^i=[1_{M^i}]$. Using the binary incidence matrix and the difference operator, one embodiment forms the difference between satellite measurements as $$\Delta P_{A_i B,k}^{S_i} = P_{B,k}^{S_i} - P_{A_i,k}^{S_i},$$
$$\Delta \Phi_{A_i B,k}^{S_i} = \Phi_{B,k}^{S_i} - \Phi_{A_i,k}^{S_i}.$$

wherein $$P_{A_i,k}^{S_i} = M^i P_{A_i,k}^{S},$$
$$\Phi_{A_i,k}^{S_i} = M^i \Phi_{A_i,k}^{S}.$$

is the code and carrier measurement for vehicle i, determined from the set of all code and carrier phase measurements $$P_{A_i,k}^{S}$$
$$\Phi_{A_i,k}^{S}.$$

Other embodiments form the difference as the double-difference for a vehicle i as $$\nabla \Delta P_{A_i,k} = S^i \Delta P_{A_i B,k}^{S_i},$$
$$\nabla \Delta \Phi_{A_i,k} = S^i \Delta \Phi_{A_i B,k}^{S_i}.$$

In one embodiment, the defined binary incidence matrix and difference operator are used to rewrite the difference as $$\nabla \Delta P_{A_i,k} = S^i \Delta P_{A_i B,k}^{S_i} = S^i [P_{B,k}^{S_i} - P_{A_i,k}^{S_i}] = S^i$$
$$[M^i P_{B,k}^S - M^i P_{A_i,k}^S] = S^i M^i [P_{B,k}^S - P_{A_i,k}^S], \quad \nabla \Delta \Phi_{A_i,k} =$$
$$S^i \Delta \Phi_{A_i B,k}^{S_i} = S^i [\Phi_{B,k}^{S_i} - \Phi_{A_i,k}^{S_i}] = S^i [M^i \Phi_{B,k}^S - M^i \Phi_{A_i,k}^S] = S^i M^i [$$
$$\Phi_{B,k}^S - \Phi_{A_i,k}^S].$$

Another embodiment models the nominal code and carrier noise as Gaussian random variables, with covariance $\text{Cov}(\epsilon_{\mathcal{A}_i,k}^{s_l}, \epsilon_{\mathcal{A}_i,k}^{s_m}) = (\sigma_{\epsilon,k}^{s_l})^2$ and $\text{Cov}(\eta_{\mathcal{A}_i,k}^{s_l}, \eta_{\mathcal{A}_i,k}^{s_m}) = (\sigma_{\eta,k}^{s_l})^2$ when $s_l = s_m$. In other words, the double-difference can be expressed with the binary incidence matrix, difference operator, and nominal noise as $$\nabla \Delta P_{A_i,k} - \mathbb{E}[\nabla \Delta P_{A_i,k}] = S^i M^i (\epsilon_{B,k}^S - \epsilon_{A_i,k}^S)$$
$$\nabla \Delta \Phi_{A_i,k} - \mathbb{E}[\nabla \Delta \Phi_{A_i,k}] = S^i M^i (\eta_{B,k}^S - \eta_{A_i,k}^S).$$

Using the difference 625h, the method determines 630h the measurement noise matrix having nonzero off-diagonal elements as illustrated in FIG. 6G.

In one embodiment, determining 630h the measurement noise matrix having nonzero off-diagonal elements is done by choosing satellites with the same base station when doing the differencing. In one embodiment the covariance between a vehicle i and a vehicle j, is formed and this leads to $R_{ij,k}^{\Phi\Phi} \triangleq \text{Cov}(\nabla \Delta \Phi_{A_i,k}, \nabla \Delta \Phi_{A_j,k}) = S^i M^i R_{\eta\eta,k} (M^j)^\top (S^j)^\top$, for the carrier phase measurements and similarly for the code measurements. In other words, by determining the differencing compared to the same base satellite, the update of the first and second moments of the augmented using the KF can be done using extra information contained in the satellite measurements, because satellites are shared among vehicles, i.e., a satellite measure several vehicles.

Figure 7:
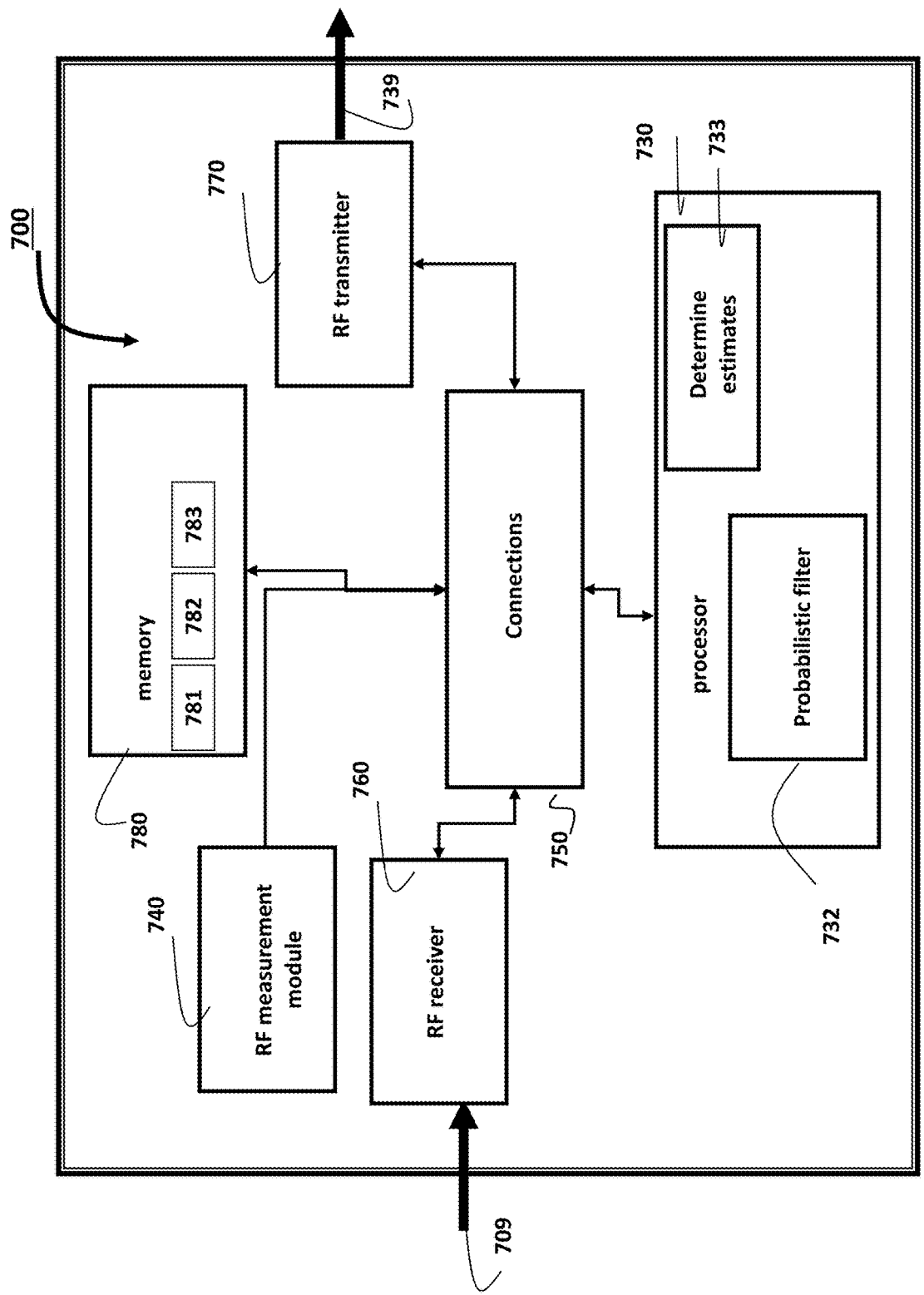
FIG. 7 shows a probabilistic system for tracking a state of multiple vehicles using unsynchronized cooperation of information received from vehicles transmitted over an RF channel according to some embodiments.

FIG. 7 shows a server 700 for tracking states of multiple vehicles using unsynchronized cooperation of information received from vehicles, e.g., transmitted over an RF channel 709, according to some embodiments. The server includes an RF receiver 760 for receiving the first and second moment, and satellite measurements, and corresponding measurement noise of said measurements from multiple transmissions from multiple vehicles.

The system includes a memory 780 that stores 781 a probabilistic measurement model relating incoming satellite measurements with a state of a vehicle. The memory also stores 782 a probabilistic motion model relating a previous state of a vehicle with a prediction of a state of a vehicle according to the motion model. For example, the motion model can be a stacked vehicle dynamics model, a stacked constant acceleration model, a stacked constant position model, a stacked coordinated turn model, a stacked Singer model, or a combination of different stacked models, wherein the stacking means the stacking of multiple models after each other.

The memory also stores instructions 783 to execute a probabilistic filter according to some embodiments of the invention.

The probabilistic system 700 includes an RF measurement module 740 that is operatively connected 750 to an RF receiver 760 that receives information 709 transmitted over an RF channel from multiple vehicles. In some embodiments, the information includes a first moment and a second moment of multiple vehicles. In other embodiments, the information includes satellite signals received from said vehicles, wherein the signals include satellite measurements, position information, and timing information.

Some embodiments relate the first and second moments of the state of a previous time step with the first and second moments of the state in a current time step using the motion model. For example, one embodiment propagates the first and second moments of the state of the vehicle in time till a current instance of time using a model of time propagation using the motion model. Examples of the model of time propagation include a Singer model, a constant acceleration model, and a single-track vehicle model. Using both moments in time propagation is advantageous over propagating just a first moment because the propagation of uncertainty, hence how much the first moment should be trusted when updating the state, is taken into account. In other embodiments, the time propagation is done by a combination of a motion model of the vehicle and the measurements of the vehicle.

In various embodiments, the probabilistic system uses the first and second moment and satellite measurements to update the first and second moments using information received from multiple transmissions from multiple vehicles. For example, the GNSS signals are received and upon receiving the signals, a processor 730 determines 733 updated first and second moments using a probabilistic filter 732.

In other embodiments, the probabilistic system 700 includes an RF transmitter 770 for transmitting 739 the updated first and second moment, i.e., mean and covariance, that corresponds to a vehicle. For example, the mean and covariance of vehicle 1 are transmitted to vehicle 1.

Exemplar Embodiments

Figure 8:
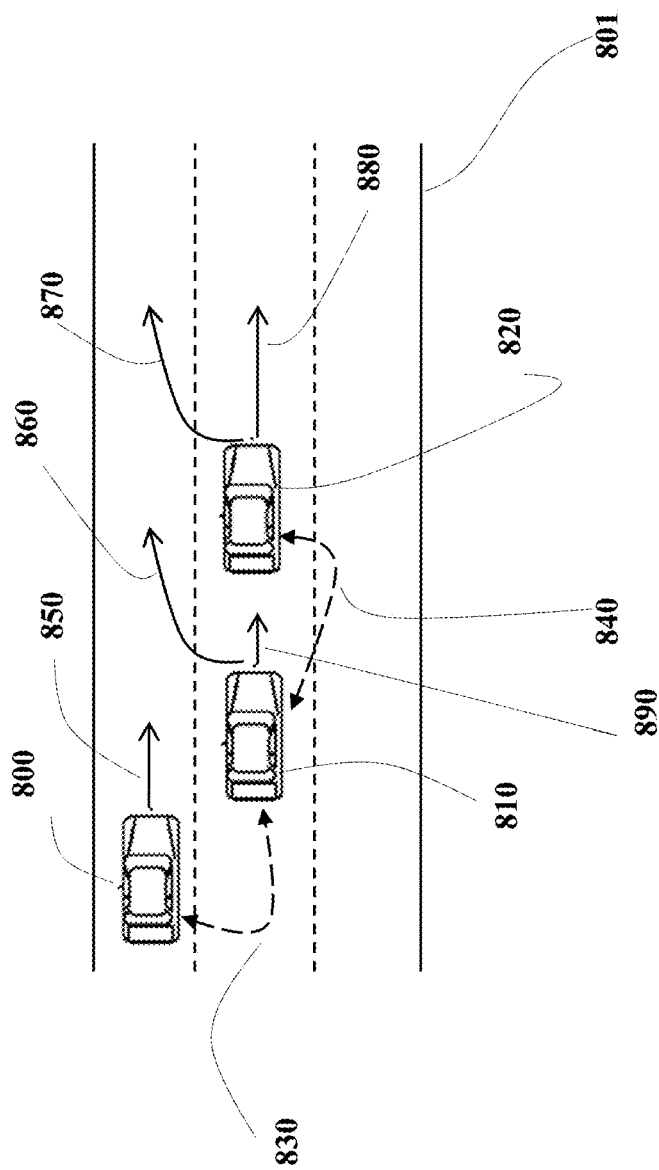
FIG. 8 shows an example of a vehicle-to-vehicle (V2V) communication and planning based on state estimation according to one embodiment.

FIG. 8 shows an example of a vehicle-to-vehicle (V2V) communication and planning based on state estimation according to one embodiment. As used herein, each vehicle can be any type of moving transportation system, including a passenger car, a mobile robot, or a rover. For example, a vehicle can be autonomous or semi-autonomous.

In this example, multiple vehicles 800, 810, 820, are moving on a given freeway 801. Each vehicle can make many motions. For example, the vehicles can stay on the same path 850, 890, 880, or can change paths (or lanes) 860, 870. Each vehicle has its own sensing capabilities, e.g., Lidars, cameras, etc. Each vehicle has the possibility to transmit and receive 830, 840 information with its neighboring vehicles and/or can exchange information indirectly through other vehicles via a remote server. For example, vehicles 800 and 880 can exchange information through vehicle 810. With this type of communication network, the information can be transmitted over a large portion of the freeway or highway 801.

Some embodiments are configured to address the following scenario. For example, vehicle 820 wants to change its path and chooses option 870 in its path planning. However, at the same time, vehicle 810 also chooses to change its lane and wants to follow option 860. In this case, the two vehicles might collide, or at best vehicle 810 will have to execute an emergency brake to avoid colliding with vehicle 820. This is where the present invention can help. To that end, some embodiments enable the vehicles to transmit not only what the vehicles sense at the present time instant t, but also, additionally or alternatively, transmit what the vehicles are planning to do at time T+δ$_t$.

In the example of FIG. 8, vehicle 820 informs of its plan to change lane to vehicle 810 after planning and committing to execute its plan. Thus, vehicle 810 knows that in 8*t* time interval the vehicle 820 is planning to make a move to its left 870. Accordingly, vehicles 810 can select the motion 890 instead of 860, i.e., staying on the same lane.

Additionally or alternatively, the motion of the vehicles can be jointly controlled by the remote server based on state estimations determined cooperatively. For example, in some embodiments, the multiple vehicles determined for joint state estimation are the vehicles that form and potentially can form a platoon of vehicles jointly controlled with a shared control objective.

Figure 9:
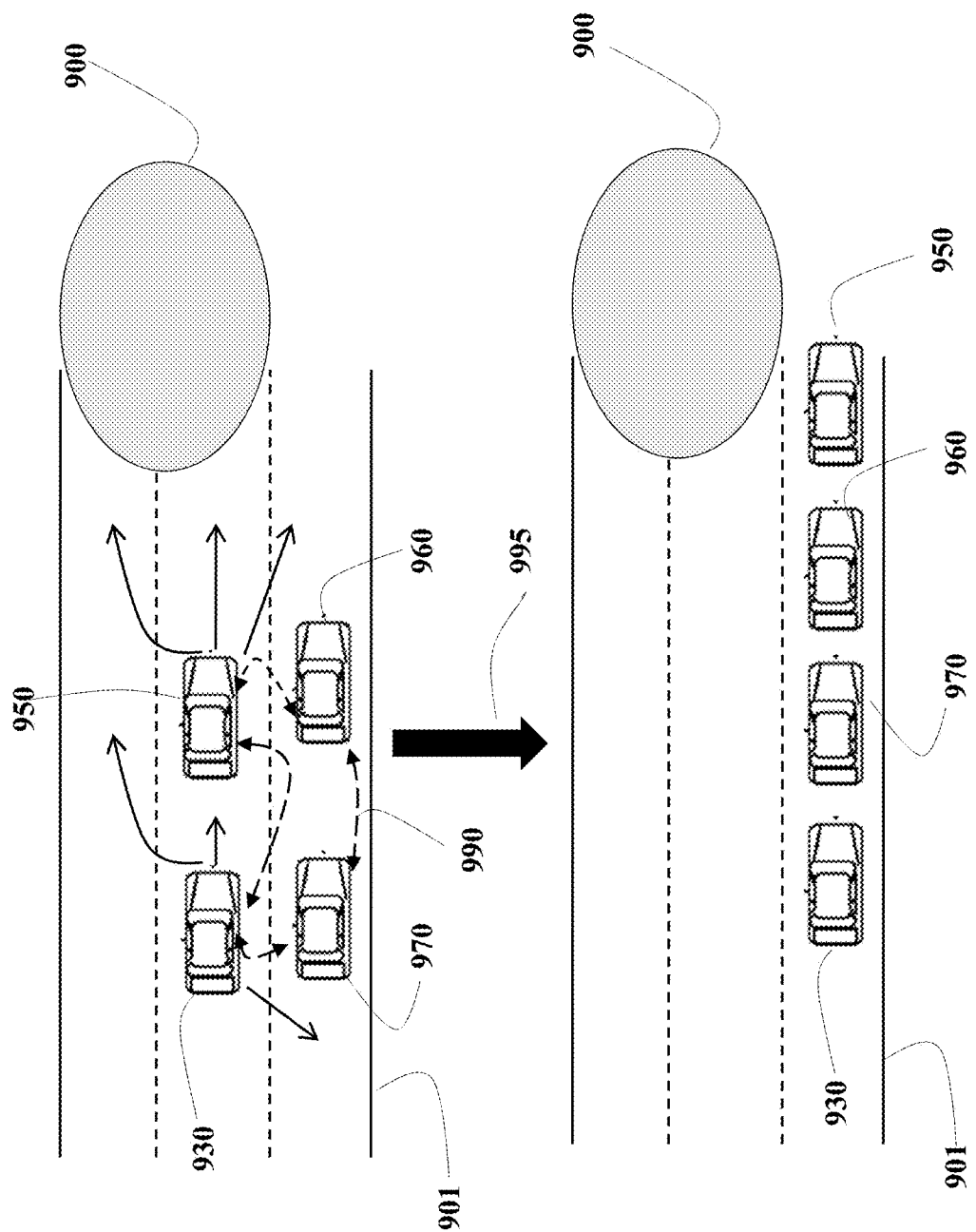
FIG. 9 is a schematic of a multi-vehicle platoon shaping for accident avoidance scenario according to one embodiment.

FIG. 9 is a schematic of a multi-vehicle platoon shaping for an accident avoidance scenario according to one embodiment. For example, consider a group of vehicles 930, 970, 950, 960, moving on a freeway 901. Consider now that suddenly, there is an accident ahead of the vehicle platoon in zone 900. This accident renders zone 900 unsafe for the vehicles to move. The vehicles 920, 960 sense the problem for example with a camera, and communicate this information to the vehicles 930, 970. The platoon then executes a distributed optimization algorithm, e.g., formation keeping multi-agent algorithm, which selects the best shape of the platoon to avoid the accident zone 900 and also to keep the vehicle flow uninterrupted. In this illustrative example, the best shape of the platoon is to align and form a line 995, avoiding zone 900.

Figure 10:
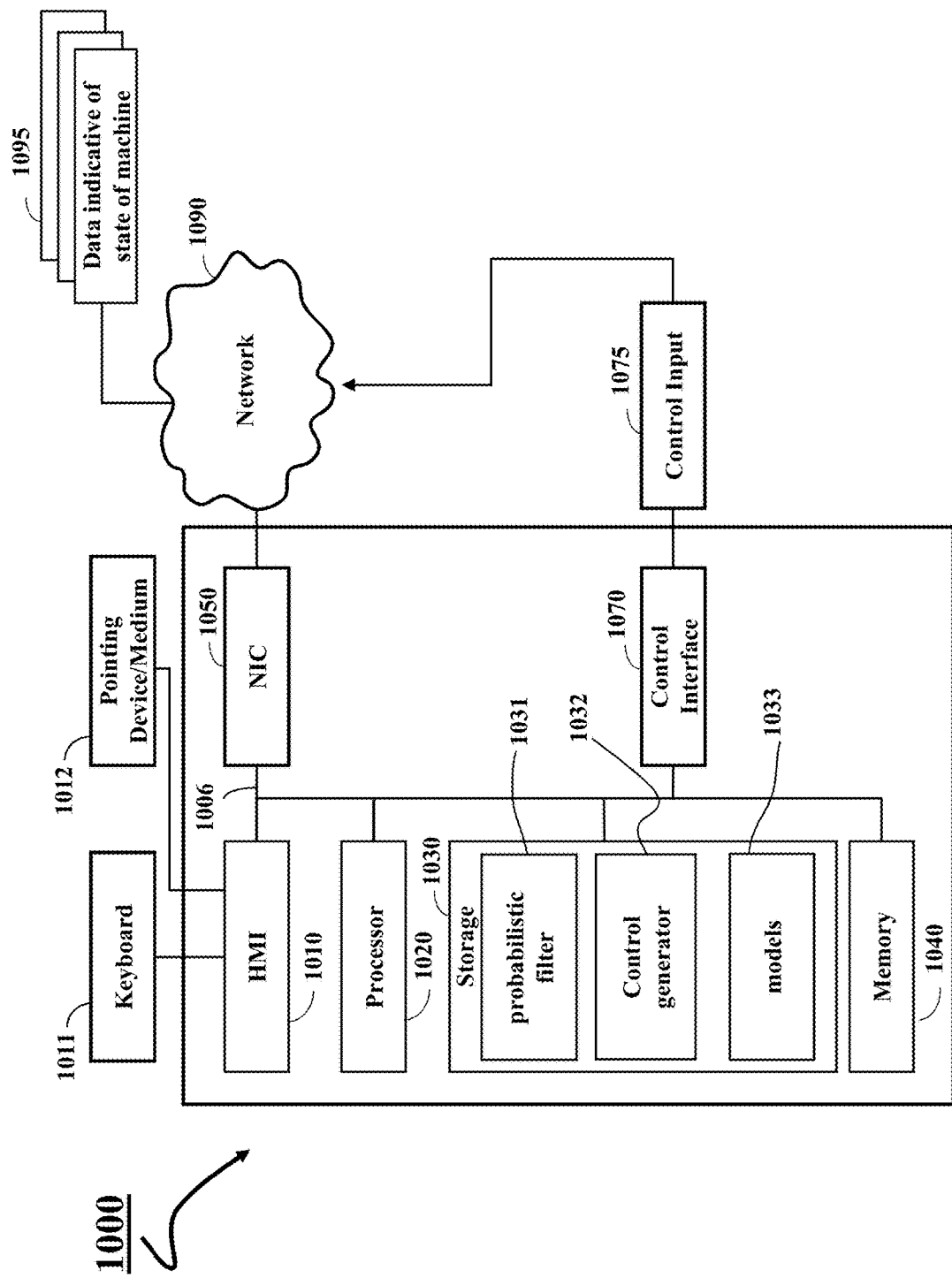
FIG. 10 shows a block diagram of a system 1000 for direct and indirect control of mixed-autonomy vehicles in accordance with some embodiments.

FIG. 10 shows a block diagram of a system 1000 for direct and indirect control of mixed-autonomy vehicles in accordance with some embodiments. The system 1000 can be arranged on a remote server as part of RSU to control the passing mixed-autonomy vehicles including autonomous, semiautonomous, and/or manually driven vehicles. The system 1000 can have a number of interfaces connecting the system 1000 with other machines and devices. A network interface controller (NIC) 1050 includes a receiver adapted to connect the system 1000 through the bus 1006 to a network 1090 connecting the system 1000 with the mixed-automata vehicles to receive a traffic state of a group of mixed-autonomy vehicles traveling in the same direction, wherein the group of mixed-autonomy vehicles includes controlled vehicles willing to participate in a platoon formation and at least one uncontrolled vehicle, and wherein the traffic state is indicative of a state of each vehicle in the group and the controlled vehicle. For example, in one embodiment the traffic state includes current headways, current speeds, and current acceleration of the mixed-automata vehicles. In some embodiments, the mixed-automata vehicles include all uncontrolled vehicles within a predetermined range from flanking controlled vehicles in the platoon.

The NIC 1050 also includes a transmitter adapted to transmit the control commands to the controlled vehicles via the network 1090. To that end, system 1000 includes an output interface, e.g., a control interface 1070, configured to submit the control commands 1075 to the controlled vehicles in the group of mixed-autonomy vehicles through the network 1090. In such a manner, the system 1000 can be arranged on a remote server in direct or indirect wireless communication with the mixed-automata vehicles.

The system 1000 can also include other types of input and output interfaces. For example, system 1000 can include a human-machine interface 1010. The human-machine interface 1010 can connect the controller 1000 to a keyboard 1011 and pointing device 1012, wherein the pointing device 1012 can include a mouse, trackball, touchpad, joystick, pointing stick, stylus, or touchscreen, among others.

The system 1000 includes a processor 1020 configured to execute stored instructions, as well as a memory 1040 that stores instructions that are executable by the processor. The processor 1020 can be a single-core processor, a multi-core processor, a computing cluster, or any number of other configurations. The memory 1040 can include random access memory (RAM), read-only memory (ROM), flash memory, or any other suitable memory machines. The processor 1020 can be connected through the bus 1006 to one or more input and output devices.

The processor 1020 is operatively connected to a memory storage 1030 storing the instruction as well as processing data used by the instructions. The storage 1030 can form a part of or be operatively connected to the memory 1040. For example, the memory can be configured to store a probabilistic filter 1031 trained to track the augmented state of mixed-automata vehicles, transform the traffic state into target headways for the mixed-autonomy vehicles; and store a one or multiple models 1033 configured to explain the motion of the vehicles. For example, models 1033 can include motion models, measurement models, traffic models, and the like.

The processor 1020 is configured to determine control commands for the controlled vehicles that indirectly control the uncontrolled vehicles as well. To that end, the processor is configured to execute a control generator 1032 to determine control commands based on the state of the vehicles. In some embodiments, the control generator 1032 uses a deep reinforcement learning (DRL) controller trained to generate control commands from the augmented state for an individual and/or a platoon of vehicles.

Figure 11A:
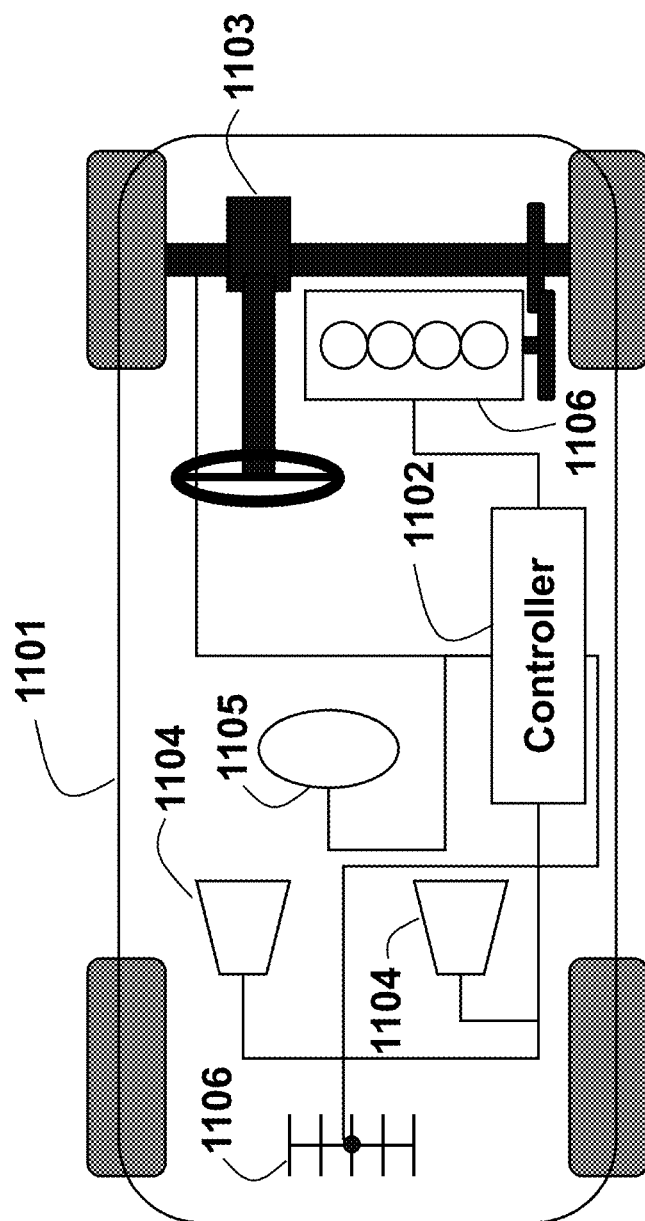
FIG. 11A shows a schematic of a vehicle 1101 controlled directly or indirectly according to some embodiments.

FIG. 11A shows a schematic of a vehicle 1101 controlled directly or indirectly according to some embodiments. As used herein, vehicle 1101 can be any type of wheeled vehicle, such as a passenger car, bus, or rover. Also, vehicle 1101 can be autonomous or semi-autonomous. For example, some embodiments control the motion of vehicle 1101. Examples of the motion include the lateral motion of the vehicle controlled by a steering system 1103 of the vehicle 1101. In one embodiment, the steering system 1103 is controlled by the controller 1102 in communication with the system 1000. Additionally or alternatively, the steering system 1103 can be controlled by a driver of vehicle 1101.

The vehicle can also include an engine 1106, which can be controlled by the controller 1102 or by other components of the vehicle 1101. The vehicle can also include one or more sensors 1104 to sense the surrounding environment. Examples of sensors 1104 include distance range finders, radars, lidars, and cameras. The vehicle 1101 can also include one or more sensors 1105 to sense its current motion quantities and internal status. Examples of the sensors 1105 include global positioning system (GPS), accelerometers, inertial measurement units, gyroscopes, shaft rotational sensors, torque sensors, deflection sensors, pressure sensor, and flow sensors. The sensors provide information to the controller 1102. The vehicle can be equipped with a transceiver 1106 enabling communication capabilities of the controller 1102 through wired or wireless communication channels.

Figure 11B:
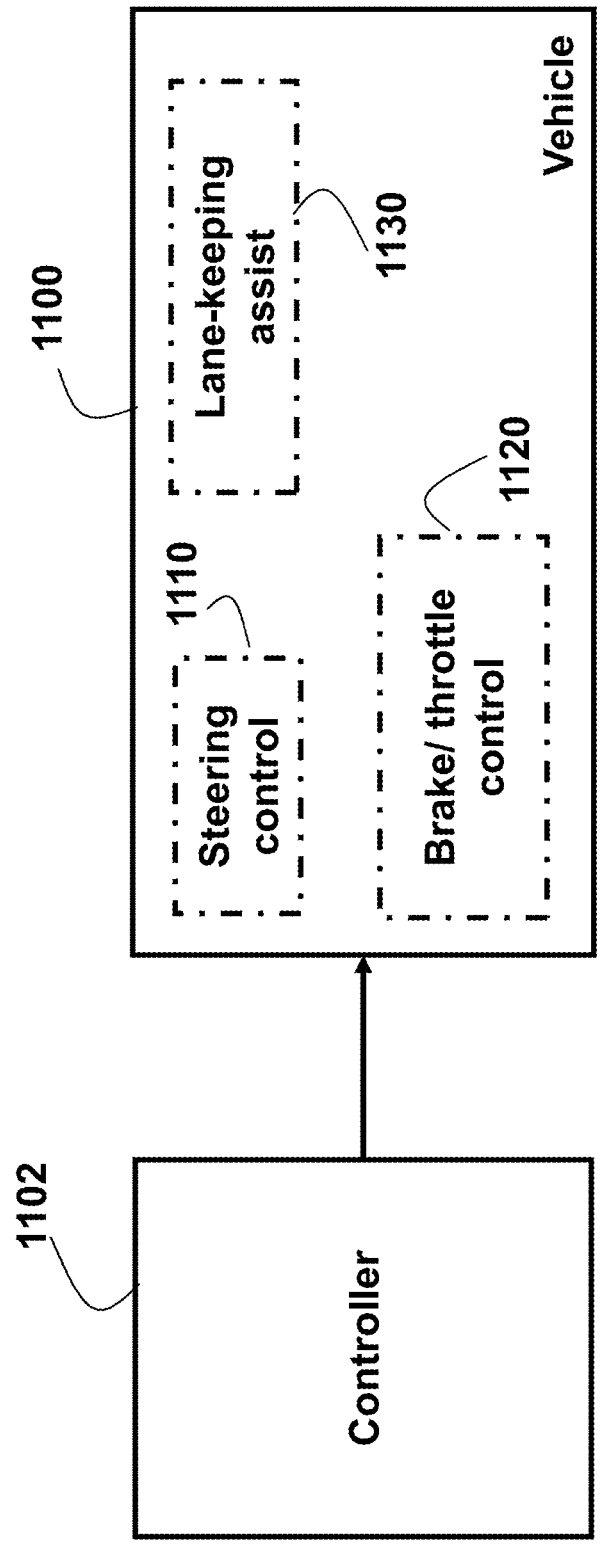
FIG. 11B shows a schematic of interaction between controller 1102 receiving controlled commands from the system 1000 and the controller 1100 of the vehicle 1101 according to some embodiments.

FIG. 11B shows a schematic of interaction between controller 1102 receiving controlled commands from the system 1000 and the controller 1100 of the vehicle 1101 according to some embodiments. For example, in some embodiments, the controllers 1100 of the vehicle 1101 are steering 1110 and brake/throttle controllers 1120 that controls rotation and acceleration of the vehicle 1100. In such a case, controller 1102 outputs control inputs to the controllers 1110 and 1120 to control the state of the vehicle. The controllers 1100 can also include high-level controllers, e.g., a lane-keeping assist controller 1130 that further process the control inputs of the predictive controller 1102. In both cases, the controllers 1100 maps use the outputs of the predictive controller 1102 to control at least one actuator of the vehicle, such as the steering wheel and/or the brakes of the vehicle, in order to control the motion of the vehicle. States $x_t$ of the vehicular machine could include position, orientation, and longitudinal/lateral velocities; control inputs $u_t$ could include lateral/longitudinal acceleration, steering angles, and engine/brake torques. State constraints on this system can include lane-keeping constraints and obstacle-avoidance constraints. Control input constraints may include steering angle constraints and acceleration constraints. Collected data could include position, orientation, and velocity profiles, accelerations, torques, and/or steering angles.

The above-described embodiments of the present invention can be implemented in numerous ways. For example, the embodiments may be implemented using hardware, software, or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. A server for jointly tracking states of multiple vehicles, wherein a state of each vehicle includes one or multiple state biases capturing residual errors in atmospheric delays, the server comprising: at least one processor; and the memory having instructions stored thereon that, when executed by the at least one processor, causes the server to:

receive multiple transmissions from the multiple vehicles, each transmission from a vehicle includes the measurements of satellite signals received at the vehicle and parameters of a probabilistic distribution of the state of the vehicle;

fuse the states of the multiple vehicles defined by the parameters of the corresponding probabilistic distributions into an augmented state of the multiple vehicles;

fuse the measurements of satellite signals of the multiple vehicles into an augmented measurement of the augmented state subject to augmented measurement noise defined by a non-diagonal covariance matrix with non-zero off-diagonal elements, each non-zero off-diagonal elements relating errors in the measurements of a pair of corresponding vehicles;

execute a probabilistic filter updating the augmented state based on the augmented measurement subject to the augmented measurement noise; and fuse the parameters of the probabilistic distribution of the state of at least some of the multiple vehicles with a corresponding portion of the updated augmented state to output the fused parameters of the probabilistic distribution of the state of at least some of the multiple vehicles.

2. The server of claim 1, wherein the augmented state is a union of the states of multiple vehicles, such that dimensions of the augmented state are smaller than a sum of dimensions of the state of each of the multiple vehicles.

3. The server of claim 1, wherein the probabilistic filter includes a mixed-integer Kalman filter solving a mixed-integer least-squares problem to update the first and second moment of a probabilistic distribution of the augmented state of the multiple vehicles.

4. The server of claim 1, wherein the probabilistic filter includes a recursive mixed-integer Kalman filter solving a recursive mixed-integer least squares problem (RMILS) of ever-increasing size to update the first and second moment of augmented state of the multiple vehicles.

5. The server of claim 4, wherein the probabilistic filter solves the RMILS by maintaining an unconstrained probabilistic distribution with real-valued elements of the augmented state and a constrained probabilistic distribution imposing integer constraints on some elements of the augmented state determined by solving a weighted integer least-squares problem based on the updated real-valued elements of the augmented state.

6. The server of claim 5, wherein the probabilistic filter is configured to update the unconstrained probabilistic distribution of the augmented state based on the augmented measurement to produce an updated real-valued augmented state;

solve the weighted integer least-squares problem of the updated real-valued augmented state to produce values of constrained ambiguities of some elements of the augmented state;

update the augmented measurement with the values of constrained ambiguities to produce a constrained augmented measurement; and update the constrained probabilistic distribution of the augmented state based on the constrained augmented measurement to produce an updated augmented state.

7. The server of claim 1, wherein to determine the non-diagonal covariance matrix, the server is configured to:

form a single or double difference between the measurements of satellite signals of a pair of vehicles with respect to a common base satellite; and determine a covariance between the determined single or the double-difference based on a number of satellites shared by the pair of vehicles.

8. The server of claim 1, wherein the fused parameters of the probabilistic distribution of the state of a vehicle are determined as a weighted combination between the augmented state and the state of the vehicle.

9. The server of claim 8, wherein weights of the weighted combination are determined by minimizing a determinant of the fused covariance of the probabilistic distribution of the state of the vehicle.

10. The server of claim 8, wherein weights of the weighted combination are determined by minimizing a trace of the fused covariance of the probabilistic distribution of the state of the vehicle.

11. The server of claim 8, wherein to fuse a first moment and a second moment of the parameters of the probabilistic distribution of the state of the vehicle based on a first moment and a second moment of the updated augmented state, the server is configured to transform the augmented state and the state of the vehicle to a common state space;

determine a cross-covariance of the fusing between the augmented state and the state of a vehicle in the common state space;

fuse the first moments as a weighted combination of the cross-covariance;

fuse the second moments based on a weighted difference between the second moments, wherein the weight is the weighted combination of the cross-covariance.

12. The server of claim 11, wherein the cross-covariance of the fusing is determined based on a Kalman gain of a probabilistic filter of the vehicle and a cross-covariance between the state of the vehicle and the augmented state.

13. The server of claim 12, wherein the cross-covariance between the state of the vehicle and the augmented state is determined as a function of joint Kalman gains for the state of the multiple vehicles.

14. The server of claim 1, further comprising:

a transceiver configured to receive the multiple transmissions from the multiple vehicles and transmit the fused parameters of the probabilistic distribution of the state to at least some of the multiple vehicles.

15. A method for jointly tracking states of multiple vehicles, wherein a state of each vehicle includes one or multiple state biases capturing residual errors in atmospheric delays, wherein the method uses a processor coupled with stored instructions implementing the method, wherein the instructions, when executed by the processor carry out steps of the method, comprising:

receiving multiple transmissions from the multiple vehicles, each transmission from a vehicle includes the measurements of satellite signals received at the vehicle and parameters of a probabilistic distribution of the state of the vehicle;

fusing the states of the multiple vehicles defined by the parameters of the corresponding probabilistic distributions into an augmented state of the multiple vehicles;

fusing the measurements of satellite signals of the multiple vehicles into an augmented measurement of the augmented state subject to augmented measurement noise defined by a non-diagonal covariance matrix with non-zero off-diagonal elements, each non-zero off-diagonal elements relating errors in the measurements of a pair of corresponding vehicles;

executing a probabilistic filter updating the augmented state based on the augmented measurement subject to the augmented measurement noise; and fusing the parameters of the probabilistic distribution of the state of at least some of the multiple vehicles with a corresponding portion of the updated augmented state to output the fused parameters of the probabilistic distribution of the state of at least some of the multiple vehicles.

* * * * *